(12) United States Patent
Amini et al.

(10) Patent No.: US 9,204,385 B2
(45) Date of Patent: Dec. 1, 2015

(54) WIRELESS ROUTER OR RESIDENTIAL GATEWAY CAPABLE OF DISTINGUISHING POWER-SENSITIVE WIRELESS SENSORS AND PROVIDING SEPARATE TREATMENT THERETO

(71) Applicant: NETGEAR, Inc., San Jose, CA (US)

(72) Inventors: Peiman Amini, Mountain View, CA (US); Joseph Amalan Arul Emmanuel, Cupertino, CA (US); Arms Yongyuth, San Jose, CA (US)

(73) Assignee: NETGEAR, Inc., San Jose, CA (US)

( * ) Notice: Subject to any disclaimer, the term of this patent is extended or adjusted under 35 U.S.C. 154(b) by 118 days.

(21) Appl. No.: 14/106,690

(22) Filed: Dec. 13, 2013

(65) Prior Publication Data

US 2015/0098377 A1  Apr. 9, 2015

Related U.S. Application Data

(60) Provisional application No. 61/888,692, filed on Oct. 9, 2013.

(51) Int. Cl.
*H04W 52/02* (2009.01)
*H04W 72/04* (2009.01)

(52) U.S. Cl.
CPC ......... *H04W 52/0209* (2013.01); *H04W 72/04* (2013.01)

(58) Field of Classification Search
CPC .......... H04W 72/0453; H04W 72/048; H04W 84/18; Y02B 60/50
See application file for complete search history.

(56) References Cited

U.S. PATENT DOCUMENTS 7,136,654 B1 * 11/2006 Hogberg et al. ............... 370/329
2009/0010274 A1 * 1/2009 Koskan ......................... 370/437

* cited by examiner

*Primary Examiner* — Pao Sinkantarakorn
(74) *Attorney, Agent, or Firm* — Michael A. Glenn; Perkins Coie LLP

(57) ABSTRACT

Techniques are disclosed for a wireless router or residential gateway to distinguish power-sensitive wireless sensors and provide separate treatments thereto for low power consumption connections. In some embodiments, a network device includes a wireless network circuit, and control circuitry coupled to the network circuit and configured to, upon receipt of a request of connection from a client, identify whether the client is power-sensitive. The network device can further cause, if the client is identified as power-sensitive, the power-sensitive client to connect using a low-power connection while maintaining a regular connection to other regular clients. The low-power connection can be operated on a first channel different from but in a same frequency band as a second channel on which the regular connection is operated.

28 Claims, 41 Drawing Sheets

| Radio_X | Radio_Y | Performance |
|---|---|---|
| TX | TX | OK |
| RX | RX | OK |
| TX | RX | Radio_Y RX experiences interference (e.g., desensitization) |
| RX | TX | Radio_X RX experiences interference (e.g., desensitization) |

204

| Channel | Lower Frequency | Center Frequency | Upper Frequency |
|---|---|---|---|
| 1 | 2.401 | 2.412 | 2.423 |
| 2 | 2.406 | 2.417 | 2.428 |
| 3 | 2.411 | 2.422 | 2.433 |
| 4 | 2.416 | 2.427 | 2.438 |
| 5 | 2.421 | 2.432 | 2.443 |
| 6 | 2.426 | 2.437 | 2.448 |
| 7 | 2.431 | 2.442 | 2.453 |
| 8 | 2.436 | 2.447 | 2.458 |
| 9 | 2.441 | 2.452 | 2.463 |
| 10 | 2.451 | 2.457 | 2.468 |
| 11 | 2.451 | 2.462 | 2.473 |

FIG. 2C

| CHANNEL NUMBER | FREQUENCY MHZ | NORTH AMERICA (FCC) |
|---|---|---|
| 36 | 5180 | ✔ |
| 40 | 5200 | ✔ |
| 44 | 5220 | ✔ |
| 48 | 5240 | ✔ |
| 52 | 5260 | DFS |
| 56 | 5280 | DFS |
| 60 | 5300 | DFS |
| 64 | 5320 | DFS |
| 100 | 5500 | DFS |
| 104 | 5520 | DFS |
| 108 | 5540 | DFS |
| 112 | 5560 | DFS |
| 116 | 5580 | DFS |
| 120 | 5600 | No Access |
| 124 | 5620 | No Access |
| 128 | 5640 | No Access |
| 132 | 5660 | DFS |
| 136 | 5680 | DFS |
| 140 | 5700 | DFS |
| 149 | 5745 | ✔ |
| 153 | 5765 | ✔ |
| 157 | 5785 | ✔ |
| 161 | 5805 | ✔ |
| 165 | 5825 | ✔ |

FIG. 2D

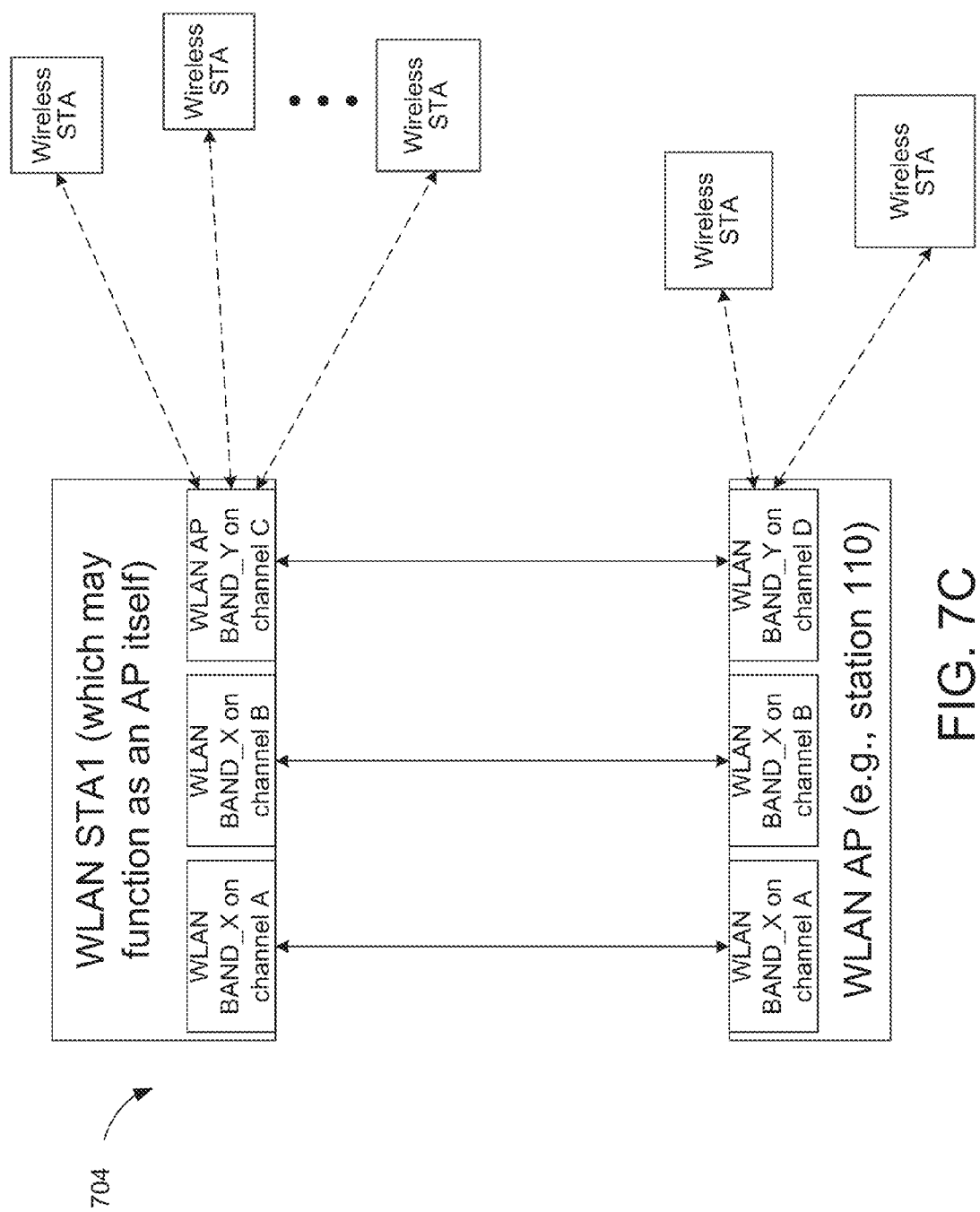

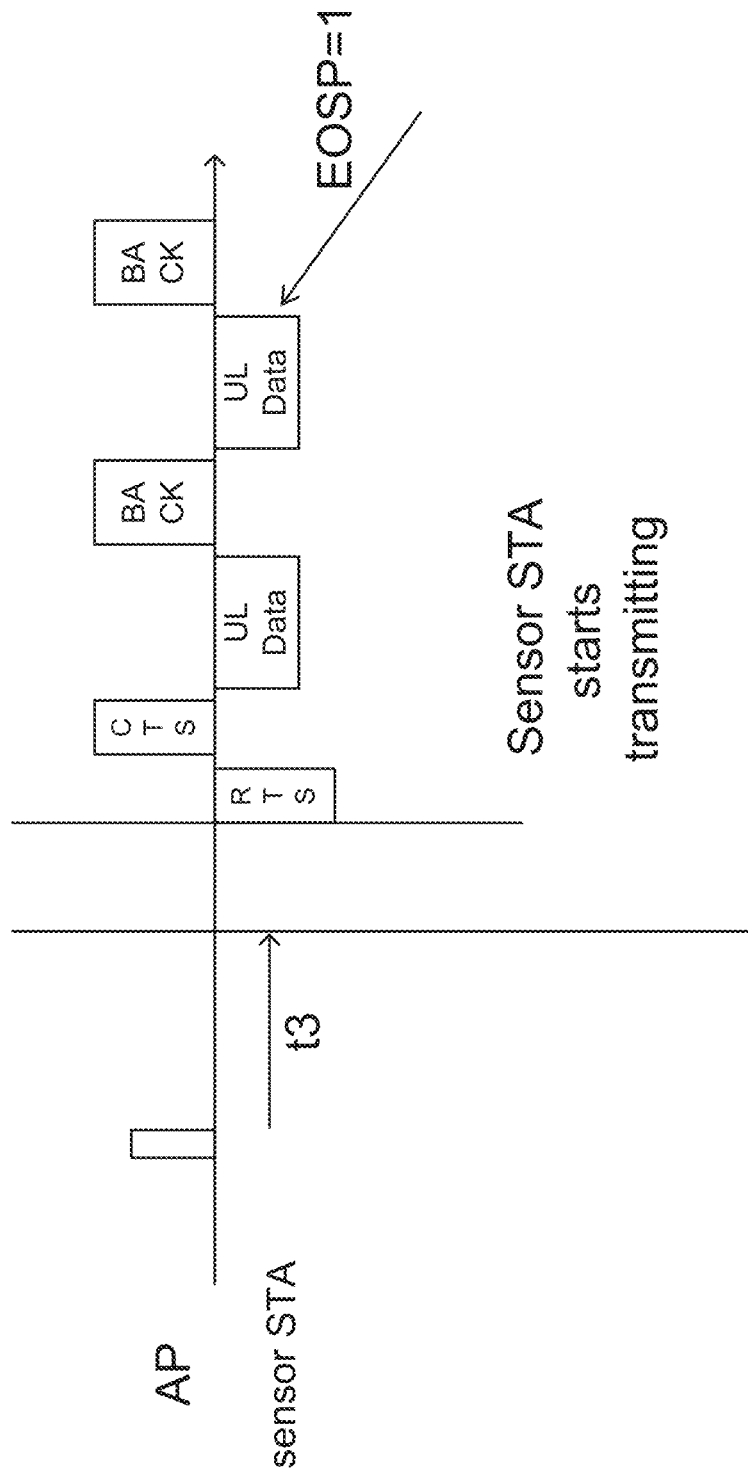

WIRELESS ROUTER OR RESIDENTIAL GATEWAY CAPABLE OF DISTINGUISHING POWER-SENSITIVE WIRELESS SENSORS AND PROVIDING SEPARATE TREATMENT THERETO

CROSS-REFERENCE TO RELATED APPLICATIONS AND EFFECTIVE FILING DATE ENTITLEMENT

This application is entitled to the benefit of and the right of priority to U.S. Provisional Patent Application No. 61/888,692, entitled "WIRELESS DESIGN FOR USING A ROUTERS OR RESIDENTIAL GATEWAY AS SENSOR GATEWAY", filed Oct. 9, 2013, which is hereby incorporated by reference in its entirety. This application is therefore entitled to an effective filing date of Oct. 9, 2013.

This application is related to co-pending U.S. patent application Ser. No. 14/089,651, entitled "WIRELESS SENSOR BASE STATION WITH COEXISTENCE OF MULTIPLE HOMOGENEOUS RADIOS", filed Nov. 25, 2013; U.S. patent application Ser. No. 14/089,671, entitled "METHOD AND APPARATUS FOR IMPLEMENTING COEXISTENCE OF MULTIPLE HOMOGENEOUS RADIOS AND TRAFFIC MANAGEMENT THEREIN", filed Nov. 25, 2013; U.S. patent application Ser. No. 14/089,674, entitled "ALIGNMENT OF PACKETS FOR IMPLEMENTING COEXISTENCE OF MULTIPLE HOMOGENEOUS RADIOS", filed Nov. 25, 2013; and U.S. patent application Ser. No. 14/089,680, entitled "CHANNEL STEERING FOR IMPLEMENTING COEXISTENCE OF MULTIPLE HOMOGENEOUS RADIOS", filed Nov. 25, 2013; all of which are hereby incorporated by reference in their entireties.

TECHNICAL FIELD

The present disclosure relates generally to electronic communications, and more specifically, to controlling radio circuits in wireless computer network systems.

BACKGROUND

With the emerging technologies of wireless networks, embedded systems, and the Internet, there is an ever increasing demand for larger network bandwidth and higher network speed from all kinds of electronic devices employed in various settings, from computing and managing data to online shopping and social networking. Electronic and digital content have become extensively used in shared, networked environments as compared to traditional stand-alone personal computers and mobile devices. As a result, data traffic, and especially wireless data traffic, has experience an enormous growth.

To accommodate this large need in data traffic, wireless network technologies have grown substantially in terms of transmission speed; however, this increase in transmission speed is typically obtained at the expense of power consumption. Many of electronic devices are mobile or portable devices which rely on limited power resources to operate, and typical, performance-oriented wireless communication techniques may adversely affect the operational life of these battery powered devices. This is especially true with wireless sensors, such as motion detectors, cameras, pressure and temperature sensors, or carbon monoxide sensors, where these devices are expected to operate on batteries for a long time and are at idle or asleep most of the time.

Accordingly, it is desirable to provide methods and apparatuses that reduce power consumption of power-sensitive mobile devices (e.g., wireless sensors) while still satisfying the need for transmission speed of regular devices.

BRIEF DESCRIPTION OF THE DRAWINGS

The present embodiments are illustrated by way of example and are not intended to be limited by the figures of the accompanying drawings. In the drawings:

FIG. 2C is a table illustrating the upper, center, and lower frequencies of different Wireless LAN (WLAN) channels in a typical 2.4 GHz frequency band;

FIG. 2D is a table illustrating example frequencies of different Wireless LAN (WLAN) channels available (e.g., in the United States) in a typical 5 GHz frequency band;

FIGS. 7B-7D are functional diagrams illustrating some specific example scenarios in which the WLAN access point and WLAN station of FIG. 7A may be operated;

FIGS. 21A-21B are example timing diagrams respectively illustrating uplink traffic operations from the sensors to the base station in the fast channel switching techniques in accordance with some embodiments;

Like reference numerals refer to corresponding parts throughout the figures and specification.

DETAILED DESCRIPTION

Figure 1:
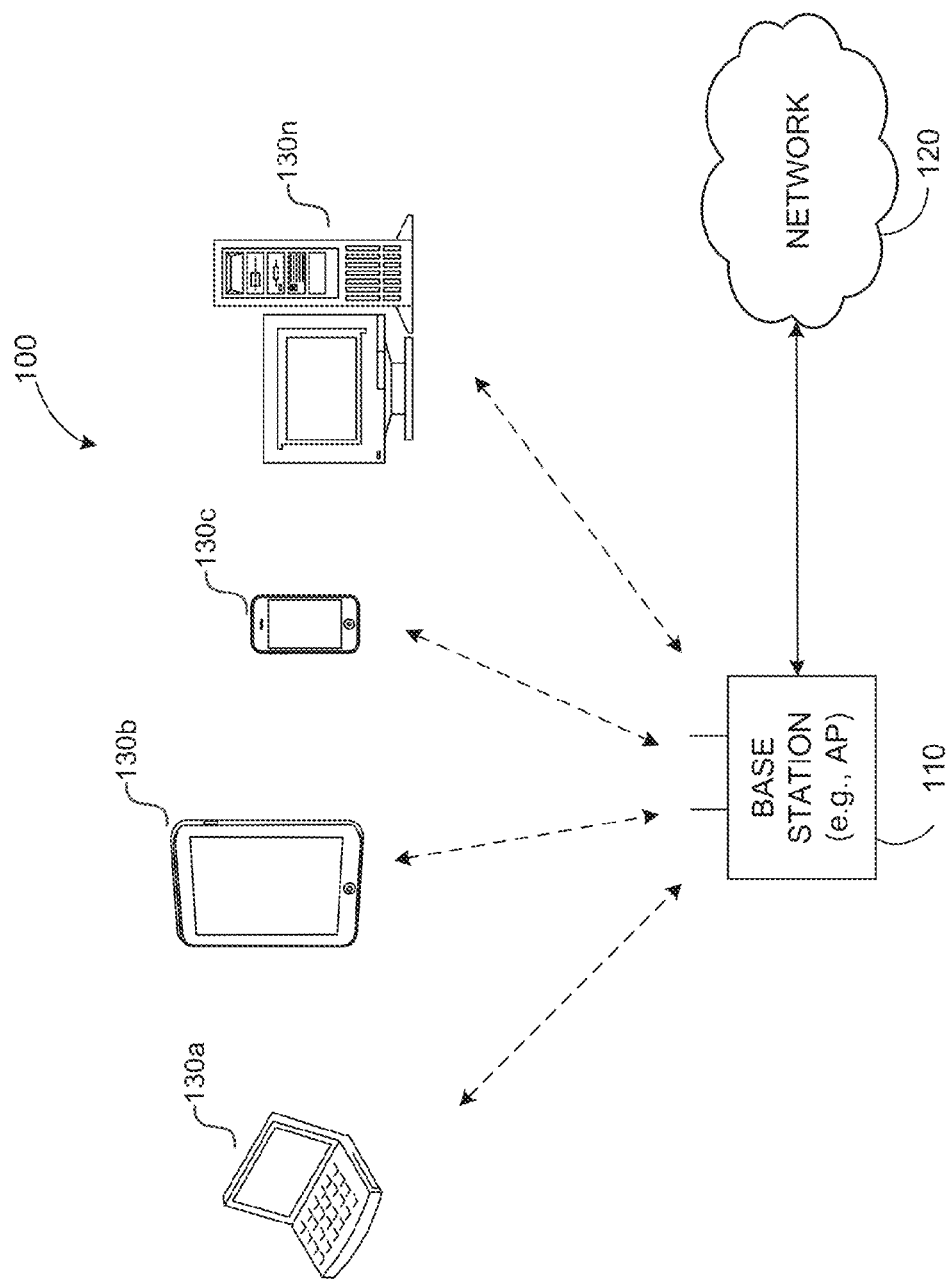
FIG. 1 is a representative computer network environment within which some embodiments may be implemented.

Techniques are disclosed for a wireless router or residential gateway to distinguish power-sensitive wireless sensors and provide separate treatments thereto for low power consumption connections. In some embodiments, a network device includes a wireless network circuit, and control circuitry coupled to the network circuit and configured to, upon receipt of a request of connection from a client, identify whether the client is power-sensitive. The network device can further cause, if the client is identified as power-sensitive, the power-sensitive client to connect using a low-power connection while maintaining a regular connection to other regular clients. The low-power connection can be operated on a first channel different from but in a same frequency band as a second channel on which the regular connection is operated.

Among other benefits, the embodiments disclosed herein can increase reduce power consumption of power-sensitive devices (e.g., wireless sensors) while still satisfying the need for transmission speed of regular devices by fast channel switching techniques as well as other techniques disclosed herein.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure.

The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication (e.g., a network) between components. The present embodiments are not to be construed as limited to specific examples described herein but rather to include within their scope all embodiments defined by the appended claims.

For purposes of discussion herein, "heterogeneous radios" means a plurality of radios or wireless network circuits of different network technologies; for example, IEEE 802.11 Wireless LAN (e.g., WiFi), Bluetooth, 2G, 3G, Long Term Evolution (LTE), and Global Navigation Satellite System (GNSS) are all different network technologies than one another. Conversely, "homogeneous radios" means a plurality of radios or wireless network circuits of the same network technologies; for example, a plurality of Wireless LAN (WLAN) circuits, although one may operate on channel 1 of 2.4 GHz frequency band and using IEEE 802.11n protocol while another may operate on channel 6 of 2.4 GHz frequency band and using IEEE 802.11g protocol, are of the same family of WLAN technology and therefore are homogeneous radios. Some examples of the commonly-seen radios on the 2.4 GHz frequency band may include IEEE 802.11b, IEEE 802.11g, or IEEE 802.11n.

System Overview

FIG. 1 is a representative computer network environment 100 within which some embodiments may be implemented. The environment 100 includes a base station 110, a network 120, and a plurality of client devices 130a-130n.

The base station 110, which is illustrated as operating in "access point (AP)" mode, is coupled together with the network 120 so that the base station 110 can enable client devices 130 to exchange data to and from the network 120. For example, the base station 110 and the network 120 may be connected via a twisted pair cabling network, a coax cable network, a telephone network, or any suitable type of connection network. In some embodiments, the base station 110 and the network 120 may be connected wirelessly (e.g., which may include employing an IEEE 802.11 wireless network, or a data traffic network based on wireless telephony services such as 3G, 3.5G, 4G LTE and the like). The technologies supporting the communications between the base station 110 and the network 120 may include Ethernet (e.g., as described in IEEE 802.3 family of standards) and/or other suitable types of area network technologies. Examples of different wireless protocols in the IEEE 802.11 family of standards can include IEEE 802.11a, IEEE 802.11b, IEEE 802.11n, IEEE 802.11ac, IEEE 802.11af, IEEE 802.11ah, and IEEE 802.11ad.

Although not shown for simplicity, the base station 110 may include one or more processors, which may be general-purpose processors or may be application-specific integrated circuitry that provides arithmetic and control functions to implement the techniques disclosed herein on the base station 110. The processor(s) may include a cache memory (not shown for simplicity) as well as other memories (e.g., a main memory, and/or non-volatile memory such as a hard-disk drive or solid-state drive. In some examples, cache memory is implemented using SRAM, main memory is implemented using DRAM, and non-volatile memory is implemented using Flash memory or one or more magnetic disk drives. According to some embodiments, the memories may include one or more memory chips or modules, and the processor(s) on the base station 110 may execute a plurality of instructions or program codes that are stored in its memory.

The client devices 130 can connect to and communicate with the base station 110 wirelessly including, for example, using the IEEE 802.11 family of standards (e.g., Wireless LAN), and can include any suitable intervening wireless network devices including, for example, base stations, routers, gateways, hubs, or the like. Depending on the embodiments, the network technology connecting between the client devices 130 and the base station 110 can include other suitable wireless standards such as the well-known Bluetooth communication protocols or near field communication (NFC) protocols. In some embodiments, the network technology between the devices 130 and station 110 can include a customized version of WLAN, Bluetooth, or customized versions of other suitable wireless technologies. Client devices 130 can be any suitable computing or mobile devices including, for example, smartphones, tablet computers, laptops, personal digital assistants (PDAs), or the like. Client devices 110 typically include a display, and may include suitable input devices (not shown for simplicity) such as a keyboard, a mouse, or a touchpad. In some embodiments, the display may be a touch-sensitive screen that includes input functionalities. Additional examples of the devices 130 can include network-connected cameras (or "IP cameras"), home sensors, and other home appliances (e.g., a "smart refrigerator" that can connect to the Internet).

It is noted that one of ordinary skill in the art will understand that the components of FIG. 1 are just one implementation of the computer network environment within which present embodiments may be implemented, and the various alternative embodiments are within the scope of the present embodiments. For example, the environment 100 may further include intervening devices (e.g., switches, routers, hubs, etc.) among the base station 110, the network 120, and the client devices 130. In some examples, the network 120 comprises the Internet.

The Coexistence Mechanism

Figures 2A, 2B:
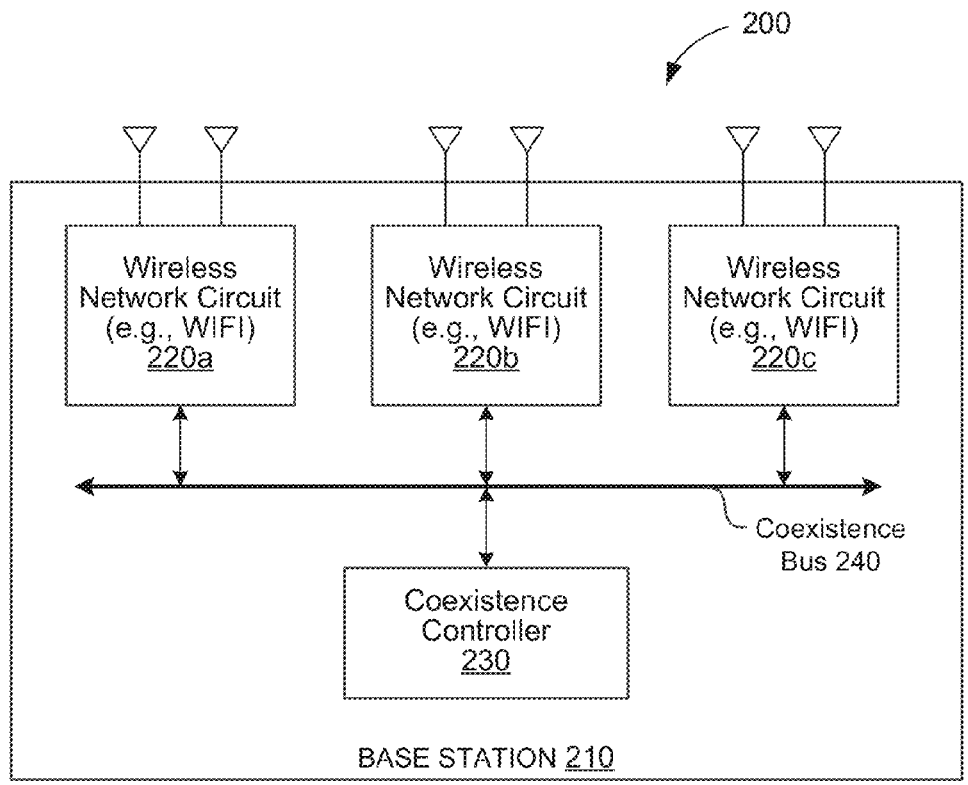
FIG. 2A is an abstract functional block diagram illustrating a wireless base station equipped with a coexistence controller in accordance with some embodiments.
FIG. 2B is a table illustrating example situations where the coexistence controller can provide improvements.

FIG. 2A is an abstract functional block diagram 200 illustrating a wireless base station 210 equipped with a coexistence controller 230 in accordance with some embodiments. Base station 210 is an example of the base station 110 of FIG. 1. As shown in FIG. 2A, the wireless base station 210 includes a plurality of wireless network circuits 220a-220c and a coexistence controller 230. In accordance with one or more embodiments, the coexistence controller 230 is coupled to each of the network circuits 220a-220c through a coexistence bus 240.

As previously mentioned, many wireless network technologies used in electronic devices occupy the same or similar frequency band. An example of this frequency band is the well-known industrial, scientific and medical (ISM) radio bands. Take one of the most commonly used of ISM bands, the 2.4 GHz band, for example, the technologies that use this frequency band for various kinds of purposes can include Wireless LAN and Bluetooth. Several other commonly seen wireless communication technologies also operate at similar frequency bands (e.g., ranging from 2.3 GHz to 2.7 GHz); they include LTE Band 40 (TDD-LTE), LTE UL Band 7 (FDD-LTE), LTE Band 38 (TDD-LTE), and LTE DL Band 7 (FDD-LTE), just to name a few.

For purposes of discussion herein, assume wireless network circuits 220a-220c are Wireless LAN circuits operating at a main frequency band of 2.4 GHz.

FIG. 2C is a table 204 illustrating the upper, center, and lower frequencies of different Wireless LAN channels in a typical 2.4 GHz frequency band. FIG. 2D is a table 206 illustrating example frequencies of different Wireless LAN (WLAN) channels available (e.g., in the United States) in a typical 5 GHz frequency band. As illustrated in FIG. 2C, in the United States and Canada, there are 11 channels available for use in the 2.4 GHz Wireless LAN frequency band as defined by IEEE 802.11 family of standards. In particular, 3 non-overlapping channels (e.g., channels 1, 6, and 11) can be selected out of the 11 channels in the IEEE 802.11 standards (e.g., IEEE 802.11b) for Wireless LAN access points that are located near each other. It is typically recommended that a person ordinary skill in the art should use one of the above non-overlapping channels for each wireless network circuits that operate close by in order to minimize or reduce the adverse effects of interference.

However, the present embodiments recognize that typically a 50 dB isolation may be necessary to completely or effectively avoid in-device coexistence interference when the operating frequencies for different wireless network circuits are only separated by less than 20 MHz. This is especially the case with mobile handset applications where the devices are of small form factor; devices in such application generally only provide 10-30 dB isolation between different wireless network circuits. As such, in reality even with transceiving on non-overlapping channels and, in some instances, employing spectral masks (e.g., a transmit spectral mask for 20 MHz transmission in the 2.4 GHz band as defined by the IEEE), noise as well as other factors can still cause coexisting wireless network circuits to interfere with each other, and especially on small form factor devices such as a mobile phone or a wireless base station.

For one example, it is observed in the present disclosure that, at least in the LTE 2.4G ISM band, the lower portion of ISM band is very close to the LTE TDD Band 40. Therefore, in the case where a single mobile device with LTE, WLAN and Bluetooth coexistence, the LTE transmitter may cause interference to WLAN and/or BT receiver; and similarly, the BT/WLAN transmitter may cause interference to the LTE receiver. For another example, in devices where LTE telephony and Global Navigation Satellite System (GNSS) receiver circuits coexist, the uplink transmissions of LTE Band 13 (e.g., 777-787 MHz) and Band 14 (e.g., 788-798 MHz) can disrupt the working of GNSS receiver using L1 frequency (e.g., 1575.42 MHz). One reason causing this is that the second harmonic of Band 13 (e.g., 1554-1574 MHz) and second harmonic of Band 14 (e.g., 1576-1596 MHz) are close to L1 frequency.

Furthermore, the present embodiments recognize that there are several situations which can cause interference when two or more radio circuits concurrently operate in same or similar frequency band in close physical proximity. FIG. 2B is a table 202 illustrating example situations where the coexistence controller can provide improvements. As shown in table 202, when one radio is transmitting, the reception performance of the other radio(s) is desensitized. For purpose of discussion herein, radio circuits located in close physical proximity, or "collocated," means that the radio circuits are located close to each other enough that a transmission operation on one circuit can adversely affect the reception operation on another circuit; for some typical examples, two radio circuits that are located on the same physical device (e.g., a base station), or on the same printed circuit board (PCB), are located in close physical proximity.

It is noted that FIG. 2B is a general representation of the interfering phenomenon which may be caused by concurrent operation of the collocated radios; in some embodiments, appropriate filtering can also be applied by a person having ordinary skill in the art so that sensitivity loss caused by different collocated radios transmitting (TX) and receiving (RX) at or near the same time is reduced. In particular, depending on the frequency band of the channels being used and the type of filtering, the actual severity of the sensitivity loss depicted in FIG. 2B may vary.

Accordingly, the present embodiments provide an effective mechanism to coordinate the scheduling of transmission and reception operations of the network circuits 220 in order to mitigate in-device interference caused by coexistence of wireless network circuits operating at the same or similar frequency band. In accordance with some embodiments, when two or more wireless radios may be used in the same band (e.g. 2.4 GHz band, or 5 GHz band) on the same device, the device can employ a coexistence mechanisms (hardware (HW) and/or software (SW)) so that the radios can operate in same band without desensitizing each other's receiving operations. The HW mechanism for coexistence can include digital hardware bus in some embodiments, and can include radio frequency (RF) circuits in other embodiments; in some other embodiments, the HW mechanism can employ a combination of digital and RF mechanisms. Further, depending on the embodiment, digital HW mechanism may include a direct hardware line connecting accessing mechanism of two chipsets, or it may be hardware lines connecting the accessing mechanism of two hardware blocks inside a chipset. The RF mechanism may include RF filtering, RF switching, or other suitable RF filters.

More specifically, in one or more embodiments, each of the network circuits 220a-220c can be assigned a priority, and the coexistence controller 230 is coupled to the network circuits 220a-220c through the coexistence bus 240 to control operations between (or among) the network circuits 220a-220c. It is noted that, in some embodiments, it is possible for one or more of the network circuits 220a-220c to be assigned with the same priority.

The coexistence controller 230 can selectively adjust one or more transmission operating parameters of a respective network circuit (e.g., circuit 220a) based on a plurality of operating criteria including network circuit 220a's priority as compared to other circuits' priorities. The priority each network circuit (e.g., circuit 220a) can be predetermined (e.g., by the manufacturer of the base station 210) or can be dynamically assigned (e.g., by the coexistence controller 230) based on certain priority assigning criteria. The priority assigning criteria may include the amount of traffic, the type of traffic (e.g., data, voice, video, sensor applications, etc.), wireless channel conditions each circuit experiences, and/or other suitable factors.

The operating criteria can reflect a variety of considerations such as the number of client devices (e.g., devices 130, FIG. 1) each network circuit handles, the amount of data traffic each network circuit sees, the data rate each network circuit supports, the type of traffic each network circuit is assigned, the wireless channel condition or noise (e.g., as measured by RSSI or a known matrix rank) each network circuit experiences, and so forth. According to the present embodiments, the operating criteria are selected to cause the coexistence controller to control the operations in a way that reduces a probability that network circuits 220a-220c desensitize one another. In some embodiments, the operating criteria are selected in a way such that the coexistence controller 230 can perform, for example, load balancing and/or frequency planning using multiple wireless network circuits (e.g., circuits 220a-220c) on base station 210.

It is noted that, in the embodiments where the priorities of the wireless network circuits are dynamically assigned, the priority assigning criteria may be determined in the same way as or in a similar way to the determination of operating criteria by the coexistence controller 230.

The transmission operating parameters for a wireless network circuit is the configurations in which the network circuit uses to transmit data. For example, in some embodiments, the coexistence controller 230 can reduce the transmit power on one wireless network circuit (e.g., circuit 220a) when another wireless network circuit (e.g., circuit 220b) is receiving. As previously mentioned, the coexistence controller 230 selectively adjusts the transmission operating parameters of the circuit 220a, for example, because the circuit 220b has a higher priority. In another example, circuit 220a's operating parameters receive adjustment from the controller 230 because operating criteria as determined by the controller 230 indicates that the circuit 220b is connected to (e.g., and receiving from) a limited power device such as a mobile phone. The operating criteria may also reflect that the circuit 220b is currently handling high priority type of traffic (e.g., such as an image sent from a burglar camera sensor), and therefore the controller 230 adjusts (e.g., suppresses) the transmission operating parameter of the circuit 220a so that circuit 220a does not interfere with circuit 220b's reception.

In additional or alternative embodiments, other transmission operating parameters that can be adjusted by the coexistence controller 230 can include a data rate (e.g., 11 Mbit/s, or 54 Mbit/s) and/or a network protocol (e.g., IEEE 802.11a, IEEE 802.11n, IEEE 802.11b, IEEE 802.11ac, IEEE 802.11ah, etc.) at which the respective network circuit operates. In some examples, the transmission operating parameters can also include a channel (e.g., channel 1, channel 6, or channel 11 in WLAN 2.4 GHz frequency band) on which the respective network circuit operates. As additional examples, the channels available in WLAN 5 GHz frequency band can include channel 36, channel 100, or channel 161. In some embodiments, the transmission operating parameters can also include a frequency band (e.g., 2.4 GHz, 5 GHz, etc.) in which the respective network circuit operates. Other known configuration adjustments such as modulation or phase adjustments can also be included in the list of transmission operating parameters which the coexistence controller 230 can adjust. In some embodiments, proper RF filtering can be applied to reduce the effect of interference. In some of these embodiments, when RF filtering is applied, proper channel selection may be done by software part of the coexistence mechanism to better utilize the RF filtering.

The coexistence bus 240 may be used by the coexistence controller 230 to schedule or coordinate transmission and reception to avoid reception desensitization. The coexistence bus 240 can be implemented in forms of a serial bus, several dedicated buses, or other suitable forms such as a network. Specifically, depending on the embodiment, the coexistence mechanism may be software only, hardware only, or a combination of both. Examples of hardware-based coexistence mechanisms may include a hardware bus, a modified radio frequency (RF) frontend, and/or other suitable implementations. Examples of software-based coexistence mechanisms may be located at different layers of networking including, for example, the PHY layer, the MAC layer, and/or the IP layer.

Figure 3:
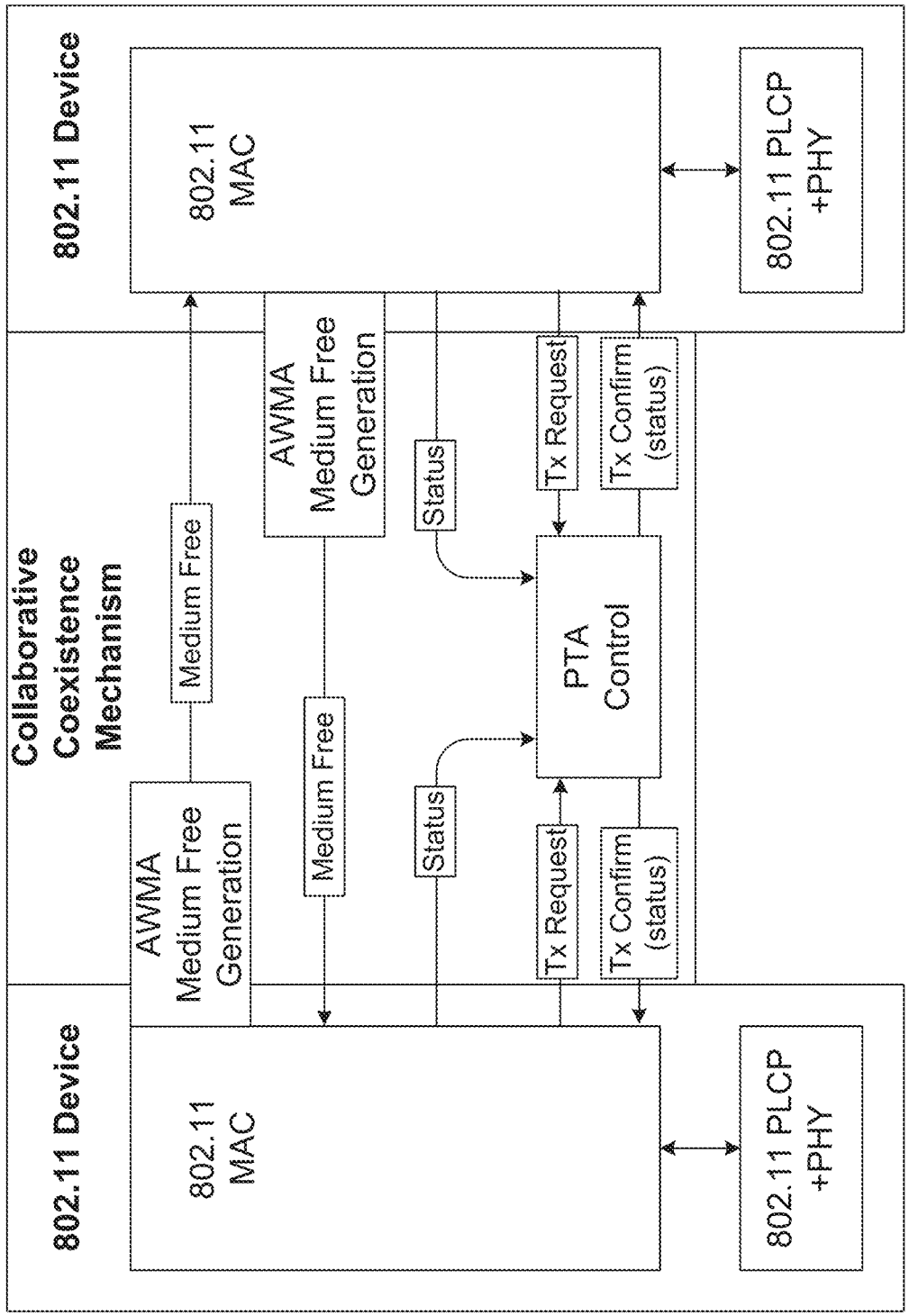
FIG. 3 is a functional block diagram illustrating certain implementation details of a specific example of the coexistence controller of FIG. 2A in accordance with some embodiments.

In some specific implementations, the coexistence bus 240 together with the coexistence controller 230 can employ coexistence mechanisms similar to the IEEE 802.15.2 Wireless LAN (WLAN)-Bluetooth (which are heterogeneous radios (e.g., operating) coexistence mechanisms for implementing/coordinating coexistence of homogeneous radios (e.g., WLAN-WLAN) operating at the same or similar band; however, it is noted that the standard IEEE 802.15.2 coexistence mechanism is specific to WLAN-Bluetooth coexistence applications, and that suitable modifications (e.g., such as those described herein) may be necessary for homogeneous radios application. FIG. 3 is a functional block diagram illustrating certain implementation details of the specific embodiment of the coexistence controller of FIG. 2A employing a modified IEEE 802.15.2 coexistence mechanism in accordance with some embodiments.

Depending on the embodiments, either the collaborative or the non-collaborative mechanisms (as specified in IEEE 802.15.2 standards) or both may be adapted for use with the coexistence controller 230. As illustrated in FIG. 3, the collaborative coexistence mechanism of IEEE 802.15.2 is modified (e.g., which can be implemented by the coexistence controller 230, FIG. 2A) to perform packet traffic arbitration for coexistence of homogeneous radios (e.g., WLAN-WLAN) applications. It is noted that more details of the Packet Traffic Arbitration (PTA) mechanisms can be found in Clause 6 of the 802.15.2 Recommended Practices.

Of course, a person having ordinary skill in the art will know that other standard or non-standard coexistence mechanisms (e.g., which may be developed for heterogeneous radio coexistence such as WLAN, Bluetooth, and LTE) may also be modified and applied to homogeneous radio coexistence (e.g., WLAN to WLAN) in similar fashion as disclosed herein.

Figure 4A:
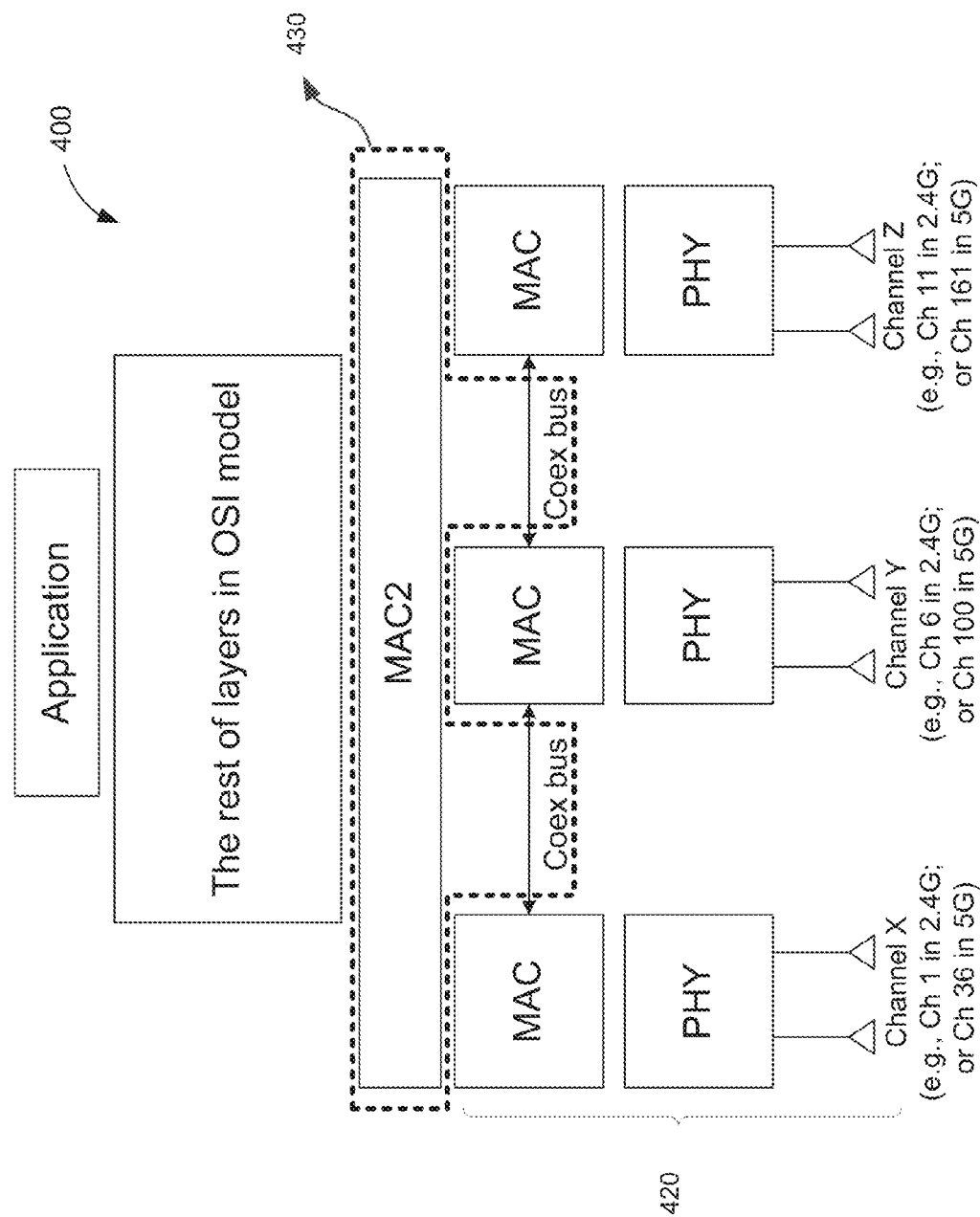
FIG. 4A and FIG. 4B are abstract diagrams using layered model for illustrating example hierarchical relationships between the coexistence controller and other components in the base station of FIG. 2A.
Figure 4B:
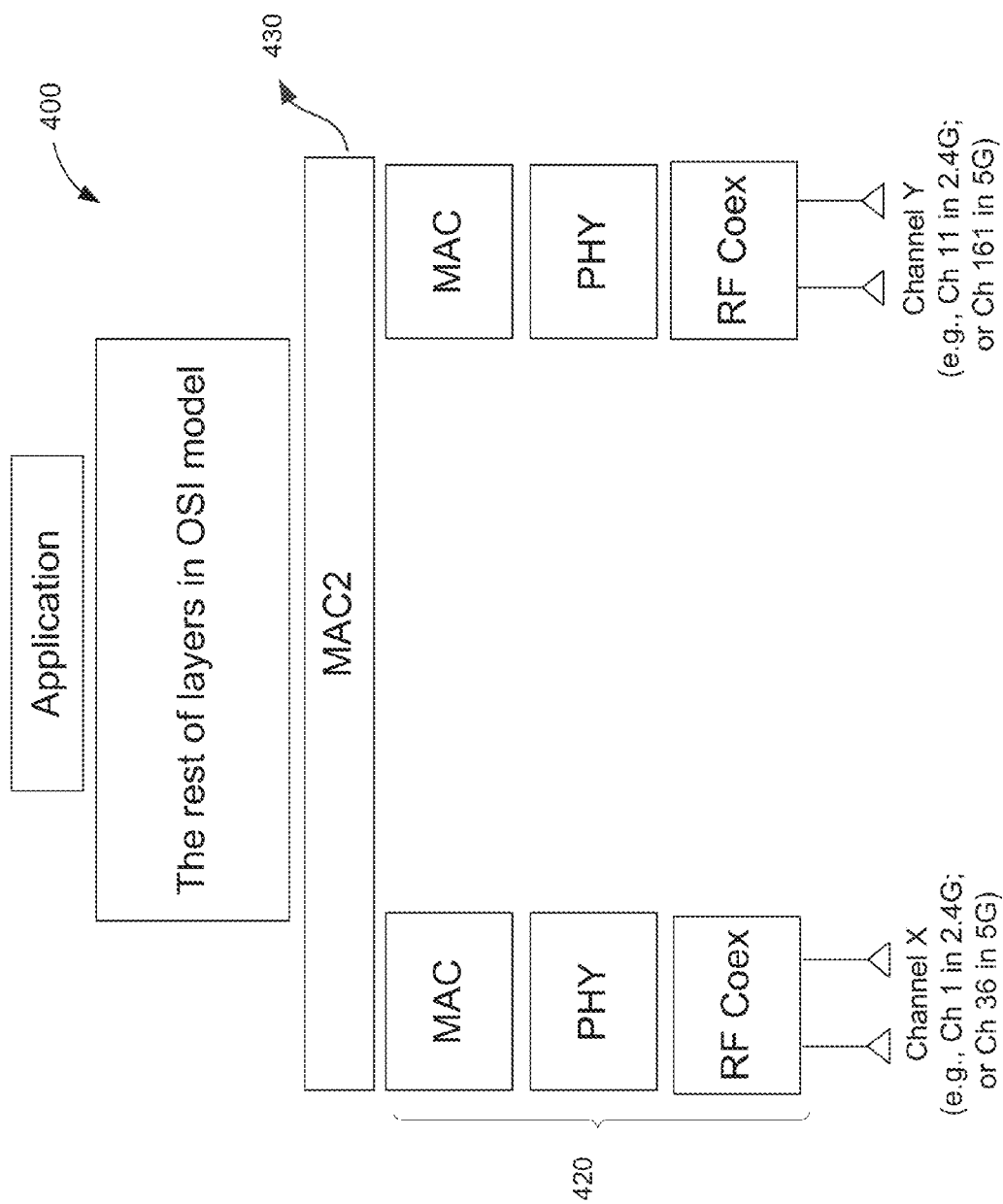

FIG. 4A and FIG. 4B are abstract diagrams using layered model 400 for illustrating example hierarchical relationships between the coexistence controller 230 and other components in the base station 210 of FIG. 2A. The model 400 generally follows the naming conventions of the well-known open systems interconnection (OSI) model, as standardized in ISO/IEC 7498-1 by the International Organization for Standardization (ISO). For purposes of discussion herein, the media access (MAC) layer sits between the network layer (layer 3 of OSI model) and physical (PHY) layer (layer 1) and is a sub-layer of the data link layer (layer 2) which provides addressing, channel access control, as well as other suitable functionalities. It is noted that model 400 is provided herein to enable further understanding of the present embodiments; and that other models (e.g., TCP/IP model) can be used and/or modified for implementing the present embodiments.

As illustrated in FIGS. 4A-4B, in accordance with one or more embodiments, the coexistence controller 230 (FIG. 2A) can function as an additional layer (labeled as MAC2) on top of the MAC layer of an existing wireless network circuit so that radio circuit that are readily designed and available on the current market can be adopted (e.g., into the base station 210, FIG. 2A) as modules in order to increase reusability and save redesign cost. Notably, FIG. 4A illustrates a model that employs a coexistence bus to coordinate the radios at MAC layer; in comparison, the model illustrated in FIG. 4B does not employ the coexistence bus, but it utilizes RF filters to aid the coexistence mechanism located on the MAC2 layer. In some embodiments, the MAC2 layer may include link aggregation mechanisms to aggregate the links at the lower layer (e.g., the two MAC-layer links as shown in FIG. 4B).

The coexistence bus 240 (FIG. 2A) can function as a coordination mechanism coupled to the MAC layer of the network circuits. The bus 240 can be employed by the coexistence controller 230 to communicate and control each of the network circuits 420. Accordingly, the network circuits can each include individual media access control (MAC) layer and physical (PHY) layer circuitry, such as MAC and PHY layers 420 illustrated in FIG. 4. In other words, in some embodiments of the base station 210, there can be separate and independent MAC engines for the network circuits 220a-220c (FIG. 2A) with coexistence bus 230 and a MAC2 layer above (e.g., where coexistence controller 240 resides) for management. In some embodiments, either the MAC or the MAC2 layer or the two together can perform aggregation, encryption, decryption, and/or other timing critical tasks. In some embodiments, the coexistence controller 230 can manage network data traffic from a select number of network circuits 220a-220c so as to aggregate a bandwidth of the selected number of network circuits (which is discussed in more details below). Examples of aggregation can include Aggregation of MAC protocol data units (AMPDU) and Aggregation of MAC service data units (AMSDU). Example of encryption can include the Advanced Encryption Standard (AES), Wired Equivalent Privacy (WEP), Temporal Key Integrity Protocol (TKIP), and the like.

With continued reference to FIG. 2A, in some embodiments, the operation controls (e.g., operating parameter adjustments) by the coexistence controller 230 are independently performed to each of the network circuits 220a-220c, so that the operating parameters of each circuit (e.g., circuit 220a) can be fine-tuned by the coexistence controller 230 individually and without necessarily affecting other network circuits coupled to the same coexistence bus 240.

In combination of the above, one or more embodiments of the coexistence controller 230 can implement techniques that reduce interference, such as reducing transmission power, changing the channel, or disabling transmission of selected network circuits based on workload, type of traffic, priority of the network circuits and their connected clients (e.g., by whether they are power consumption sensitive), type of the data traffic, channel noise observed by the radio antennas, or other suitable factors that are experienced by the network circuits 220a-220c. In some implementations, the operations between the network circuits 220a-220c are controlled by the coexistence controller 230 in a way such that the network circuits 220a-220c can transmit and receive data at or near the same time. For example, the wireless network circuit 220a can be transmitting on channel 6 of 2.4 GHz frequency band at an attenuated power level while the wireless network circuits 220b and 220c can be respectively receiving on channel 1 and 11 of 2.4 GHz frequency band. In some embodiments, and in particular those embodiments that equip radios operating in the 5 GHz frequency band, proper filtering can also be adapted by the coexistence mechanisms. Some embodiments of the coexistence mechanism can adapt RF filtering or other frontend techniques to aid the coexistence mechanisms in reducing interference and discretization from one radio to other.

The configuration of base station 210 shown in FIG. 2A and layered model 410 shown in FIG. 4 are merely examples. Base station 210 may include any suitable numbers of network circuits 220a-220c, more than one coexistence controller 230, and/or additional processing units coupled to the coexistence bus 240 to perform coordination/control operations. Furthermore, the coexistence controller 230 may be integrated into other suitable kinds of computing devices including, for example, accelerated processing units (APUs), field-programmable gate arrays (FPGAs), digital signal processors (DSPs), or other devices with microprocessors.

Alignment of Packets

Figure 5A:
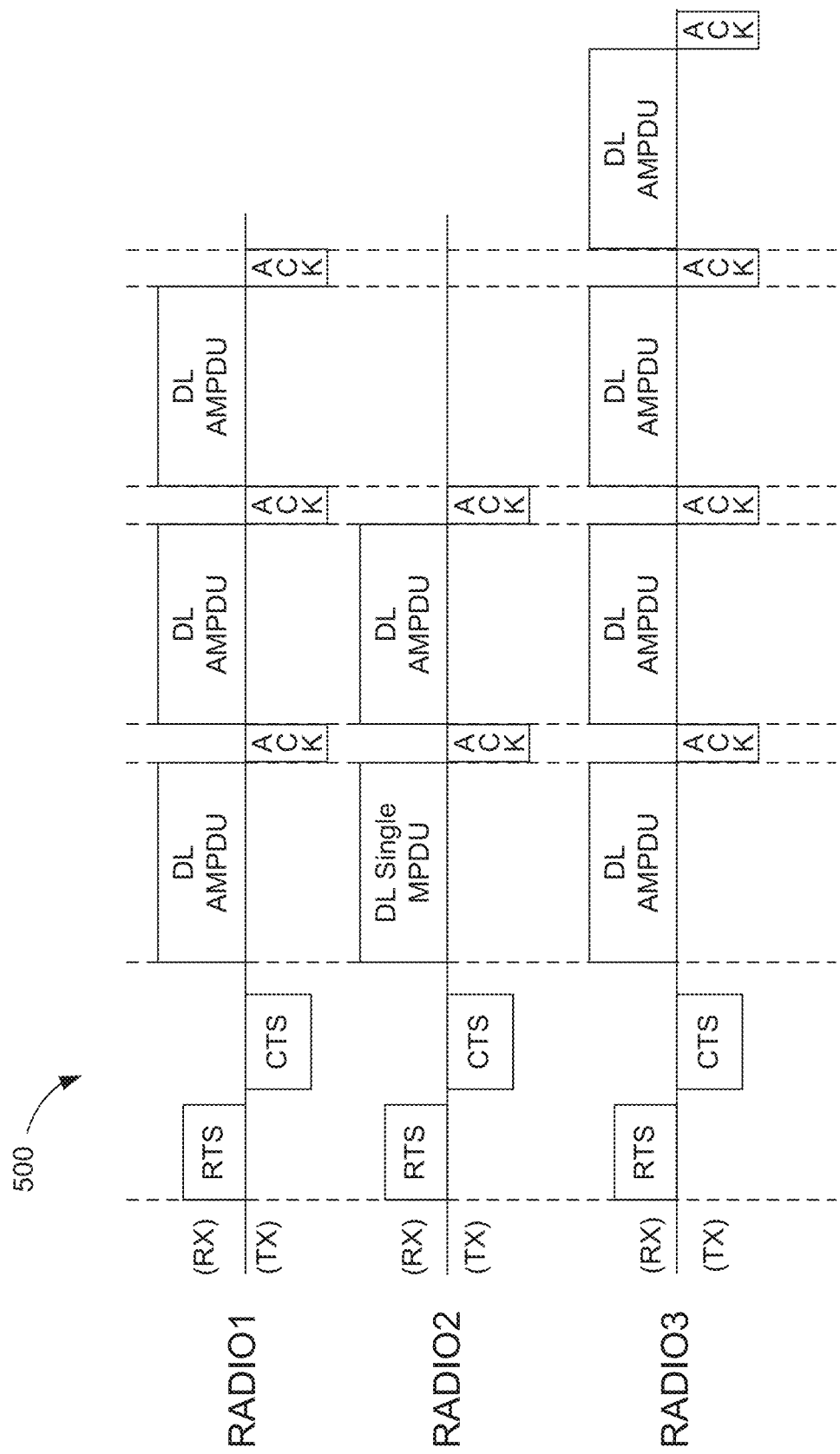
FIG. 5A is a timing diagram illustrating an example of synchronized operations of multiple radio circuits as coordinated by the coexistence controller in accordance with some embodiments.
Figure 6:
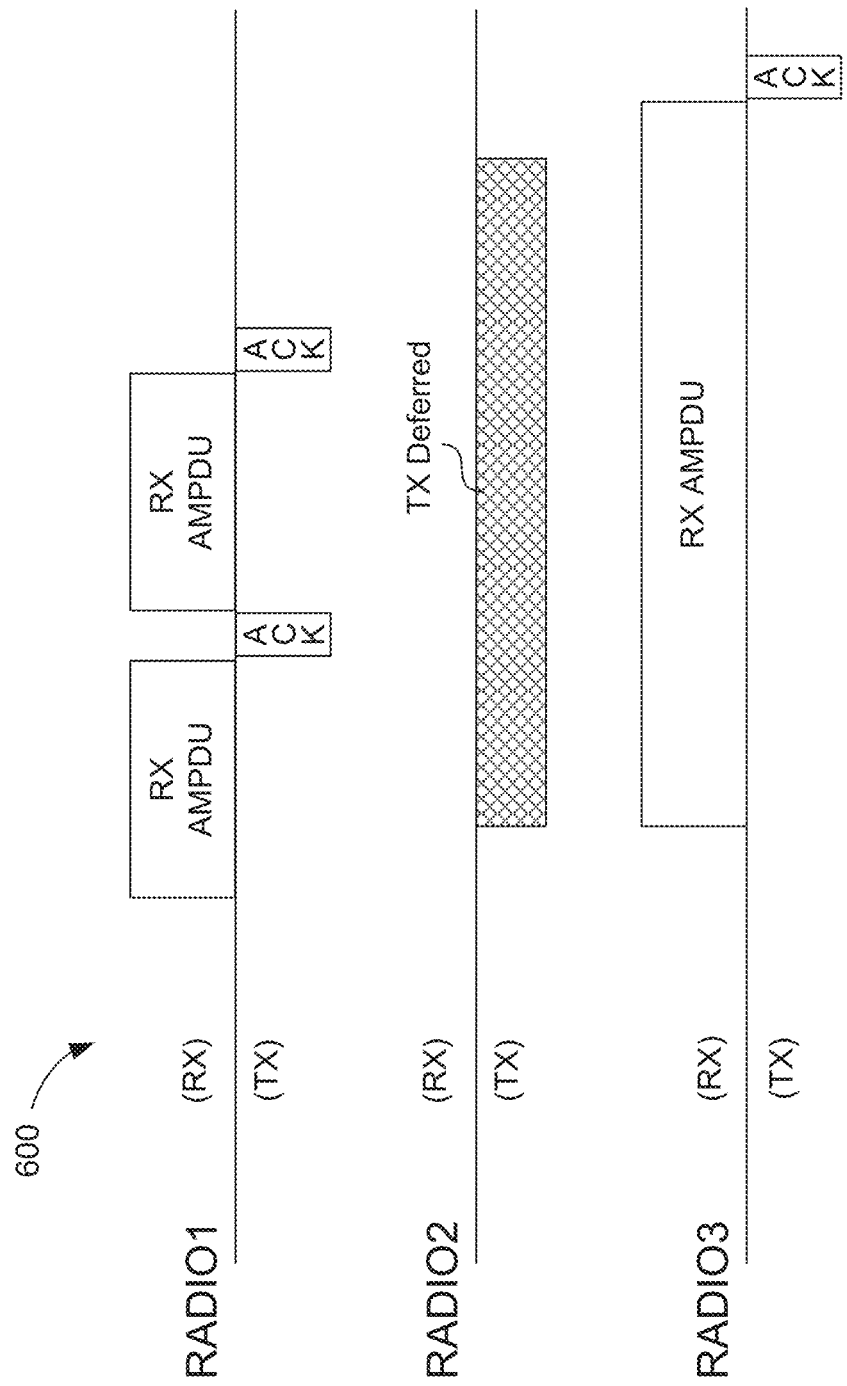
FIG. 6 is a timing diagram illustrating an example of unsynchronized operations of multiple radio circuits as coordinated by the coexistence controller in accordance with some embodiments.

FIG. 5A is a timing diagram 500 illustrating an example of synchronized operations of multiple radio circuits as coordinated by the coexistence controller in accordance with some embodiments, and FIG. 6 is a timing diagram 600 illustrating an example of unsynchronized operations of multiple radio circuits as coordinated by the coexistence controller in accordance with some embodiments. The coexistence mechanisms, which can be employed by the coexistence controller 230 (e.g., in concert with the coexistence bus 240) of FIG. 2A for implementing various homogeneous radio coexistence functionalities disclosed herein, are discussed in fuller detail below and with continued reference to FIG. 2A.

As previously mentioned, according to some embodiments, a combination of a coexistence bus (e.g., bus 240) connecting the lower MAC layers with a managing coexistence controller (e.g., controller 230) in MAC2 layer (and for some embodiments, in higher layers) may be deployed to implement the present disclosed embodiments. Depending on the implementation, one radio circuit (e.g., circuit 220a) or a group of radio circuits may be given the highest priority and act as master, or all radio circuits (e.g., circuit 220a-220c) can have similar priorities. Additionally or alternatively, priorities of the radios can be changed dynamically (e.g., depending on workload and other operating criteria) or can be changed over time (e.g., using time sharing mechanisms, round robin, or other suitable multi-access protocols). Depending on the embodiment, the coexistence mechanisms can involve only the MAC2 layer, only the upper MAC layer, or a suitable combination of both.

Although one benefit of the present embodiments is to avoid reception desensitization, other operating criteria (e.g., type of traffic, or fairness) may be taken into consideration by the coexistence controller 230 as well. In one example, the coexistence mechanism (e.g., as implemented by the coexistence controller 230 and the coexistence bus 240) can assure that all wireless network circuits receive at least a chance to transmit; other operating criteria can include fairness among all the radios for transmission, or the operating criteria can include a starvation policy. In some embodiments, quality of service (QoS) can be taken into account when the coexistence mechanism determines which radio circuits gets to transmit and when. In some embodiments, even when during the period when a radio circuit is suppressed or disabled by the coexistence mechanism, certain short transmission of acknowledge (ACK) packets can be allowed; this technique can be helpful in some cases where channel coding is used.

Also, it is noted that in some mechanisms the transmission suppression or suspension may not be required due to other suitable software and hardware techniques used.

As such, according to some embodiments, the coexistence mechanism can synchronize the transmitting and receiving operations to increase or maximize the total wireless network's throughput (TPUT) or bandwidth. Such synchronized operations are illustrated in diagram 500. In diagram 500, all transmitting operations and receiving operations are synchronized among all wireless network circuits 220a-220c so that the circuits 220a-220c only perform either transmission or reception at any given moment of time. This technique can avoid the desensitization caused by different homogeneous radios transmitting and receiving at the same time, such as illustrated in table 202 of FIG. 2B. It is noted that AMPDU, AMSDU, or a combination of both may be used in downlink data packets. For the example that is shown in diagram 500, the downlink (DL) data packets are illustrated as comprising DL AMPDU and Single MPDU. Optionally, Request to Send (RTS) and Clear to Send (CTS) handshake packets can be exchanged between the sender (e.g., client devices 130, FIG. 1) and the base station 210 before the data transmission/receiving operations. In addition or as an alternative to increasing throughput, the coexistence mechanism may be used to coordinate the radios to achieve better delay requirement or other quality of service (QoS) metrics for one or more of the radios.

More specifically, as shown in FIG. 5A, the coexistence mechanism can align the downlink packet transmissions (or receiving operations) of a number of selected wireless network (e.g., WLAN) circuits operating on different channels in the same frequency band for synchronized operations. In some embodiments, the packets received by different radio circuits need to have the same duration in the downlink, and in such embodiments, frame padding may be performed by the coexistence controller 230 to make data packets (e.g., received on the downlink) among the radio circuits 220a-220c become the same size.

Figure 5B:
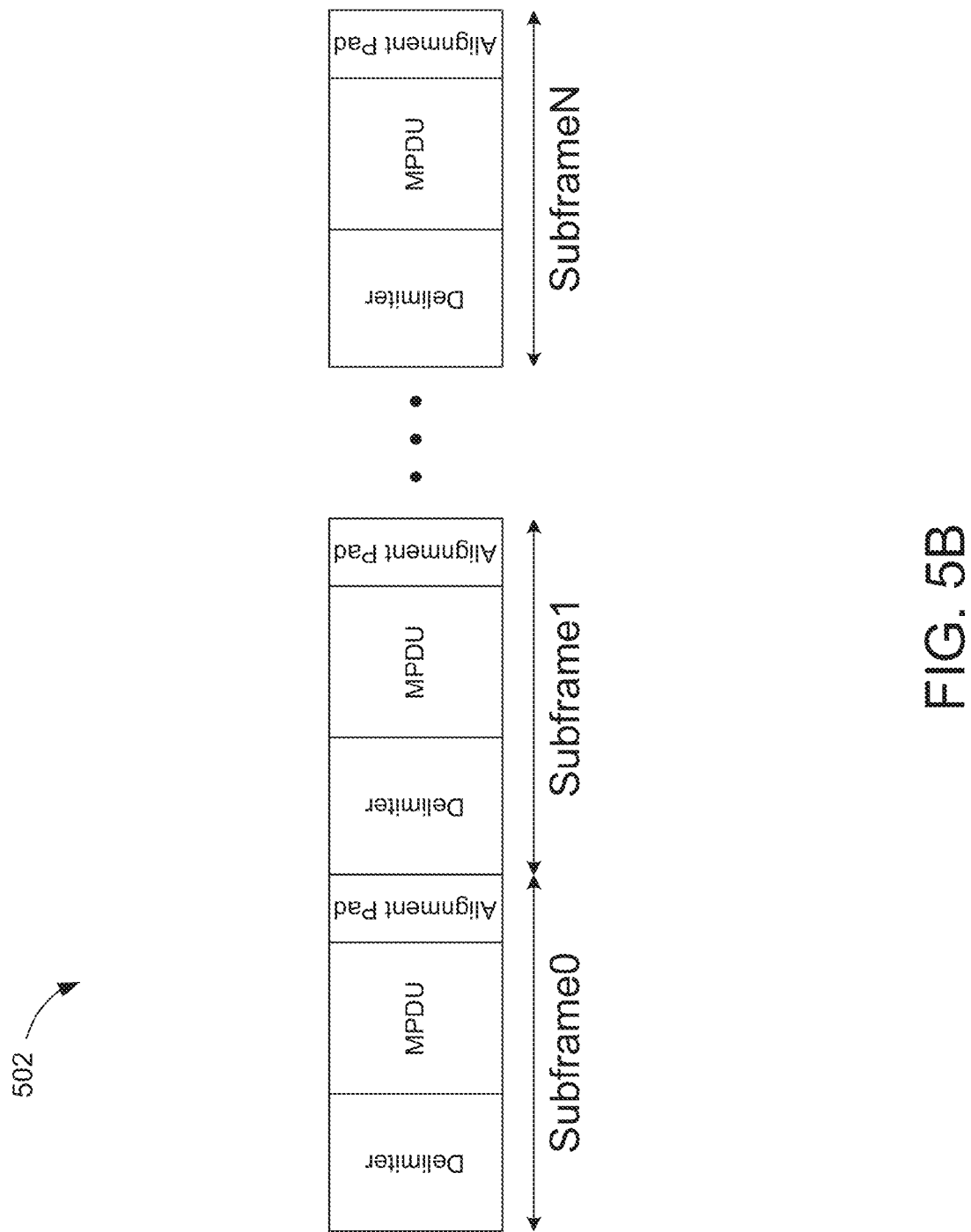
FIGS. 5B-5D further illustrate additional details of the synchronized operations of FIG. 5A in accordance with some embodiments.
Figure 5C:
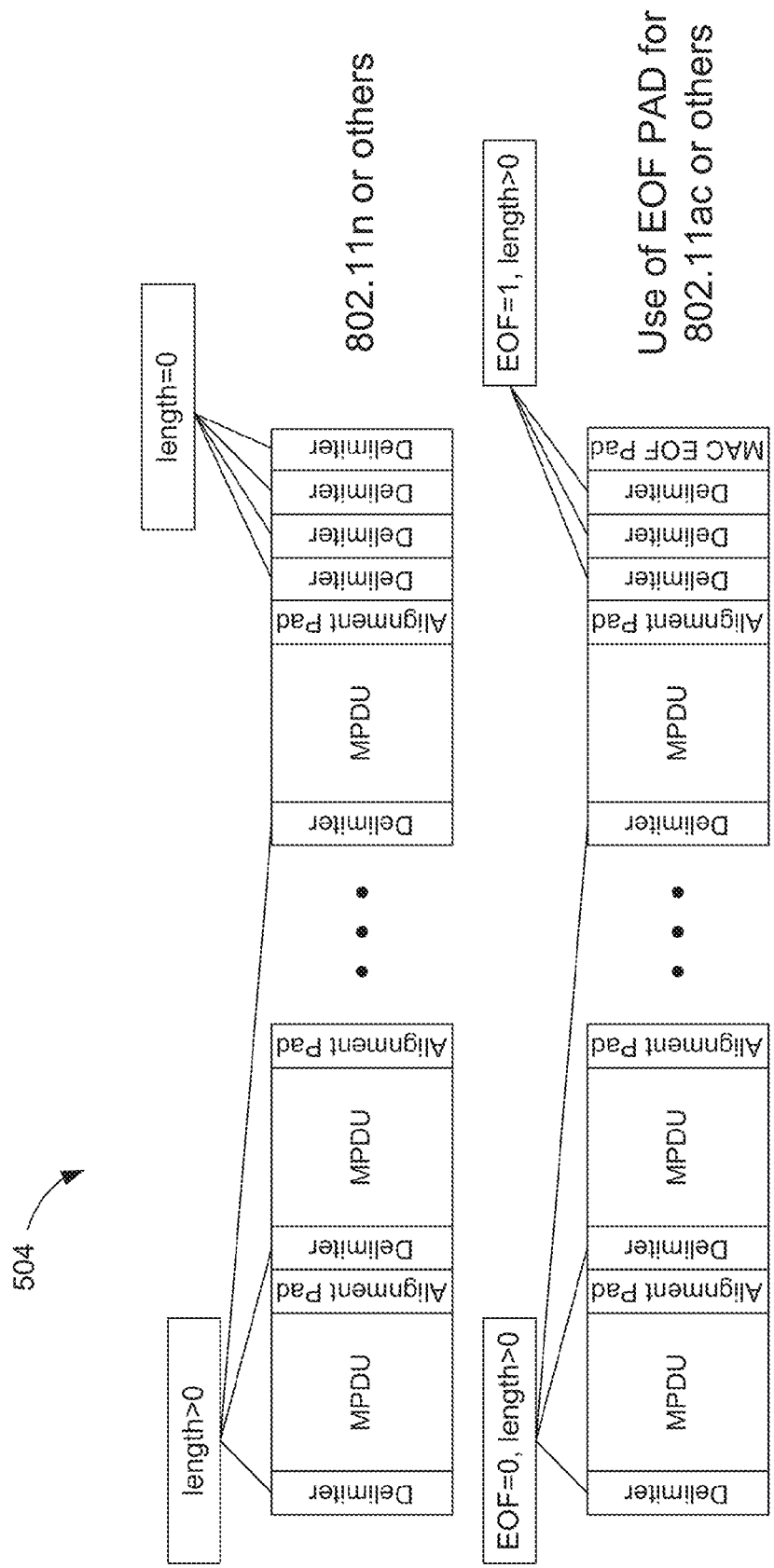
Figure 5D:
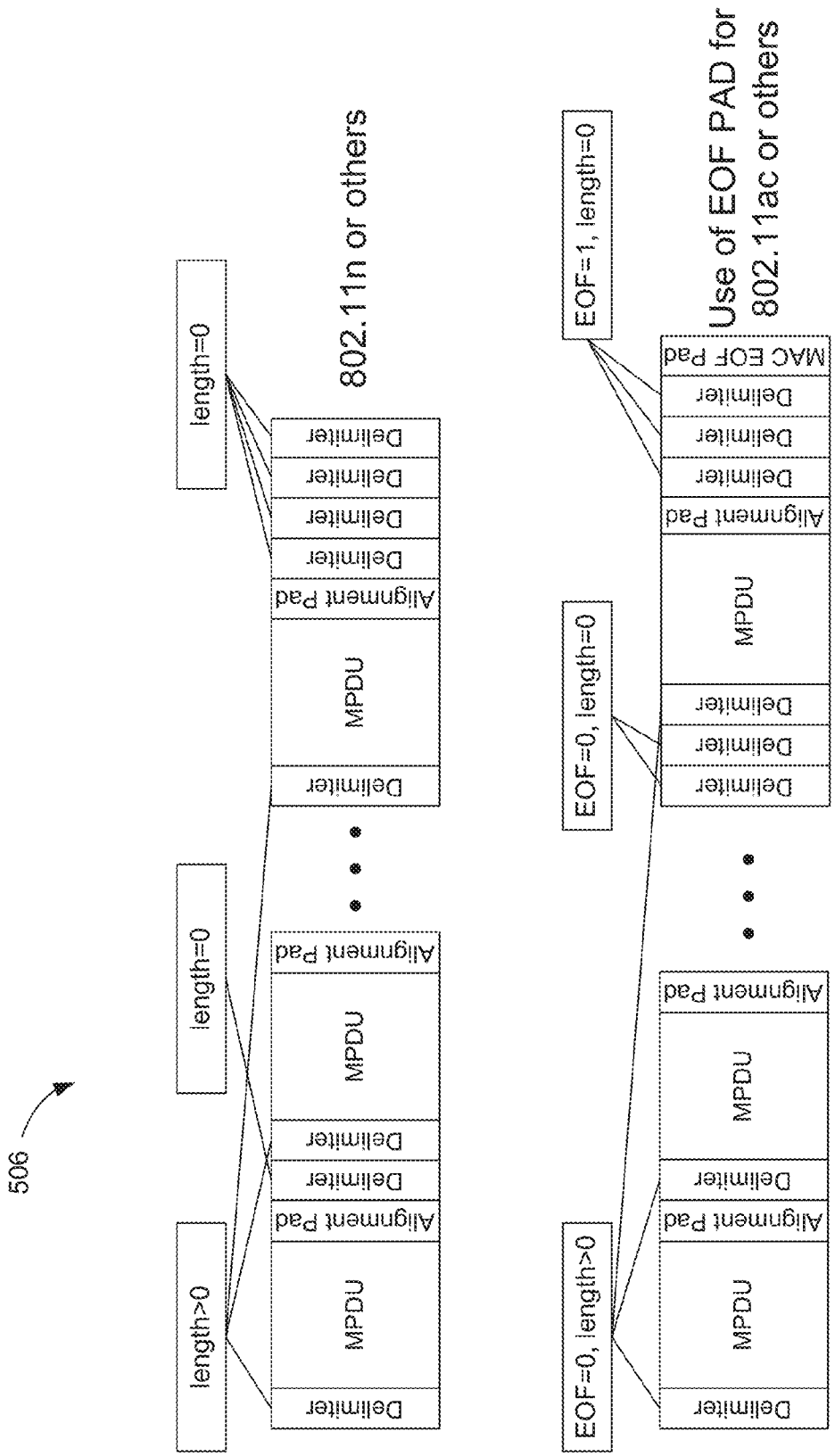

FIGS. 5B-5D further illustrate additional details of the synchronized operations of FIG. 5A, including some examples of the padding techniques which can be utilized by the coexistence mechanism, in accordance with some embodiments.

Continuing with the example of FIG. 5A where the AMPDU is used in downlink (DL) data packets, diagram 502 of FIG. 5B depicts a typical structure of the AMPDU subframe. In accordance with one or more embodiments, each AMPDU subframe can include an MPDU delimiter, which can optionally be followed by an MPDU. Additionally, zero length delimiter can also be used. Although not shown in FIG. 5B for simplicity, the "length" field of the MPDU delimiter can include different number of bits based on the type of IEEE 802.11 packet or other suitable requirements as the network technology being used so requires.

In the example shown in diagram 504 of FIG. 5C, one or more zero length delimiters are added to make AMPDUs of different homogeneous radio circuits (e.g., IEEE 802.11n versus IEEE 802.11ac, as illustrated in FIG. 5C) the same size in order to align the packets. It is noted that, in diagram 504, the delimiters are added at the end of the frames; however, other suitable locations may be used. For example, in diagram 506 of FIG. 5D, the zero length delimiters are shown to be used in the middle of the packets.

Further, the coexistence mechanism can also transmit the uplink response packets simultaneously or nearly simultaneously (e.g., within an error margin as defined by the IEEE 802.11 specification), such as shown in the diagram 500 of FIG. 5A. Some embodiments of the coexistence mechanism can also employ different modulations and/or can include different number of bytes in a PHY or MAC payload in order to transmit and/or receive different packets on different channels.

As an additional or alternative embodiment to synchronized transmitting and receiving operations, the coexistence mechanism can employ unsynchronized operations as well. In unsynchronized operations, transmitting or receiving operations on different network circuits (and preferably each on different channels) can be prioritized by the coexistence controller 230 using the aforementioned operating criteria (e.g., based on the nature of the data traffic, fairness, starvation avoidance policies (which may be based on different hierarchies of payment plans, for example), and so forth) in manners discussed above. For example, as shown in diagram 600 of FIG. 6, radio circuit 2's transmission is delayed or deferred because radio circuit 1 is already receiving (e.g., because radio circuit 1 has higher priority). Notably in the example diagram 600, radio 1 can still transmit the ACK packets during radio 3's receiving operation. This may be because the coexistence controller 230 determines that the interference caused by the transmission of ACK packets may be tolerated (e.g., because the transmission is short, because the transmission can be performed successfully at an attenuated power level, or because other suitable reasons such as those discussed above), or simply because radio 1 has a higher priority than radio 3.

Figure 7A:
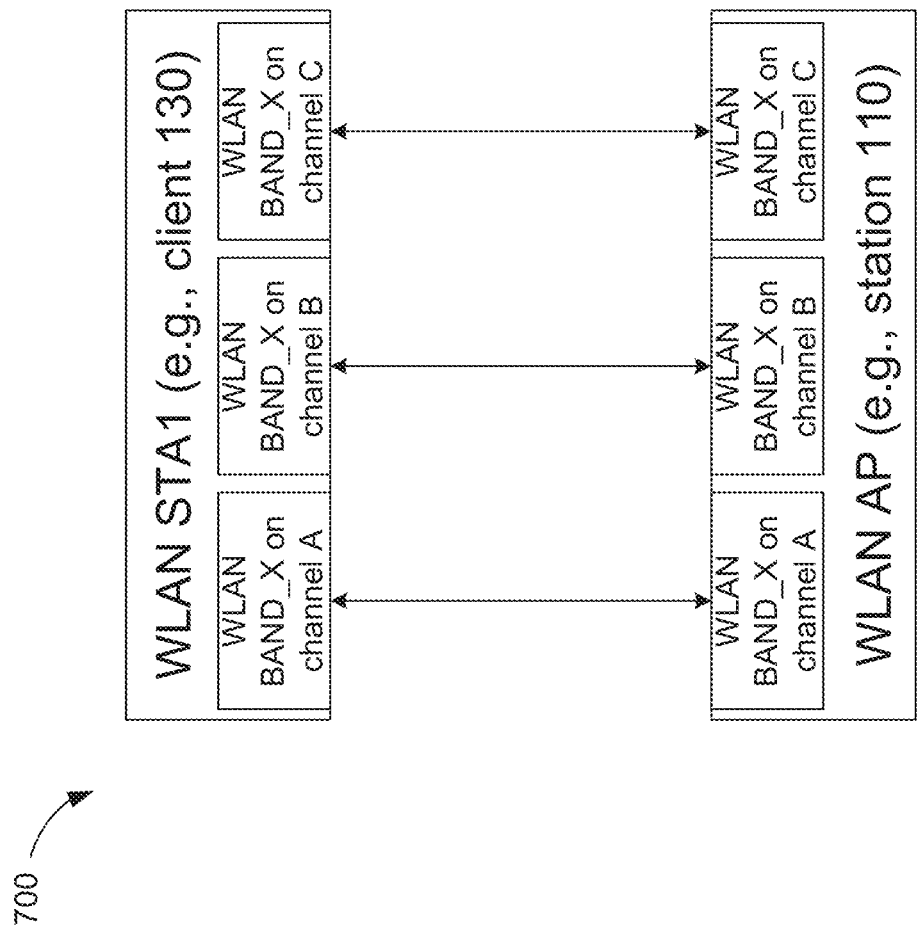
FIG. 7A is a functional diagram illustrating an additional mode in which the present embodiments can operate, in accordance with some embodiments.

FIG. 7A is a functional diagram 700 illustrating an additional mode in which the coexistence controller 210 (FIG. 2A) can operate, in accordance with some embodiments. As illustrated in diagram 700, the coexistence controller 210 (e.g., as implemented in a base station such as station 110, FIG. 1) can coordinate with a client (e.g., client devices 130a-130n) with another plurality of wireless network circuits in a way such that a respective network circuit on the network device communicates with a corresponding network circuit on the client using a uniquely designated channel.

For example, if a Wireless LAN access point is equipped with 3 wireless network circuits, and if a client device is also equipped with 3 wireless network circuits, then the coexistence controller 230 can coordinate (e.g., using suitable standard or customized protocols) with the client device so that each radio circuit on the access point can communicate with a corresponding radio circuit on the client device on a channel different than the others such that interference can be reduced while increasing the bandwidth. In other words, a first wireless network circuit on the access point can use channel A exchange data with a first wireless network circuit on the client device, a second wireless network circuit on the access point can use channel B exchange data with a second wireless network circuit on the client device, and so forth.

It is noted that the client may also have to implement the coexistence mechanisms disclosed herein in order to perform this kind of channel coordination/bandwidth aggregation/interference reduction techniques with the base station.

Furthermore, in some examples where a client device with multiple radios and implementing the coexistence mechanisms disclosed herein is connected to the base station 210, the coexistence controller 230 can reorder the received frames from the various connected client devices and deliver them in sequence to the higher layer (e.g., the IP layer), in addition to functionalities already mentioned above. In some embodiments, the coexistence controller 230 can be coupled to a reorder buffer (not shown for simplicity) for performing the reordering tasks.

Also, since the embodiments of the coexistence controller 230 can control multiple Wireless LAN radio circuits separately, in some implementations, a select number of radio circuits may be operated to act as access points (APs) while another selected number of radio circuits may be operated to act as clients. This technique may be useful for range extension or other suitable purposes.

Optionally, the coexistence controller 230 can implement WiFi Direct, Peer-to-Peer, or any other IEEE 802.11 or WiFi optional features using one or more of the radio circuits equipped on the base station 210.

Figure 7B:
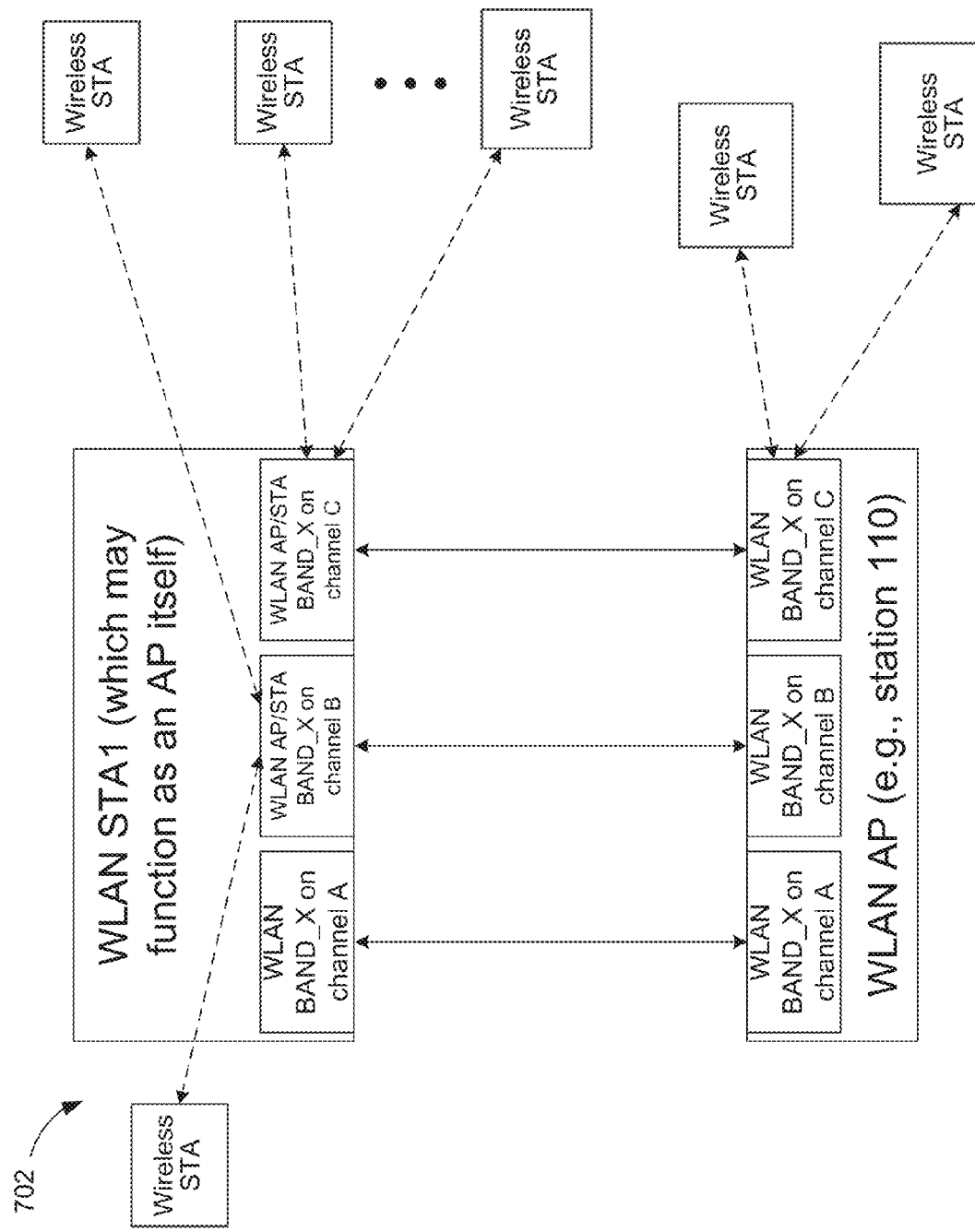
Figure 7D:
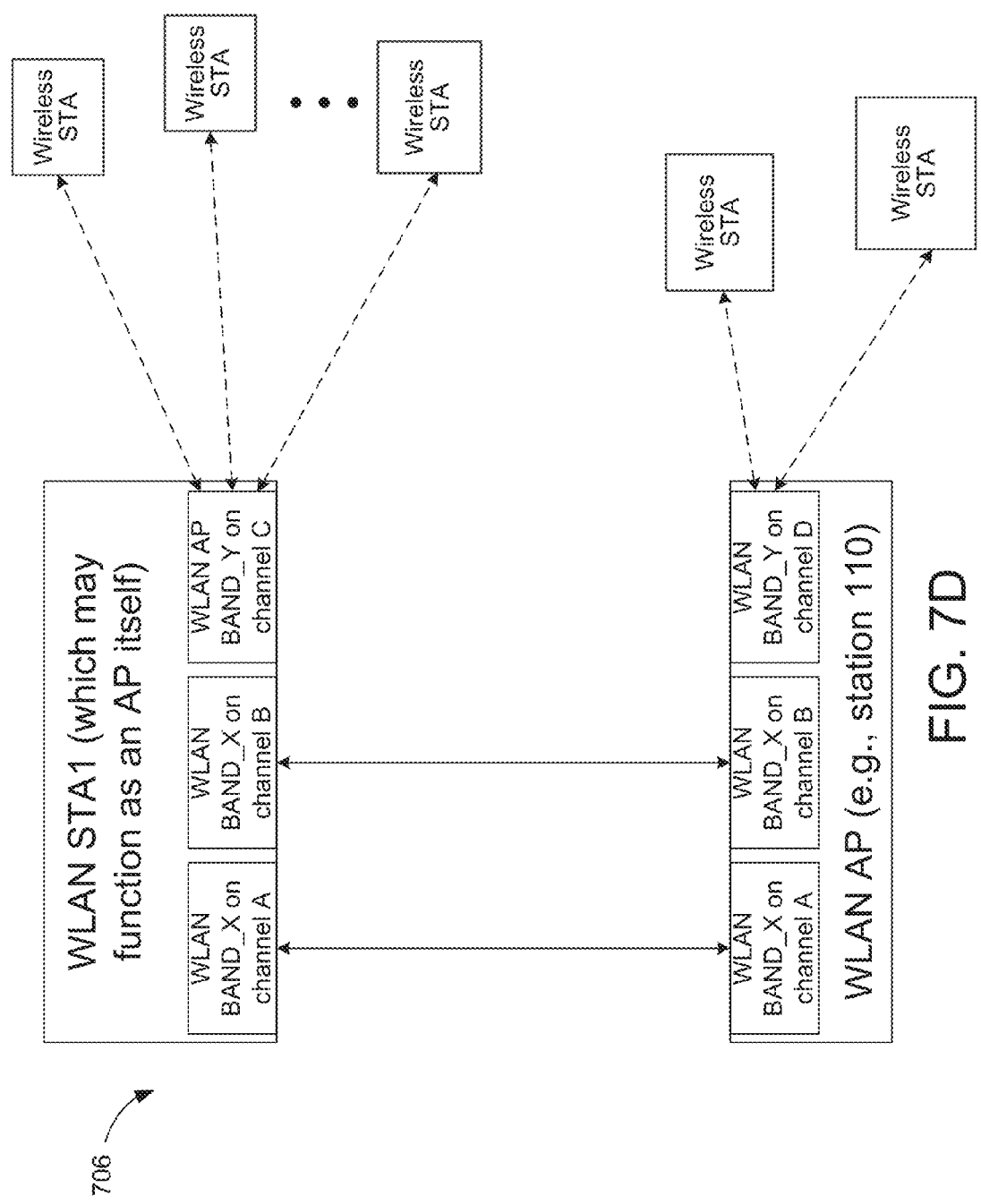

FIGS. 7B-7D are functional diagrams illustrating some specific example scenarios in which the WLAN access point and WLAN station of FIG. 7A may be operated. In FIGS. 7B-7D, the WLAN station connected to the WLAN AP may itself function as an AP for other wireless stations.

Channel Steering

In addition or as an alternative to the aforementioned functionalities, some embodiments of the coexistence controller 230 can dynamically determine (e.g., during the base station 210's normal operations and based on operating criteria) and distribute the connected client devices 130 onto different wireless network circuits 220a-220c and/or different channels. For purposes of discussion in this section, it is assumed that each of the radio circuits operates on a different channel in the same frequency band; however, different combinations of switching network circuits and/or channels can be implemented or executed by the coexistence mechanism disclosed herein.

More specifically, the coexistence mechanisms (e.g., as implemented by the coexistence controller 230 and the coexistence bus 240) can associate the client stations to the base station 210 onto different channels. Because the base station 230 includes a plurality of wireless network circuits each capable of operating on a different channel, in one or more implementation, the multi-channel base station 210 can employ the coexistence controller 230 to steer client devices onto different channels based on operating criteria (e.g., such as those mentioned above). In other words, the coexistence controller 230 can decide which client station is to be connected to which network circuit (and its associated channel) based on the operating criteria.

In addition or as an alternative to those aforementioned operating criteria, some examples of the operating criteria can include: load distribution and balancing among the channels, any throughput requirement, any QoS requirement (e.g., delay, jitter, packet error rate, throughput specification, etc.), any interference from other radios in each channel, any interference from other Wireless LAN or other radios (e.g., operated by other nearby base stations or clients with overlapping basic service set identifications (BSSID)), any interference from non-WLAN-related devices (e.g., microwave oven), and so forth.

In some embodiments, the coexistence controller 230 is situated on top of MAC layer (e.g., as the MAC2 layer such as illustrated in FIGS. 4A and 4B) for management of the radio circuits, which each may include their own MAC and PHY circuitry. It is noted that other layers in the network stack (e.g., other layers in the OSI model) can also be used for management of the multiple wireless network (e.g., WLAN) circuits.

According to one or more embodiments, the coexistence controller 230 can also enforce the selection by making sure the client device cannot associate itself on any other unauthorized channels. In some addition embodiments, the coexistence controller 230 can function in a way such that the communication interface to an upper layer (e.g., the network layer or IP layer in the OSI model) remains the same. It is noted that, after a client device is associated to the base station 210, the coexistence controller 230 may need to pass the data packets designated for a client device to the MAC layer of a corresponding radio circuit that services the channel with which the client device is associated or assigned.

Moreover, after a client device is connected to a network circuit and associated with a channel, the coexistence controller 230 can move the client device from one channel to another channel when such move becomes desirable. For example, if the data traffic workload aggregated from all client devices connected to one network circuit exceeds or about to exceed the service capacity of the network circuit, then the coexistence controller 230 can selectively move some of the connected clients to another wireless network circuit. For another example, if the interference on a channel (e.g., as observed by the network circuit operating on the channel) increases to level that exceeds a maximum threshold (e.g., so that current connected client devices may not be serviced properly), then the coexistence controller 230 can selectively move some of the connected clients to another wireless network circuit. For some embodiments, if the channel condition on another channel becomes better than the current channel (e.g., because removal of an interference source), then the coexistence controller 230 can selectively move some of the connected clients to another wireless network circuit. In some embodiments, typical channel switch announcement may be used to move the client devices from one channel to another channel. Specifically, in some embodiments, channel switch announcement or other methods in IEEE 802.11h may be used to move a station from one channel to another channel. It is noted that techniques similar to those described in IEEE 802.11h can be adapted by some embodiments of the present disclosure to resolve interference issues introduced by the use of IEEE 802.11a/n/ac in some locations, and in particular for military, weather radar systems or other suitable devices such as medical devices.

In addition, in some other embodiments, the AP may disassociate or de-authenticate selected clients on a channel without using a channel switch announcement. The reason for not using a channel switch announcement may be, for example, lack of support on the client side. In some other examples, the AP may decide not to use a channel switch announcement due to lack of time because the AP may need to move some clients away from a certain channel as soon as possible.

Also, some embodiments of the base station 210 can keep/migrate all the state information (e.g., network settings, hardware configuration information, etc.) for the client device when the client device is switched from one channel to another to minimize the switch time.

Figure 8:
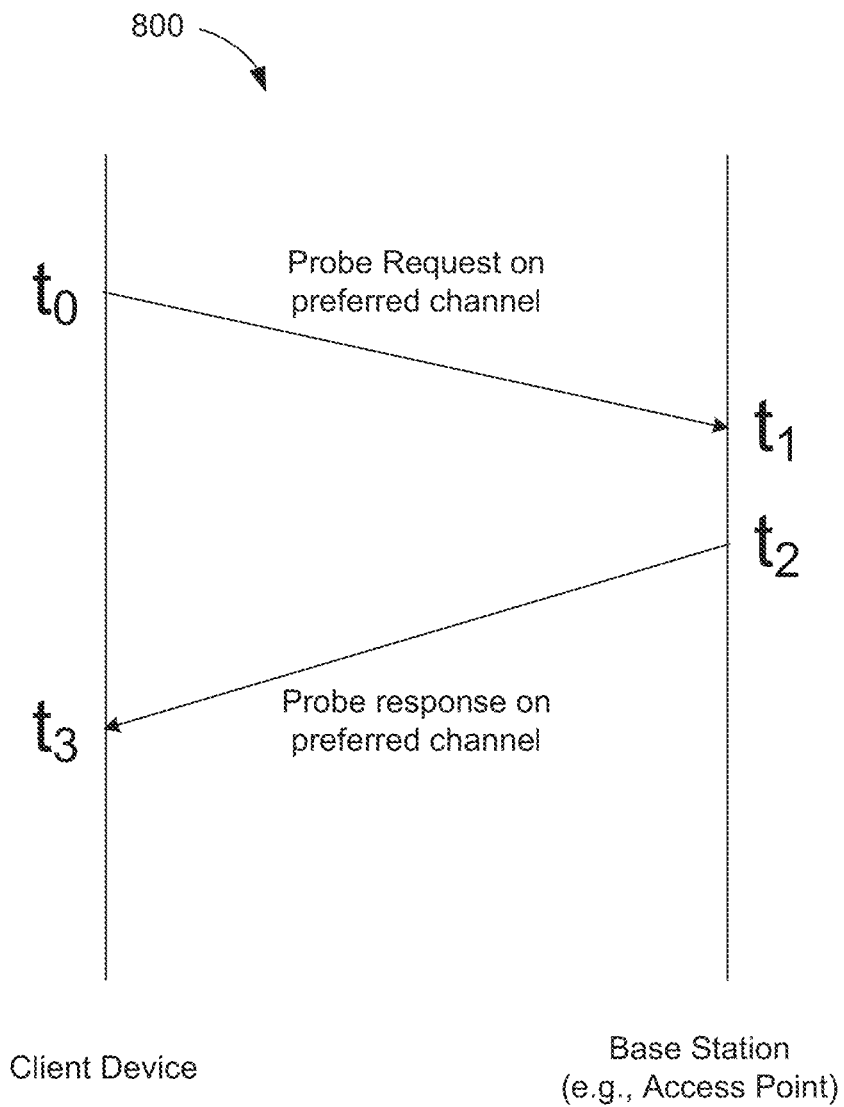
FIG. 8 is a diagram illustrating a probe request procedure on a preferred channel which can be implemented by the coexistence controller in accordance with some embodiments.
Figure 9:
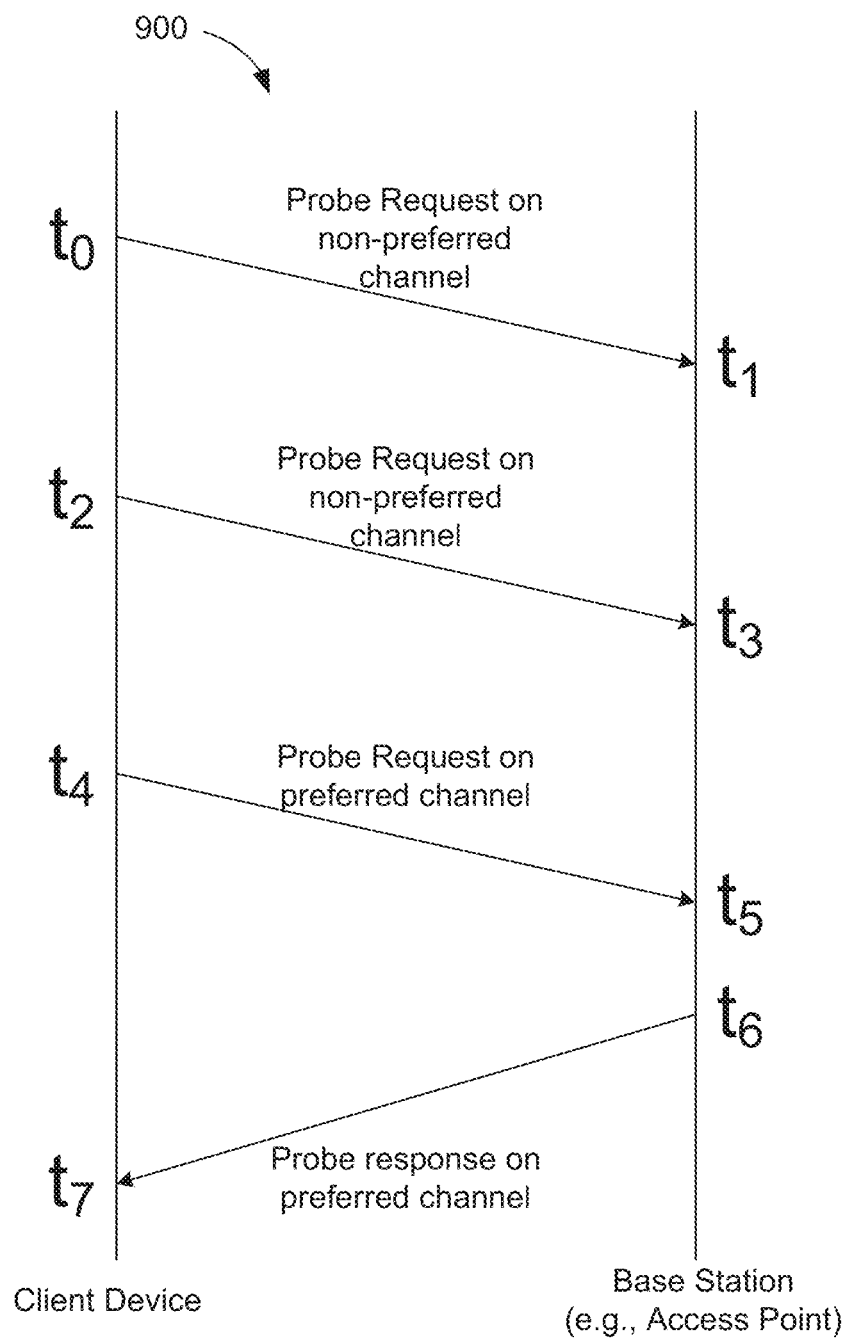
FIG. 9 is a diagram illustrating a probe request procedure on a non-preferred channel which can be implemented by the coexistence controller in accordance with some embodiments.

FIG. 8 is a diagram 800 illustrating a probe request procedure on a preferred channel which can be implemented by the coexistence controller 230 in accordance with some embodiments, and FIG. 9 is a diagram 900 illustrating a probe request procedure on a non-preferred channel which can be implemented by the coexistence controller 230 in accordance with some embodiments.

With continued reference to FIG. 2A, some specific examples for implementing the channel steering techniques are now discussed. In these examples where the wireless network circuits are IEEE 802.11 WLAN circuits, the following management frames are some examples among the frames that can be used by the coexistence controller 230 for the channel steering techniques: Probe Request, Probe Response, Authentication, De-authentication, Association Request, Association Response, Re-association Request, Re-association Response, and Disassociation. The following examples are described using IEEE 802.11 terminologies; however, it is noted that these examples are provided herein to provide a better understanding of the coexistence mechanisms, and that neither these IEEE 802.11 management frames nor IEEE 802.11 WLAN circuits are necessary in practicing the present embodiments.

As mentioned, the coexistence mechanism disclosed herein can steer a connecting client to a specific channel/network circuit at time of association, and can also steer a client to another specific channel/network circuit after the device is already connected.

Accordingly, in some embodiments, when a client device tries to connect with the base station 210, the coexistence mechanism may choose not to respond to a probe request, authentication request, or association request from the client device on a non-preferred channel. More specifically, assuming channel B is a preferred channel, and channel A is a non-preferred channel, when the client device sends a probe request to the base station 210 on a non-preferred channel A, the coexistence controller 230 can make a determination so as to ignore the probe request on the non-preferred channel A. On the contrary, when the client device sends a probe request on a preferred channel B, the coexistence controller 230 can respond to that probe request so that the client device can connect to the base station 230 on the preferred channel B. Additionally, the coexistence controller 230 can choose to cause the base station 210 not to broadcast the service set identification (SSID) on a channel that is already at its maximum capacity so as to avoid a client device from requesting association to a non-preferred channel. It is noted that similar mechanisms depicted in FIGS. 8-9 can be applied to Authentication Request, Association Request, or other forms of known pre-association or post-association requests.

Additionally or alternatively, it is recognized in the present disclosure that a client device may still attempt to associate with the wireless base station 210 on the non-preferred channel instead of switching to other channels even when the client device receives no response. As such, some embodiments of the wireless base station 210 may select a maximum number of requests to ignore; for example, the base station 210 can ignore the first M association requests on the non-preferred channel, but if the client device continues and try for the (M+1)th time on the same non-preferred channel for association, then the base station 210 can associate the client device on the non-preferred channel in order to avoid a complete denial of service to that client device. In this particular example, the coexistence controller 230 may choose to then move the client device from the associated non-preferred channel to a preferred one after the connection.

An example association procedure in which the client device associates with the base station 210 via a wireless signal (e.g., such as a Probe Request) on a preferred communication channel is depicted in diagram 800. During normal operations, the client device may initiate a Probe Request at time t0 on a preferred channel of the base station 210. Then, the Probe Request is received by the base station 210 at time t1.

After receiving Probe Request at time t1, the base station 210 determines whether the Probe Request is received on a preferred channel. In the illustrated example of diagram 800, because the Probe Request is received on the preferred communication channel of the base station 210 (e.g., as determined by the coexistence controller 230), the base station 210 transmits a responsive signal (e.g., a Probe Response) on the preferred communication channel at time t2. The Probe Response on the preferred channel is received by the client device at time t3. Thereafter, the Wireless LAN circuit located on the base station 210 become a candidate to the client device for association and available for data communication.

An example association procedure in which the client device associates with the base station 210 via a wireless signal (e.g., such as a Probe Request) on a non-preferred communication channel is depicted in diagram 900. During normal operations, the client device may transmit a Probe Request on a non-preferred communication channel of the base station 210 at time t0. The base station 210 receives the Probe Request on the non-preferred communication channel from the client device at t1.

Then, according to some embodiments, the base station 210 can choose to ignore the Probe Request, thereby triggering the client device to transmit another Probe Request on another communication channel which may be the base station 210's preferred channel. It is noted that, while many Wireless LAN clients available on the current market may try to sense probe requests on another channel when they do not hear probe requests on one channel, some embodiments of the client device disclosed herein may also implement the coexistence mechanisms so that the client device would switch the channel on which it sends the Probe Request based on prior information. In some embodiments, the base station 210 may also choose to use suitable communication methods to notify the client device of the base station 210's currently preferred channel(s).

In the example illustrated in diagram 900, the client device switches the channel twice and transmits a Probe Request on the preferred communication channel of the base station 210 at time t4. This Probe Request is received by the base station 210 at time t5. In response, at time t6, the base station 210 transmits a Probe Response on the preferred communication channel to the client device, and the Probe Response is received by the client device at time t7. Thereafter, the Wireless LAN circuit located on the base station 210 become a candidate to the client device for association and available for data communication.

Moreover, when a communication channel to which the client device is already connected becomes a non-preferred channel, the coexistence controller 230 can steer a client to another specific channel/network circuit. More specifically, in some examples, the base station 210 can send a De-authentication message at a proper time (e.g., when time critical traffic exists or is anticipated), and when the client device tries to re-authenticate, the base station 210 does not respond to the client device's Probe Requests to access the base station 210. In this way, the client device can be triggered to attempt to re-authenticate on another channel which may be the base station 210's preferred channel.

In additional or alternative embodiments, the coexistence controller can also move the client device from a non-preferred channel to a preferred channel using one or more suitable communication protocols (e.g., channel switching procedures as specified in the IEEE 802.11h and/or the IEEE 802.11v directed roaming protocol). Also, in some embodiments, the current connection between the client device and the base station 210 can be maintained (e.g., without termination), and the client device can be moved to the preferred channel when the next time it connects to the base station 210.

The following are some examples of how the coexistence controller 230 may group the client devices. In all examples, the base station 210 is equipped with three wireless network circuits, one operating on channel A, another one operating on channel B, and the third one operating on channel C. Also, all of the wireless network circuits are operating at the same frequency band in these examples.

In one example, channel C has the best condition, and channel B has the worst condition. As such, because channel B experiences a lot of noise, the coexistence controller 230 can choose to move all client devices that are without delay or performance requirements to channel B. Channel C is the best channel, and the coexistence controller 230 can move those traffic types with the most stringent performance requirement (e.g., VoIP or Video Conference applications) to channel C. Depending on the channel A's condition, channel A can maintain a few devices with stringent performance requirement as well.

In another example, the coexistence controller 230 can group the client devices based on their traffic types (e.g., such as VoIP, Video-on-Demand, or other applications which only request best effort).

In yet another example, if all channels have similar capacities and similar conditions, then the coexistence controller 230 can combine and mix client devices with different type of traffic onto each channel for load balancing.

In an additional example, the coexistence controller 230 can group the client devices based on their respective power requirements so that those client devices which are limited in power resource (e.g., running on batteries) can transmit at a different power level (e.g., at a lower data rate) than those devices which are unlimited in power resource (e.g., plugged into an electrical outlet).

In other examples, the coexistence controller 230 can group the client devices based on their similarity in capabilities. For example, devices with multi-user multiple-input and multiple-output (MU-MIMO) capabilities can be grouped together on a channel different than the other devices.

Home Wireless Sensor Application

Figure 10:
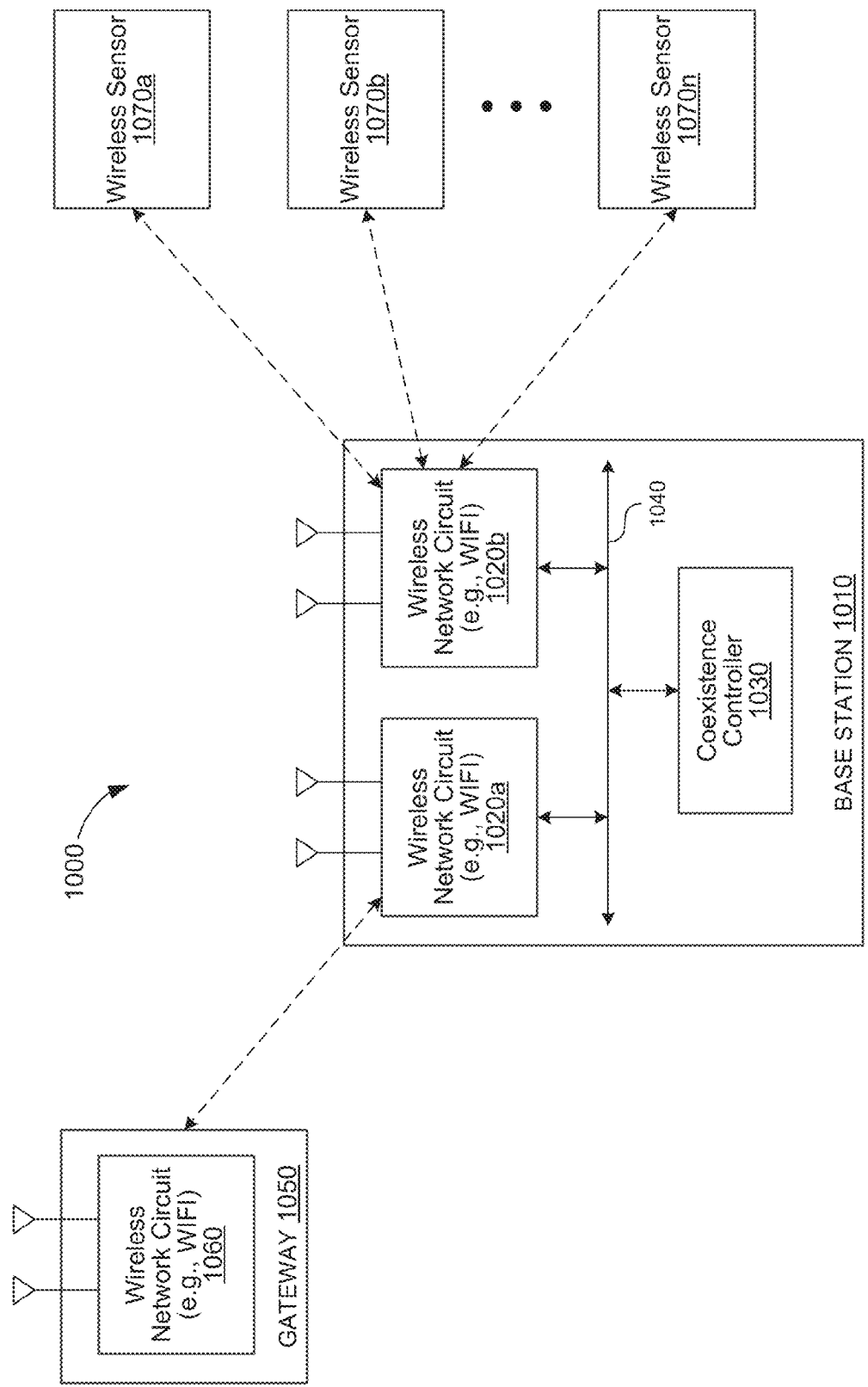
FIG. 10 is an abstract functional block diagram illustrating a wireless base station equipped with a coexistence controller implemented in an environment with a plurality of wireless sensors in accordance with some embodiments.

FIG. 10 is an abstract functional block diagram 1000 illustrating a wireless base station 1010 equipped with a coexistence controller 1030 implemented in an environment with a plurality of wireless sensors 1070a-1070n in accordance with some embodiments. The base station 1010 includes wireless network circuits 1020a and 1020b, both coupled to a coexistence controller 1030 via a coexistence bus 1040. In some embodiments, the wireless circuits 1020a and 1020b may be different discrete components, or they may be integrated into one or more chipsets.

A residential gateway 1050 is coupled to the base station 1010 to provide data communication services (e.g., to the Internet) to the base station 1010 and its clients (e.g., sensors 1070). The gateway 1050 may be coupled to the base station 1010 via, for example, a wireless network circuit 1060 of the gateway 1050. For purposes of discussion herein, assume the network circuit 1060 is connected to the base station 1010 via the network circuit 1020a. Examples of the residential gateway 1050 may include a cable modem, a digital subscriber line (DSL) modem, a satellite modem, and the like. Although not shown for simplicity, the gateway 1050 can also be coupled to data traffic networks based on wireless telephony services (e.g., such as 3G, 3.5G, 4G LTE, and the like) in providing data services to the base station 1010.

The wireless sensor 1070a-1070n are sensors that are typically placed in a residential or an office environment. The sensors 1070a-1070n include wireless network capabilities for coupling to and communicating with the base station 1010. For purposes of discussion herein, assume the wireless sensors 1070a-1070n are connected to the base station 1010 via the network circuit 1020b. Some examples of the wireless sensor 1070a-1070n include door sensors, motion sensors, surveillance cameras, fire/smoke detectors, Carbon monoxide (CO) detectors, garage door openers, thermostats, cable television control boxes, gas meters, and so forth. Although not necessarily, one or more sensors of the sensors 1070a-1070n may typically have limited power resources (e.g., running only on batteries).

The base station 1010 is similar to the base station 210 of FIG. 2A, and in this specific settings, can be a base station designated for the wireless sensors including, for example, a home security console device such as provided by Comcast Corp., ADT Corp, or AT&T Corp. As illustrated in diagram 1000, the base station 1010 includes at least two wireless network circuits 1020*a* and 1020*b*, circuit 1020*a* being coupled to the gateway 1050 and circuit 1020*b* being coupled to the wireless sensors 1070*a*-1070*n*. In one or more embodiments, the base statin 1010 functions as a repeater which can pass data traffic (e.g., control commands) received from the gateway 1050 to the wireless sensors 1070*a*-1070*n*, and can pass data traffic (e.g., captured images, or alarm signals) received from the wireless sensors 1070*a*-1070*n* to the gateway 1050. Among other reasons, because the power limitation and other characteristics specific to the wireless sensors 1070*a*-1070*n*, it would be beneficial to separately connect the sensors 1070*a*-1070*n* to a separate wireless network circuit than that is used to connect the residential gateway 1050.

However, as previously mentioned, it is recognized that interference and desensitization can happen in settings where more than one wireless network circuits transmitting and receiving in the same frequency band and in close physical proximity. Specifically, when the base station 1010 is transmitting data to the wireless sensors 1070*a*-1070*n* using circuit 1020*b*, which can cause the reception of circuit 1020*a* to become desensitized, if the gateway 1050 attempts to communicate with the base station 1010 during the circuit 1020*b*'s transmission, the base station 1010 can miss the data sent from the gateway 1050, and therefore the gateway 1050 may have to retransmit. Luckily, the gateway 1050 typically does not have power resource concerns.

Similar situation can take place when the base station 1010 is transmitting data to the gateway 1050 using circuit 1020*a*, which can cause the reception of circuit 1020*b* to become desensitized, and if the gateway 1050 attempts to communicate with the base station 1010 during the circuit 1020*a*'s transmission, the base station 1010 can miss the data sent from the wireless sensors 1070*a*-1070*n*, and therefore the wireless sensors 1070*a*-1070*n* may have to retransmit. However, this may be undesirable because the wireless sensors 1070*a*-1070*n* may have power resource concerns, and retransmission can adversely impact the operating lifespan of the sensors 1070*a*-1070*n*.

Existing solutions can include using sectional antennas and creating enough shielding among the radio circuits. However, because the wireless sensors can be deployed in any location around the physical environment, it is desirable to have omnidirectional antennas so that the wireless communication coverage of the base station can be maximized.

Accordingly, in some embodiments, the coexistence controller 1030 can cause the wireless circuits 1020*a* and 1020*b* to operate in ways that do not cause interference or desensitization to one another. More specifically, the coexistence controller 1030 can utilize the coexistence mechanisms mentioned above, for example, to give priority to those data communications from the various wireless sensors 1070*a*-1070*n* by selectively suppressing the transmitting operations of the wireless network circuit 1020*a* during the receiving operations of the wireless network circuit 1020*b*. For example, the coexistence controller 1030 can suppress the transmission communication by disabling, postponing, attenuating the power level used in, reducing transmission rate of, or applying any other operating parameter adjustment techniques discussed herein onto, the transmission operations. In this way, the coexistence controller 1010 is able to suppress the transmitting operations of the network circuit 1020*a* in a way that maintains integrity of receiving operations of the network circuits 1020*b* (e.g., so that the receiving is not disrupted or corrupted). It is noted that some embodiments of the wireless network circuits 1020*a*-1020*b* operate on different channels (e.g., channels 1 and 6).

In some additional embodiments, the coexistence controller 1030 is configured to allow the network circuit being suppressed, during the suppression, to respond to high priority communication after every predetermined time period. For example, the Wireless LAN circuit being suppressed may still be able to respond to management packets.

In some embodiments, the coexistence controller 1030 can also operate the wireless network circuit 1020*b* in a way that reduces power consumption of the wireless sensors 1070*a*-1070*n*. For example, while the operations of the wireless network circuit 1020*a* remains unaffected (e.g., which can be optimized for speed performance, or other considerations), the operations of the wireless network circuit 1020*b* can utilize various parameters and options that are available in the IEEE 802.11 standards to save power on the sensors 1070*a*-1070*n*.

Specifically, there are two example power saving techniques existing in the IEEE 802.11 family of standards which can be adapted by the coexistence controller 1030 for reducing the power consumption on the wireless sensors 1070*a*-1070*n*. One example is known as the power saving poll (PS-Poll); the other example is known as the unscheduled automatic power save delivery (UAPSD).

In other embodiments, the coexistence controller 1030 can also utilize customized protocols or modified versions of standard protocols to communicate with the wireless sensors 1070*a*-1070*n* in order to assist the sensors 1070*a*-1070*n* in reducing power consumption. For example, the coexistence controller 1030 can cause wireless network circuit 1020*b* to operate on a modified version of wireless network protocol that has relaxed link upkeep standards, such as relaxing an ACK packet's response time from 1 milisecond to 2 seconds.

In addition examples, the wireless network circuit(s) (e.g., circuit 1020*b*) that connects to the wireless sensors 1070*a*-1070*n* can employ power saving mechanisms such as described in the IEEE 802.11ah standards in various frequency bands (e.g., 2.4 GHz, 5 GHz, or other bands). One or more embodiments can support client devices or sensors that can transmit traffic indication maps (TIM), and the coexistence controller 1030 can arrange traffic scheduling and give priority to a respective wireless circuit based on the received TIM information.

Further, for the client devices or wireless sensors that do not have TIM capacity, when the base station 1010 schedules or reserves a target wake time (TWT) for non-TIM-capable clients, the coexistence controller 1030 can also protect the scheduled TWT of the non-TIM-capable clients from being preempted by TIM-capable clients. In particular, for implementing this technique, the coexistence controller 1030 can indicate to TIM-capable clients a restricted access window (RAW) information, during which no TIM-capable clients can occupy the wireless network circuit. In some embodiments, the RAW information are included in an RPS element in the beacons sent from the base station 1030. In some embodiments, if the RPS element indicates that the RAW is allocated only to non-TIM-capable clients, then any TIM-capable client that checks the beacon should not access the wireless network circuit for the duration indicated by the "RAW Duration" field in the RAW information within the RPS element. In another example, if the scheduled TWTs for non-TIM-capable clients are periodic, then the base station 1030 may set up a periodic RAW operation, such as defined in Clause 9.19.4a.6 of the IEEE 802.11 standards.

In some embodiments, the coexistence controller 1030 can adopt known time division multiplexing (TDM) techniques in managing the wireless network circuits 1020a-1020b, and in some embodiments, certain time durations can be assigned to certain types of data traffic.

Figure 11:
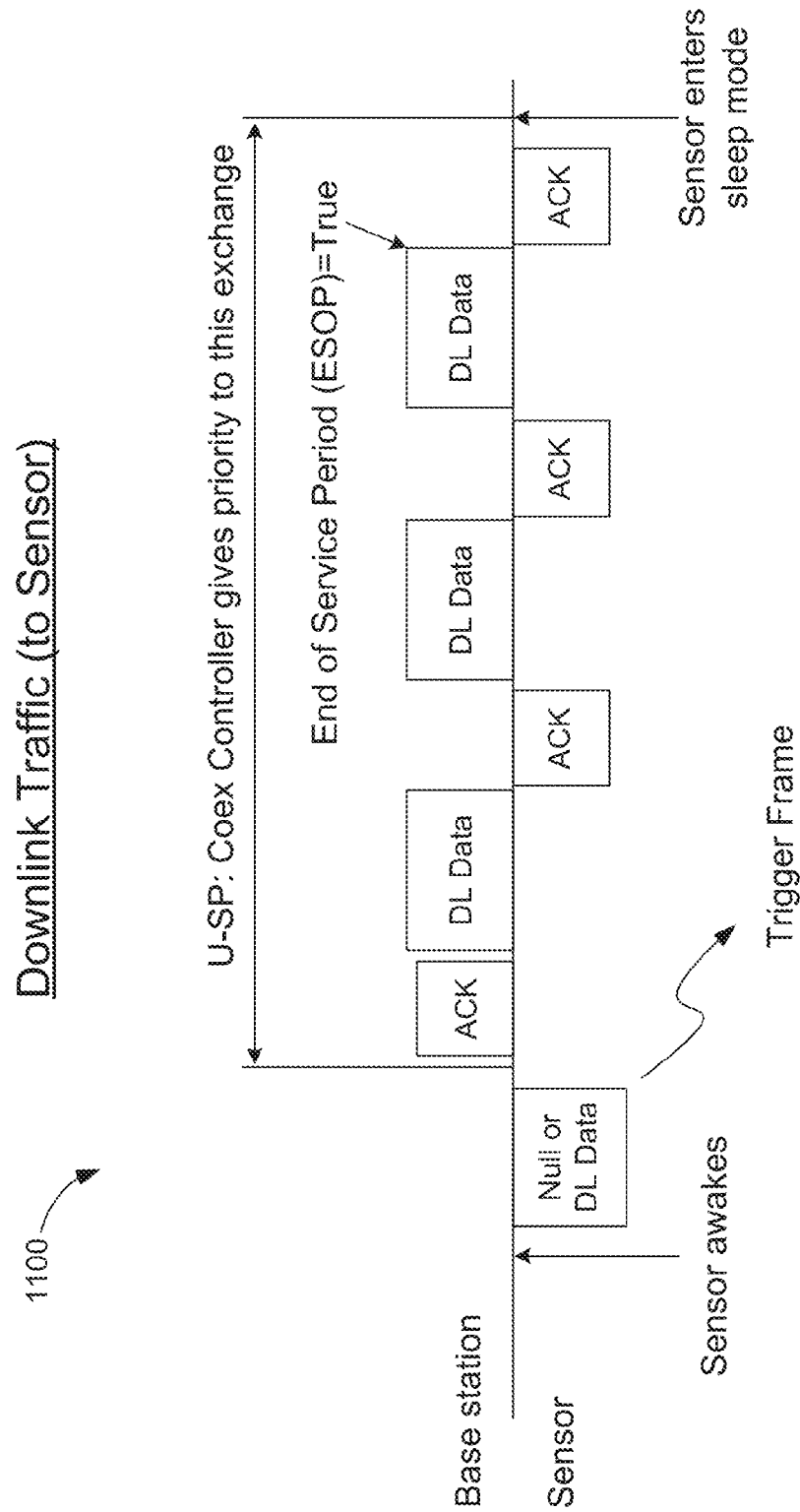
FIG. 11 is a timing diagram for handling downlink traffic from the base station to the wireless sensors of FIG. 10 in accordance with some embodiments.

FIG. 11 is a timing diagram 1100 for handling downlink traffic from the base station 1010 to the wireless sensors 1070a-1070n of FIG. 10 in accordance with some embodiments. As shown in diagram 1100, once the base station 1010 knows that a wireless sensor (e.g., sensor 1070a) wakes up, the coexistence mechanism in the base station 1010 can give priority to the downlink traffic to the wireless sensor 1070a. The sleep schedule of the wireless sensor 1070a can be transmitting or broadcasted using one or more suitable methods including, for example, utilizing beacons to transmit the traffic indication map (TIM) as described in the IEEE 802.11 standards. As such, in some embodiments, the coexistence controller 1030 can determine a reservation schedule in selectively suppressing the transmitting operations based on status signals received from one or more wireless sensors.

Figure 12:
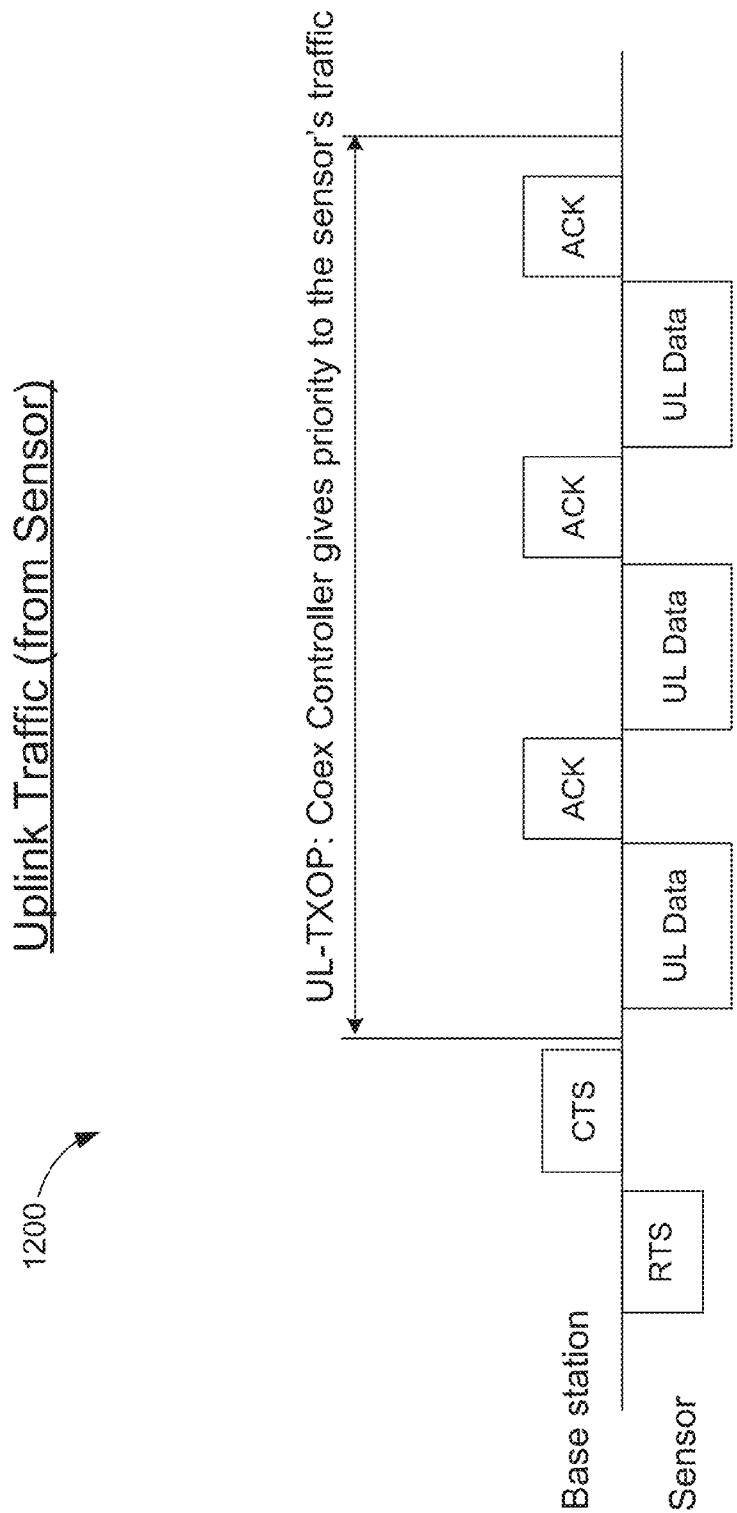
FIG. 12 is a timing diagram for handling uplink traffic from the wireless sensors to the base station of FIG. 10 in accordance with some embodiments.

FIG. 12 is a timing diagram 1200 for handling uplink traffic from the wireless sensors 1070a-1070n to the base station 1010 of FIG. 10 in accordance with some embodiments. Similar to diagram 1100, once the base station 1010 knows that a wireless sensor (e.g., sensor 1070a) starts to transmit data, the coexistence mechanism in the base station 1010 can give priority to the uplink traffic from the wireless sensor 1070a.

Figure 13:
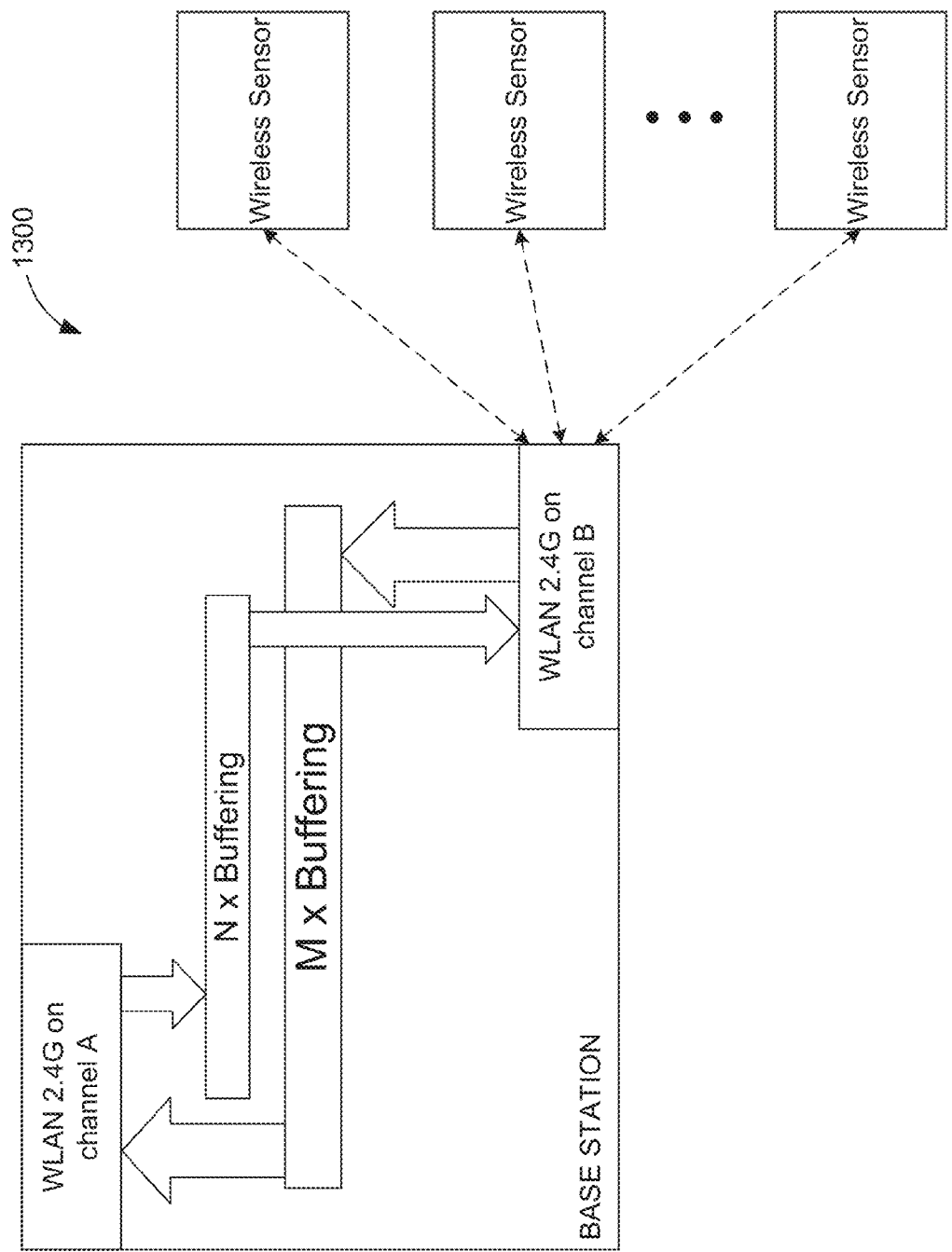
FIG. 13 is an abstract diagram illustrating an asymmetrical buffering structure or mechanism which can be adopted or controlled by the coexistence controller in accordance with some embodiments.

FIG. 13 is an abstract diagram 1300 illustrating an asymmetrical buffering structure or mechanism which can be adopted or controlled by the coexistence controller in accordance with some embodiments. More specifically, among other reasons, because the suppression of the wireless network circuits, and because some wireless network circuits have higher priority than the others, one or more buffers can be included in the base station 1010 (FIG. 10) and coupled to the wireless network circuits 1020a-1020b for temporarily storing data. In some of these embodiments, the coexistence controller 1030 (FIG. 10) can be configured to allocate more resource in the buffers to the network circuit with higher priority (e.g., circuit 1020b). Such example is illustrated in diagram 1300. In some embodiments, the coexistence controller 1030 can also adjust a buffer rate of the buffers based on workload of the network circuits 1020a-1020b.

In some embodiments, the coexistence controller 1030 can also coordinate among the wireless sensors 1070a-1070n so as to cause the wireless sensors 1070a-1070n not to interfere with one another's data transmission. In some embodiments, the wireless sensors 1070a-1070n may communicate to the coexistence controller 1030 regarding their respective battery or other power status, and the coexistence controller 1030 can prioritize communication among one or more wireless sensors 1070a-1070n based on their respective power supply status. For example, the coexistence controller 1030 can selectively send acknowledge (ACK) packets to those wireless sensors among sensors 1070a-1070n which are low on power so as to avoid them retransmit the data.

Virtual Access Points for Low Power (or Power-Sensitive) Devices

Figure 16:
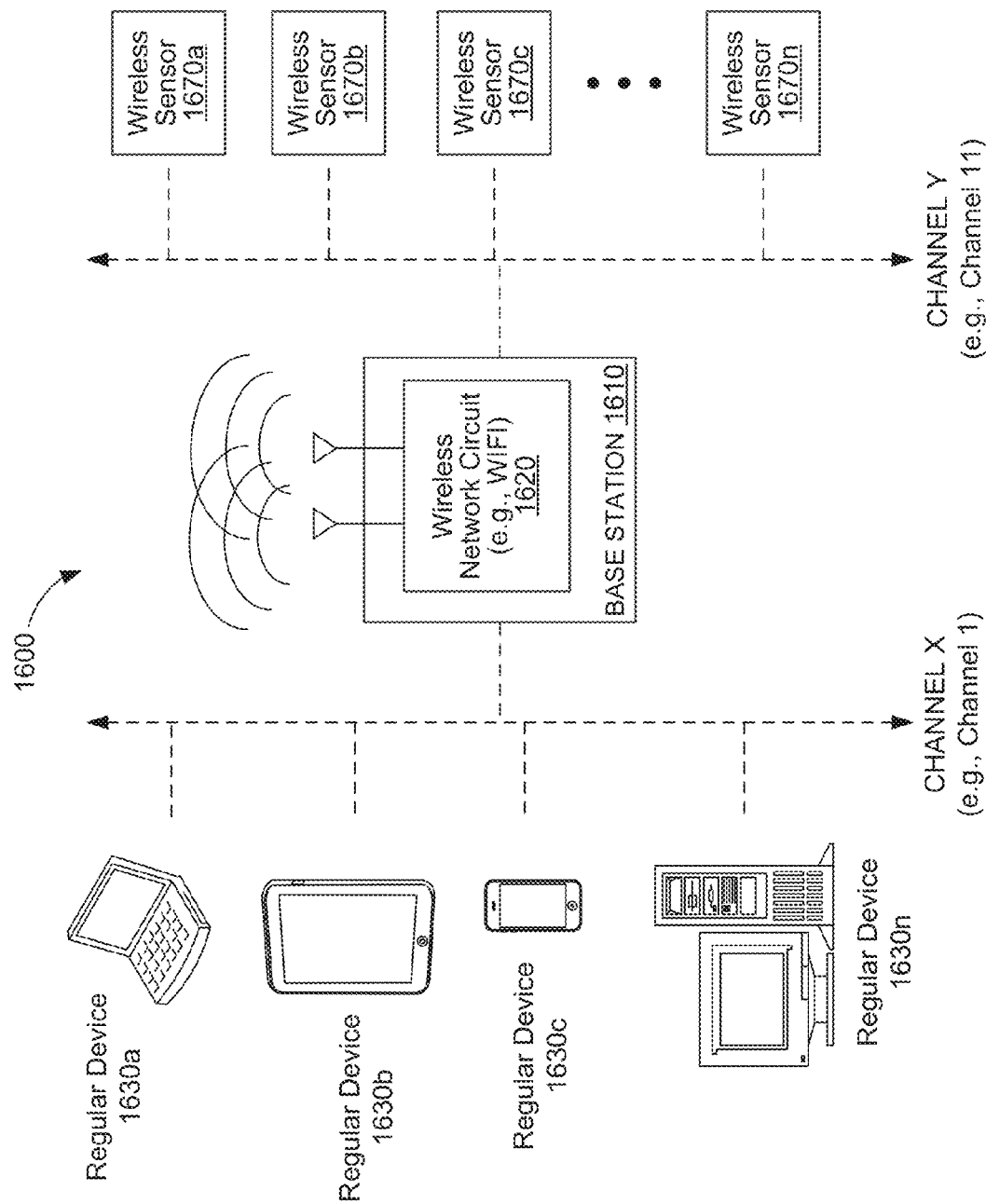
FIG. 16 is an abstract diagram illustrating a wireless base station or residential gateway which implements the fast channel switching techniques disclosed herein in accordance with some embodiments.

FIG. 16 is an abstract diagram 1600 illustrating a wireless base station or residential gateway 1610 which implements the power saving techniques such as fast channel switching or accurate beacon timing disclosed herein in accordance with some embodiments.

The present embodiments recognize that wireless network technologies have grown substantially in terms of transmission speed; however, the increase in transmission speed is typically obtained at the expense of power consumption which may adversely affect the operational life of battery powered devices, and especially with wireless sensors where these sensors are expected to operate on batteries for a long time and are at idle or asleep most of the time. Previous solutions to this problem include having, on the base station, a separate radio network circuit operating at another frequency band (e.g., 900 MHz) designated for connecting the wireless sensors or other power-sensitive devices while having a regular network circuit performing data communication with regular clients at regular speed. However, this conventional technique requires separate and designated network circuitry for the power-sensitive sensors or other devices, and the designated network circuitry can create a waste when the base station is not employed in an environment with such power-sensitive devices. Further, without the aforementioned coexistence controller mechanisms, conventional base stations typically do not have more than one wireless network circuit operating in the same frequency band (e.g., 2.4 GHz). It is desirable to provide methods and apparatuses that reduce power consumption of power-sensitive mobile devices (e.g., wireless sensors) while still satisfying the need for transmission speed of regular devices for those devices that may not have the aforementioned coexistence controller. It is noted, however, that the disclosed fast channel switching, accurate sensor, beacon and other techniques can be applied to devices with more than one wireless network circuit operating in the same frequency band as well as devices with only one wireless network circuit operating in a given frequency band.

In accordance with some embodiments, the base station 1610 include a wireless network circuit 1620, which is capable of connecting wirelessly to computing devices for data communication using, for example, Wireless LAN technologies at a frequency band (e.g., 2.4 GHz, 5 GHz, etc.). As previously mentioned and shown in FIG. 2C, a frequency band typically has a plurality of channels (e.g., channels 1-11 of the 2.4 GHz frequency band as shown in FIG. 2C).

According to one or more embodiments, the base station 1610 can utilize the wireless network circuit 1620 to nearly simultaneously connect to regular (e.g., not power-sensitive) wireless devices 1630a-1630n on one channel (e.g., channel X) using regular connections (e.g., standard IEEE 802.11 protocols) while connecting to power-sensitive wireless devices (e.g., wireless sensors) 1670a-1670n on another channel (e.g., channel Y) using low-power connections (e.g., modified or adjusted versions of WLAN protocols).

According to the present embodiments, the low-power connection has a relaxed connection maintenance standard than the regular connection. For example, the relaxed connection maintenance standard expects to receive keep alive messages at a frequency less than default. The low-power connection may also have a longer keep alive expiration period than the regular connection so that the network device does not disassociate the power-sensitive client after a regular keep alive expiration period expires. So, in one example of the low-power connection, the base station 1610 may expect sensors to wake up only every N (e.g. 10, 100, or 200) beacons where N may be bigger than the default. In another example, the base station 1610 may not dissociate a sensor simply because the sensor has not responded to a transaction (e.g., a Layer 2 mechanism, any form of Ping, or other communication sent to the sensor). In yet another example, the base station 1610 can expect Keep Alive messages to be transmitted less often from the sensors. In some embodiments, the frequency of Keep Alive samples may vary for different class of sensors (e.g. smart meter monitors versus camera and other home monitors).

More specifically, the base station 1610 can include control software and/or circuitry (not shown in FIG. 16 for simplicity) that is coupled to the network circuit 1620. In one or more embodiments, the software or control circuitry can be configured so that the base station 1610 is to, upon receipt of a request of connection from a client, identify whether the client is power-sensitive. If the client is identified as power-sensitive, the base station 1610 can cause the power-sensitive client to connect using a low-power connection while maintaining a regular connection to other regular clients. More specifically, depending on the embodiment, the base station 1610 can cause the power-sensitive client to connect in at least one of two ways. In some examples, the power-sensitive client is connected to the base station 1610 directly using the low-power connection (e.g., on channel Y). In some other examples, the power-sensitive client is first connected to the base station 1610 using a regular connection similar to the other regular clients, and then the base station 1610 can switch the power-sensitive client to the low-power connection (e.g., by switching from channel X to channel Y). In other words, in some examples, the base station 1610 can configured to connect the power-sensitive client on the low-power channel. In some other examples, the base station 1610 first connects the power-sensitive client on the regular channel, discover whether a connected client is power-sensitive, and shift the connected client from the regular channel to the low-power channel if the connected client is power-sensitive. In another embodiment, the base station 1610 may transmit special beacons for power-sensitive sensors on the regular channel. The special sensor beacons may be transmitted with more accurate timing requirements as compared to typical IEEE 802.11 beacons.

The low-power connection can be operated on a first channel different from but in a same frequency band as a second channel on which the regular connection is operated. For example, the first channel can be channel 1 of the 2.4 GHz frequency band, and the second channel can be channel 11 of the 2.4 GHz frequency band.

Some examples of the power-sensitive clients 1670a-1670n can include wireless sensors such as cameras, door bells, passive infrared (PIR) motion sensors, smoke detectors, or other suitable devices. Some devices such as pass-through sockets or actuators, which may be a part of the sensor network, can be treated as sensors for purposes of discussion herein. The sensors may be low-powered devices that operate on batteries and are not designed to be frequently recharged or replaced. As such, these devices are sensitive to power consumption (or power-sensitive) and may largely benefit if special, separate treatment can be given to save power. These treatments may be different from those regular power-saving techniques (e.g., IEEE 802.11 compliant) for other regular devices.

In some embodiments, when the base station 1610 sees no sensor, the base station 1610 may act as a "regular" WLAN access point. Optionally, the base station 1610 can broadcast information about its ability of low-power connection. For example, the base station 1610 can utilize beacon frames, probe responses, and/or association responses to signal its capabilities. In one embodiment, the base station 1610 signals the low-power sensor support by having a vendor defined information element in the beacons.

As previously mentioned, in some embodiments, the power-sensitive devices (e.g., sensors) 1670a-1670n may recognize the low-power, dual-mode capable base station 1610. During the association, wireless sensor devices can, for example, communicate with the base station 1610 so that the base station 1610 knows the client is a power-sensitive client, and can react accordingly. More specifically, one or more embodiments of the base station 1610 can function as two virtual or logical access points using the same wireless circuit 1620. For example, the base station 1610 can operate a first virtual access point for the low-power connection, and can operate a second virtual access point for the regular connection. In some embodiment, the base station 1610 may send two or more type of beacons on a channel where at least one type of beacon is designate to power-sensitive (e.g., sensor) devices. According to some embodiments, the base station 1610 can perform fast channel switching between the channel that runs regular connections (hereinafter as "regular channels") and the channel that runs low-power connections (hereinafter as "low-power channels"). In some examples, the first and second virtual access points can have different service set identifiers (SSIDs). In other examples, the two virtual access points are only known to the base station 1610 and the connected devices (e.g., wireless sensors 1670a-1670n). More details of the fast channel switching techniques which can be implemented by the base station 1610 are further described in conjunction with FIGS. 17A-21B.

Figure 17A:
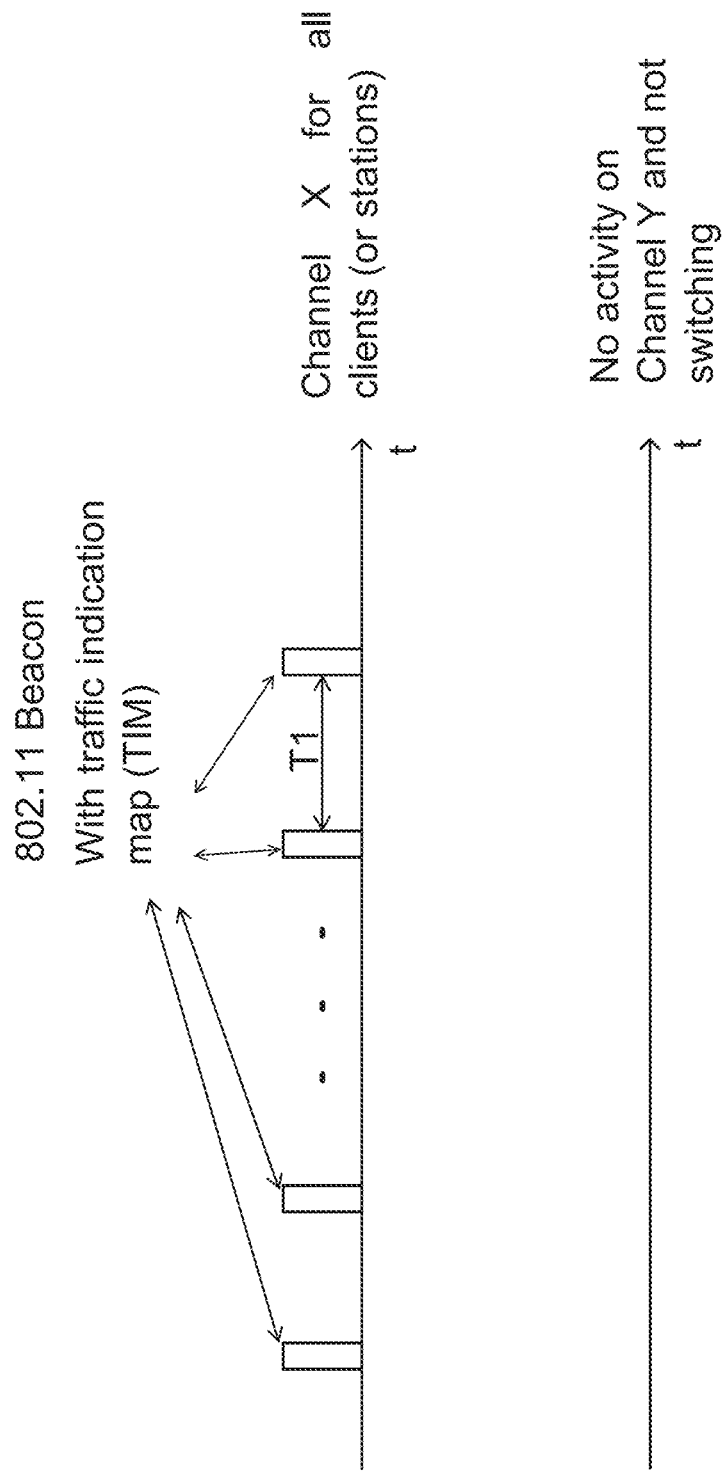
FIGS. 17A-17B are example timing diagrams respectively illustrating beacons sent on two separate channels by the base station of FIG. 16 in accordance with some embodiments.
Figure 17B:
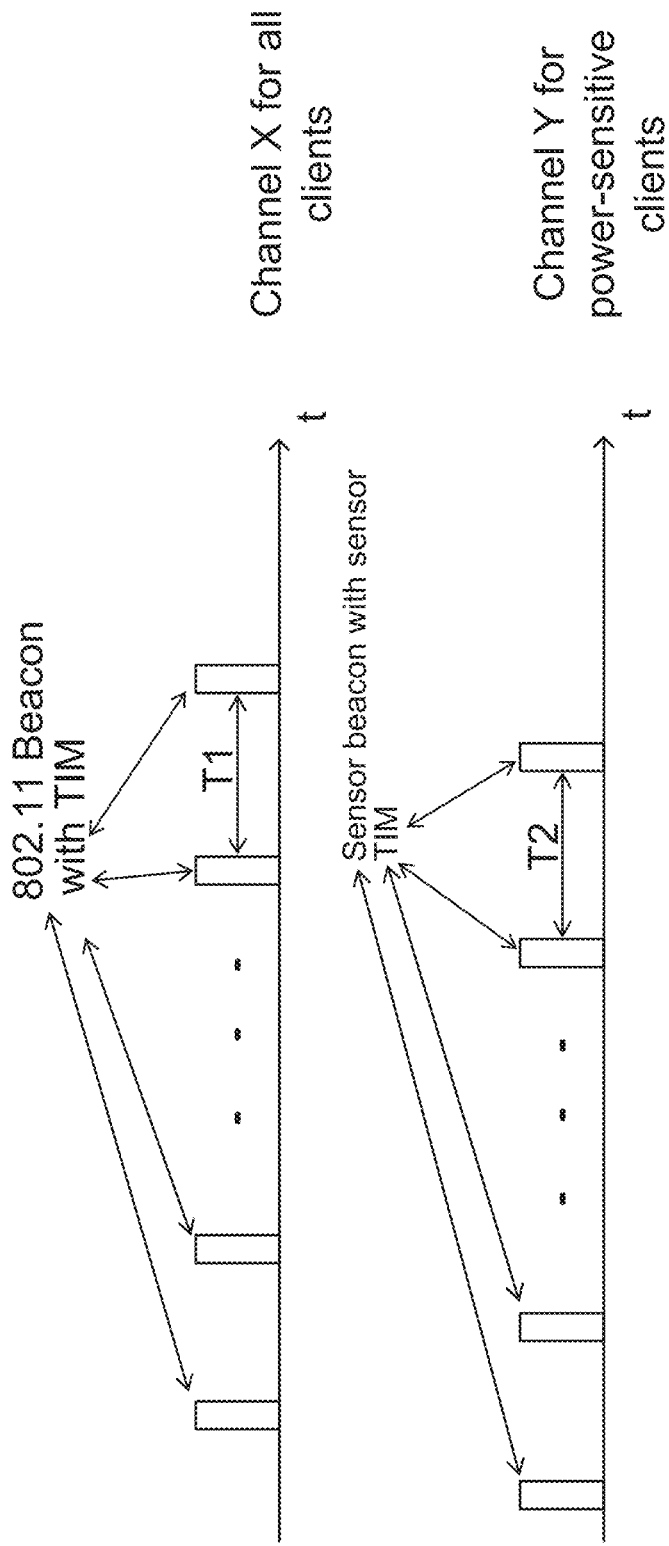

FIGS. 17A-17B are example timing diagrams respectively illustrating beacons sent on two separate channels by the base station 1610 in accordance with some embodiments. FIG. 17A illustrates an example behavior of the base station 1610 when there is no power-sensitive client (e.g., wireless sensor) connected to it. FIG. 17B illustrates an example behavior of the base station 1610 when there is a power-sensitive client connected. According to the present embodiments, the base station 1610 can perform fast channel switching between the two channels, one for regular connections and one for low-power connections. The periodic signal transmitted on the low-power channel (e.g., Channel Y) maybe done using IEEE 802.11 beacon format or it could be other type of packet. For example, the period of the beacons for the power-sensitive sensors on the low-power channel may be different than the period of the beacons on the other, regular channel. Specifically, the beacons on the low-power channel can be transmitted in a fashion that saves power from sensors. The beacon may be shortened to reduce power consumption. However, it is noted that the timing of the beacons should be made as accurate as possible. The beacon may include information about indication of downlink traffic or trigger for uplink traffic. The uplink traffic may be initiated using the beacon or some other suitable means.

Figure 17C:
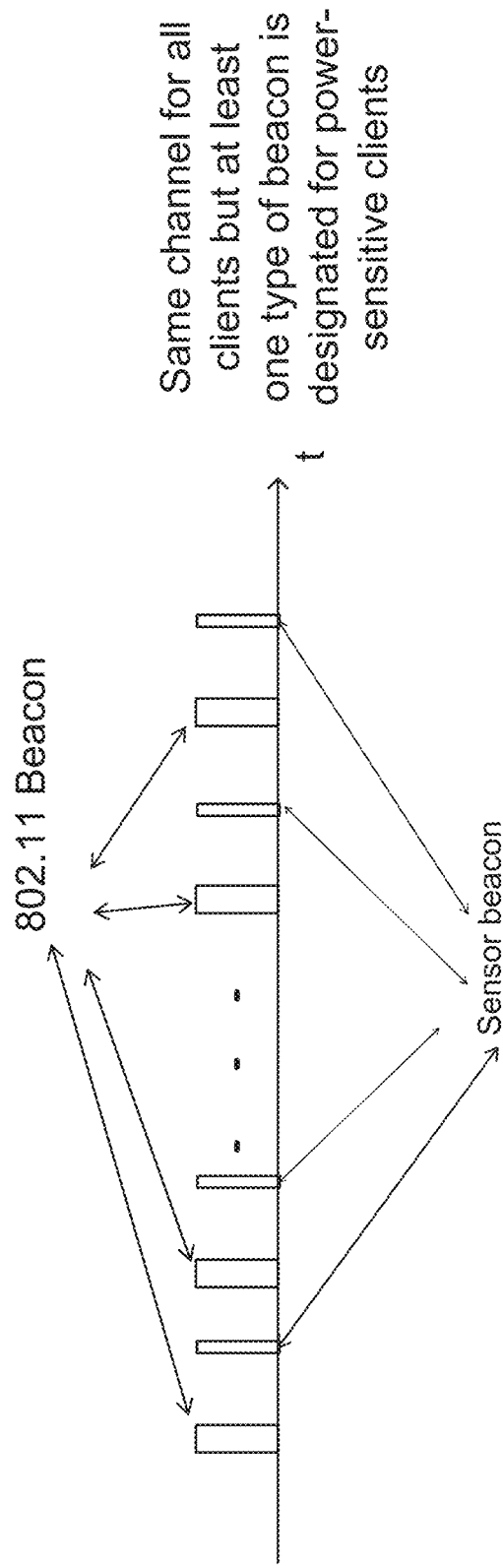
FIGS. 17C-17D are example timing diagrams for the embodiments where two or more types of beacon are transmitted on the same channel and where at least one type of beacon is designated to the power-sensitive clients.
Figure 17D:
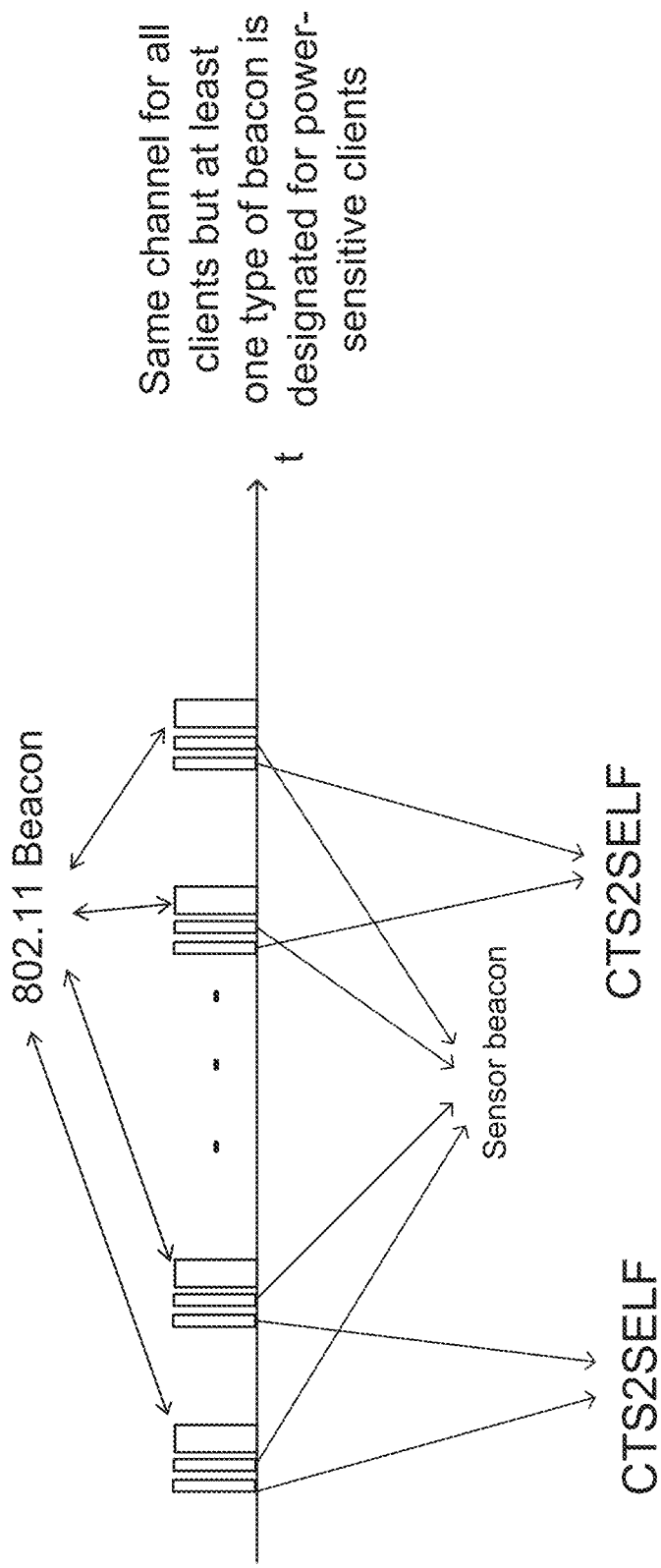

FIGS. 17C-17D are example timing diagrams for the embodiments where two or more types of beacon are transmitted on the same channel and where at least one type of beacon is designated to the power-sensitive (e.g., sensor) clients. In some embodiments, the sensor beacons as depicted in FIG. 17C may be shortened in time, and/or they may be transmitted with mechanisms (e.g., as shown in FIG. 17D) that result in more accurate beacon timing compared to typical IEEE 802.11 beacons. In some implementations, the sensors can associate with the base station 1610 using the IEEE 802.11 beacons and, after the connection is established, the sensors can maintain the connection by listening to the sensor beacons. In some embodiments, the sensors can maintain the connection by listening exclusively to the sensor beacons. FIG. 17D illustrates an example mechanism to improve the timing of sensor beacons. In FIG. 17D, a clear to send to self message, or "CTS2SELF," is transmitted prior to the sensor beacons to reserve the medium for the sensor beacons. By transmitting the CTS2SELF, the base station 1610 reserves the medium such that the other associated stations in overlapping basic service set (BSS) do not transmit when the sensor beacon is supposed to be transmitted, thereby resulting in a more timing accurate beacon.

Some embodiments of the base station 1610 provide fast channel switching capabilities between the two channels so that the connection can appear seamless. In some other embodiments, the base station 1610 can advise on clients connected to one channel (e.g., the channel that runs regular connections) before it switches to another channel (e.g., the channel that runs low-power connections) so that those clients connected to the channel that is which is being switched away temporarily can anticipate the base station 1610 not listening to the clients' requests/responses and data during the switch-away period. In accordance with some embodiments, the base station 1610 can also select the channels for regular and low-power connections, respectively, from available channels based on one or more connection environment parameters. The connection environment parameters include, by way of example and not limitation, channel noise, channel cross-interference, number of overlapping basic service sets (OBSS), a number of power-sensitive clients currently connected, or a number of regular clients currently connected. In some alternative examples, the base station 1610 can put power-sensitive clients and regular clients on the same channel and enable low power support for the power-sensitive client on same channel.

Figure 18A:
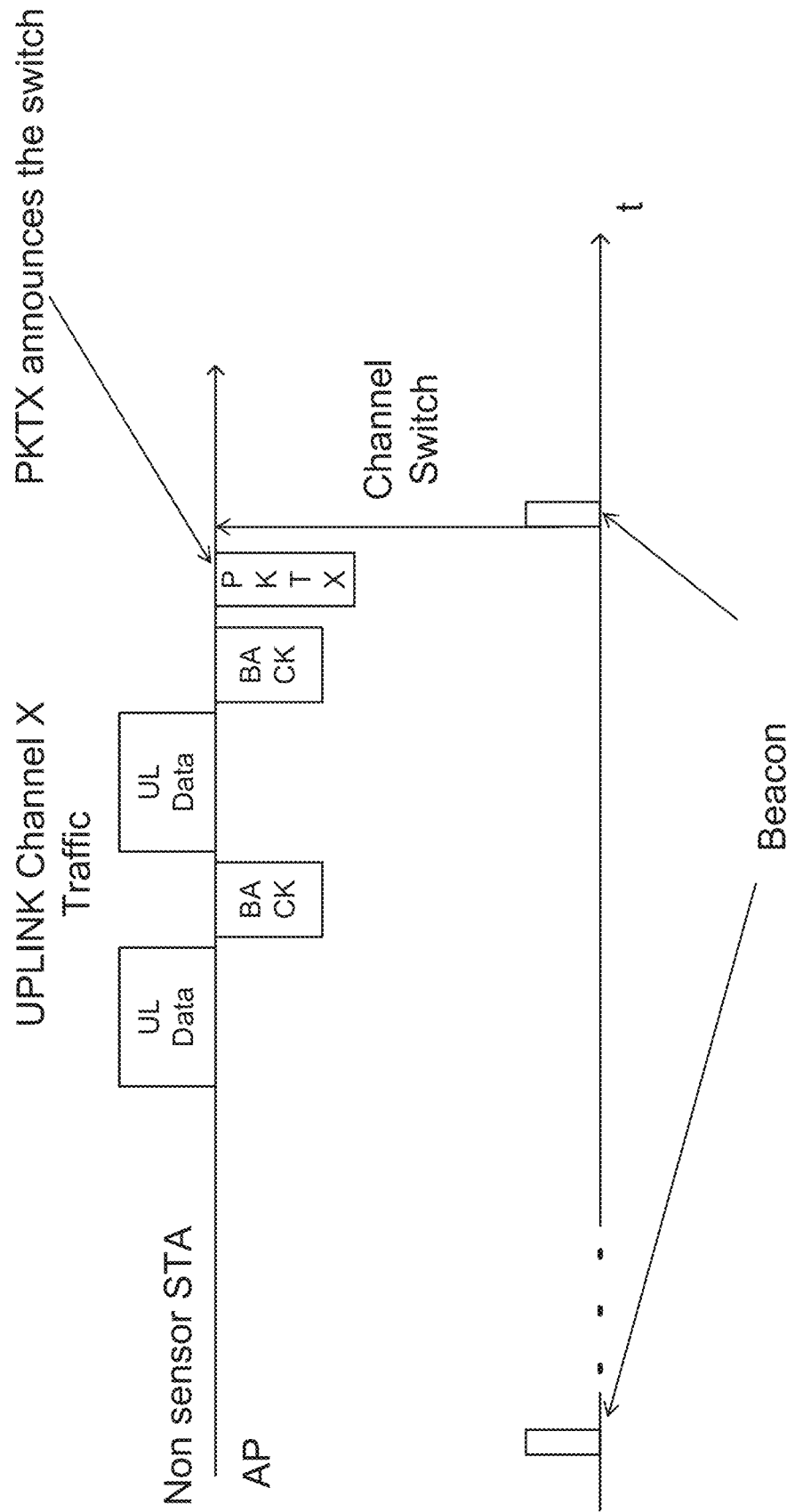
FIGS. 18A-18C are example timing diagrams respectively illustrating switching channels for beacon in the fast channel switching techniques in accordance with some embodiments.
Figure 18B:
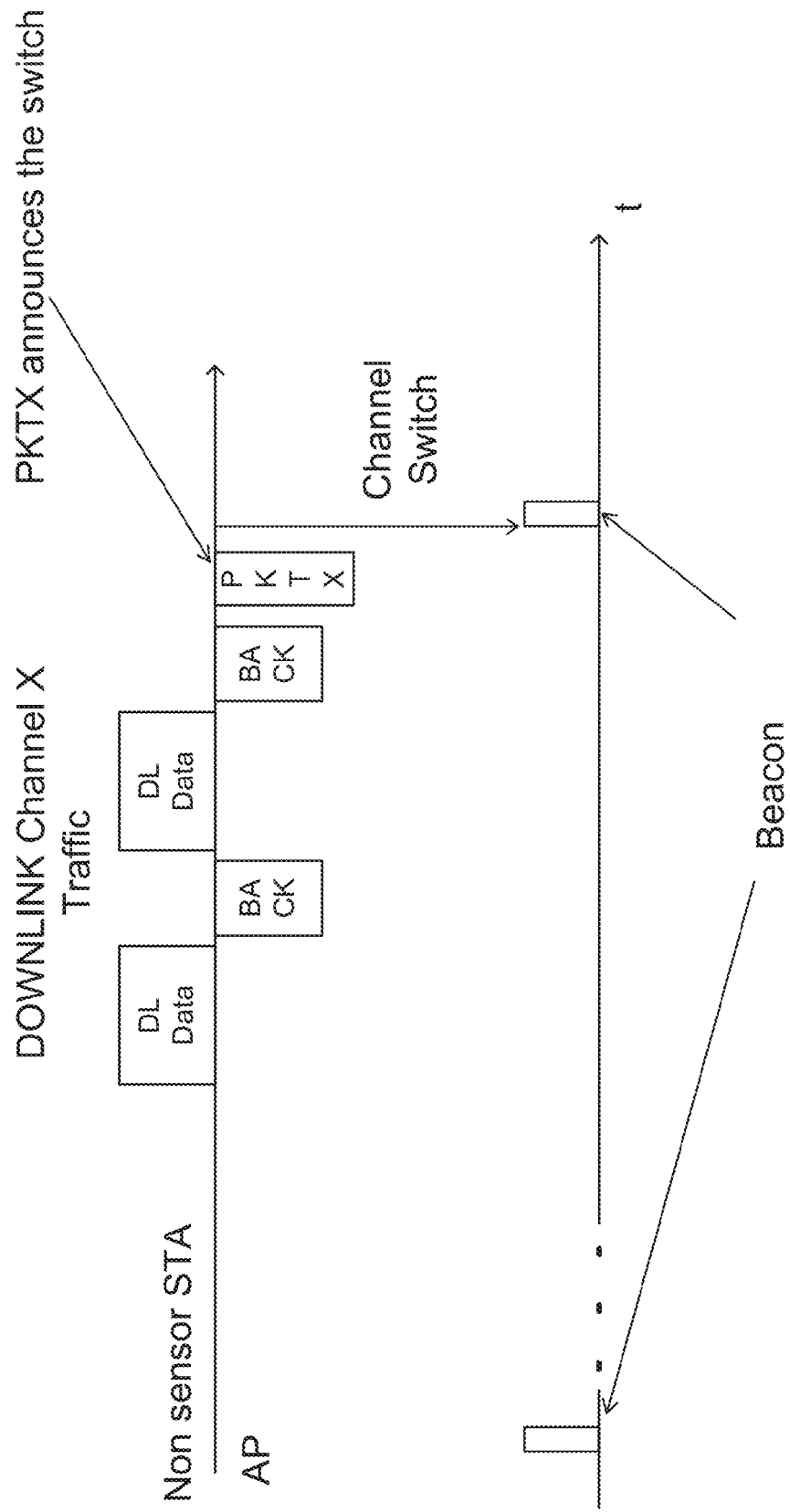
Figure 18C:
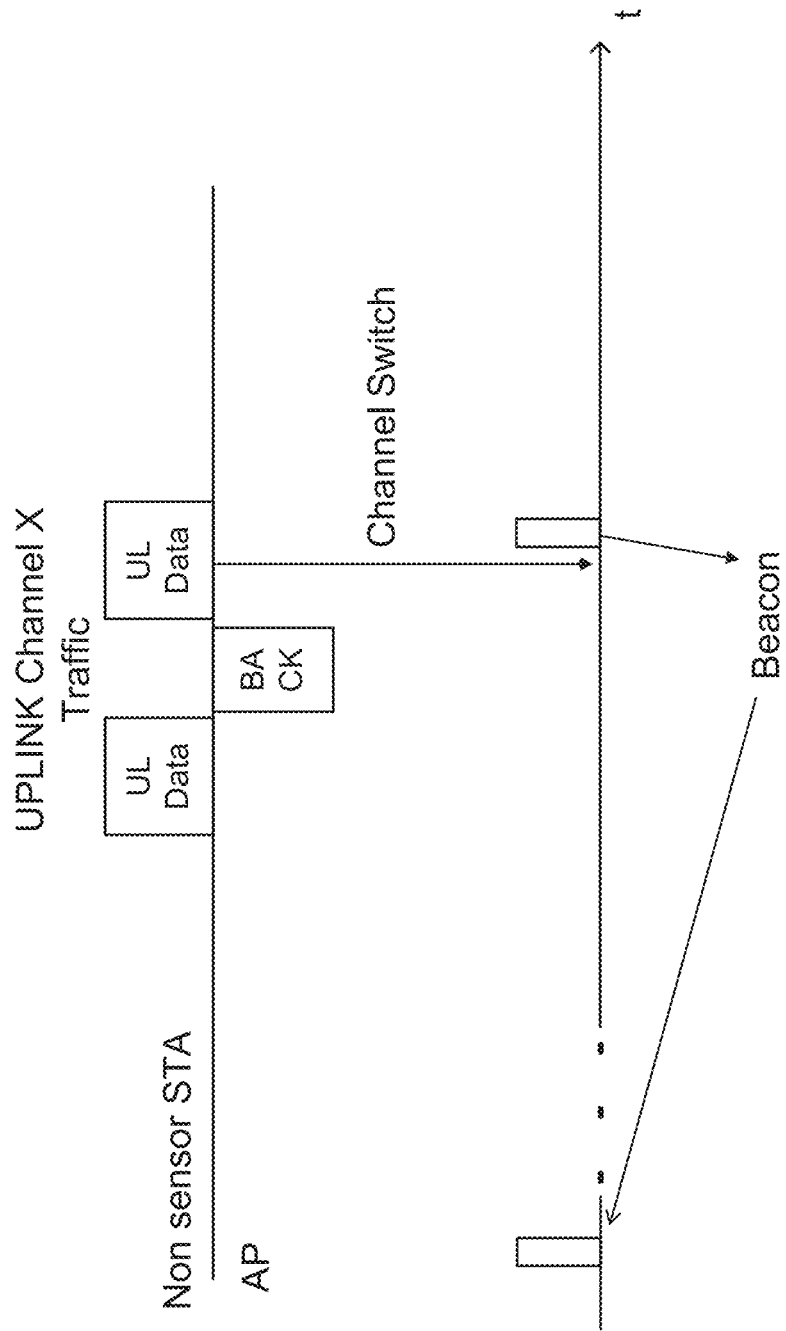

FIGS. 18A-18C are example timing diagrams respectively illustrating switching channels for beacon in the fast channel switching techniques in accordance with some embodiments.

For the timing of the channel switching, in some embodiments, if the base station 1610 is the owner of the transmission operation (TXOP) (for example, if the base station 1610 is transmitting downlink traffic to a regular client, or if the base station 1610 is transmitting control or management frame), then the base station 1610 can switch at the time of beacons. If the link is idle, then some embodiments of the base station 1610 simply switches when needed.

As mentioned, when the base station 1610 switches channel, the base station 1610 can send a packet to announce to those clients connected on the channels that is being switched away that it is not present. In some embodiments, the PKTX packet can be used in announcing the absence on channel X, such as illustrated in FIGS. 18A-18B. The PKTX packet can be a serial clear to send to self (CTS2SELF) message. It is noted that, in other embodiments, mechanisms defined in IEEE 802.11v, WiFi notice of absence, or other suitable mechanisms can also be used.

In some examples, the base station 1610 can simply switch channels without advance announcement, such as illustrated in FIG. 18C. However, it is noted that, while the implementation of switching without announcement may be simpler, the regular clients may perform retries since they would not know, at least initially, that the base station 1610 has switched away to another channel.

Figure 19A:
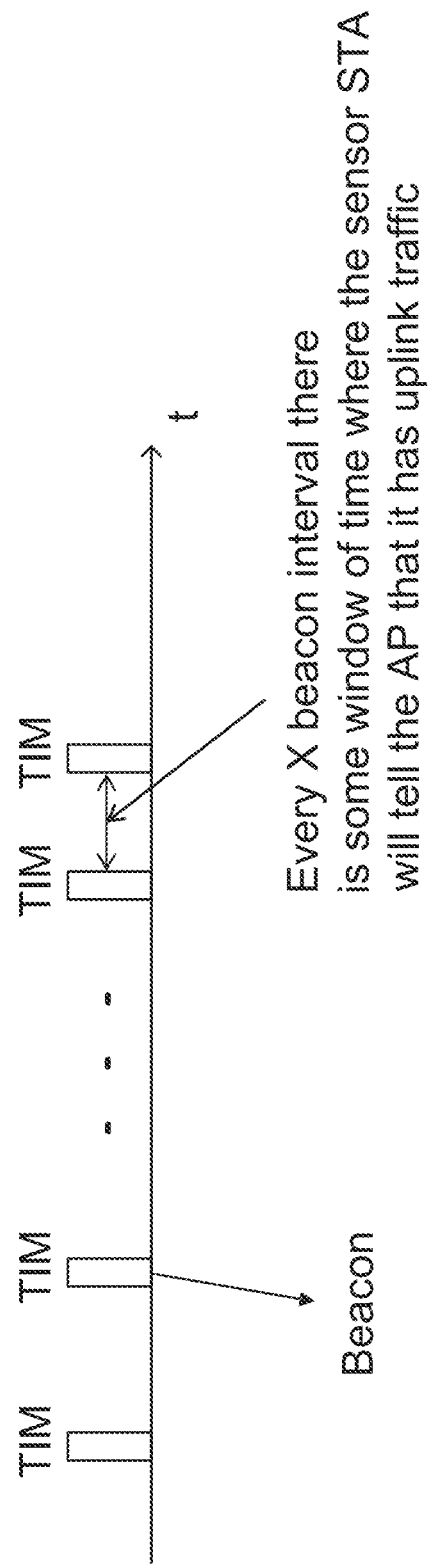
FIGS. 19A-19B are example timing diagrams respectively illustrating resource reservation by sensors in the fast channel switching techniques in accordance with some embodiments.
Figure 19B:
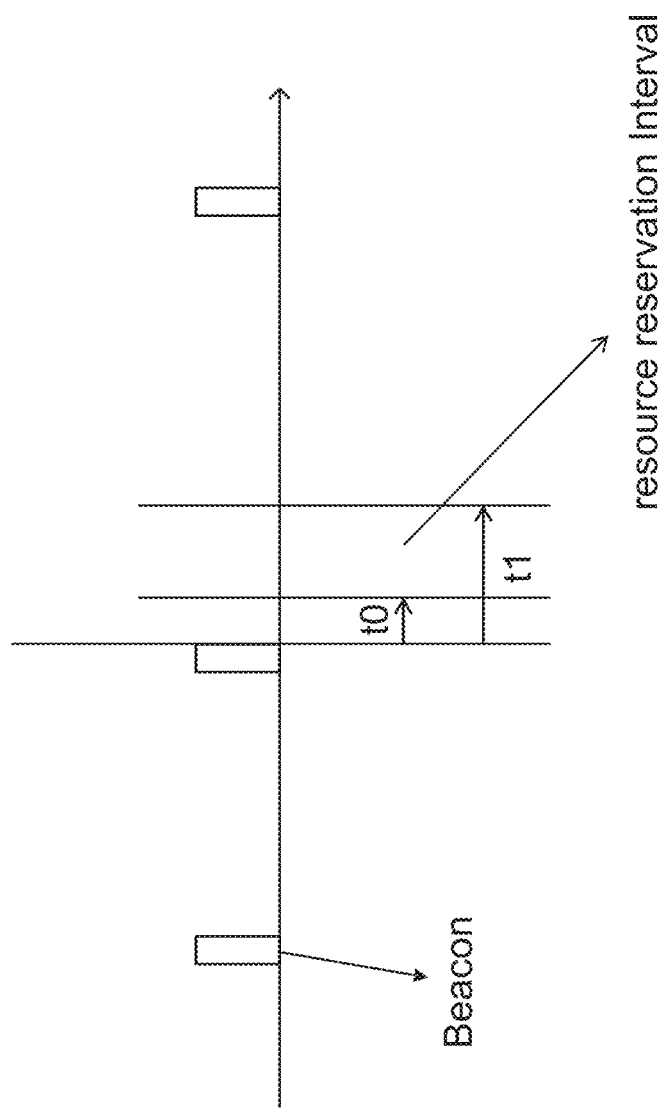

FIGS. 19A-19B are example timing diagrams respectively illustrating resource reservation by sensors in the fast channel switching techniques in accordance with some embodiments.

In some examples, the power-sensitive client or sensor can have defined time in which the client can announce to the base station 1610 that it has uplink traffic to send, and the base station 1610 may adjust the time the base station 1610 spends on each channel based on the announcement which indicates when the wireless sensor needs to transmit its uplink data traffic to the base station 1610.

Specifically, the base station 1610 can receive information from the power-sensitive client so as to anticipate when there is data traffic from the power-sensitive client, and the base station 1610 can adjust the timing and network circuits based on the anticipation. Moreover, in some embodiments, the base station 1610 can receive information from the power-sensitive client regarding what resource the power-sensitive client needs for transmitting data traffic to the network device, and the base station 1610 can arrange a time slot based on the information. Then, the base station 1610 can convey information to the power-sensitive client regarding the time slot.

So for example, a wireless sensor can communicate to the base station 1610 that it has uplink traffic to transmit. Additionally, the wireless sensor may communicate the bandwidth requirement in a defined timing relative to every X beacon. As illustrated in FIG. 19A, every X beacon interval, there can be some window of time where the wireless sensor can tell the base station 1610 that it has uplink traffic. The sensor can start contending for the medium during that window of time, and when the sensor gets the medium, it can start transmitting the uplink traffic. Additionally or alternatively, there can be a schedule resource reservation interval. The scheduled time interval is defined relative to every X beacon, such as illustrated in FIG. 19B. Then, the base station 1610 can tell the sensor (e.g. camera) about when it should transmit the uplink traffic.

In some embodiments, the base station 1610 can switch, for data traffic from the power-sensitive client, the power-sensitive client from the low-power channel to the regular channel for the duration of the traffic. Some embodiments of the base station 1610 also include a buffer configured to accommodate an uplink transmission rate slower than that of the regular connection from the power-sensitive client. In addition, the base station 1610 can receive information from the power-sensitive client regarding a wake-up schedule of the power-sensitive client. The wake-up schedule can indicate that the power-sensitive client wakes up less frequently than a regular client. For example, the power-sensitive client may only wake up every X beacons, where X is larger than default.

In general, the base station 1610 gives priority to the power-sensitive client when there is data traffic from the power-sensitive client. In particular, many embodiments of the base station 1610 gives absolute priority to the beacon timing for the wireless sensors (on the low-power channel) over anything taking place on the regular clients (on the regular channel). However, to avoid regular client starvation or other suitable reasons, one or more embodiments of the base station 1610 can be adjusted so that priority is given to power-sensitive clients every 1 out of M beacons, where M can be a predetermined number based on experience, experiments, or can be dynamically adjusted based on the experienced traffic.

Figure 20:
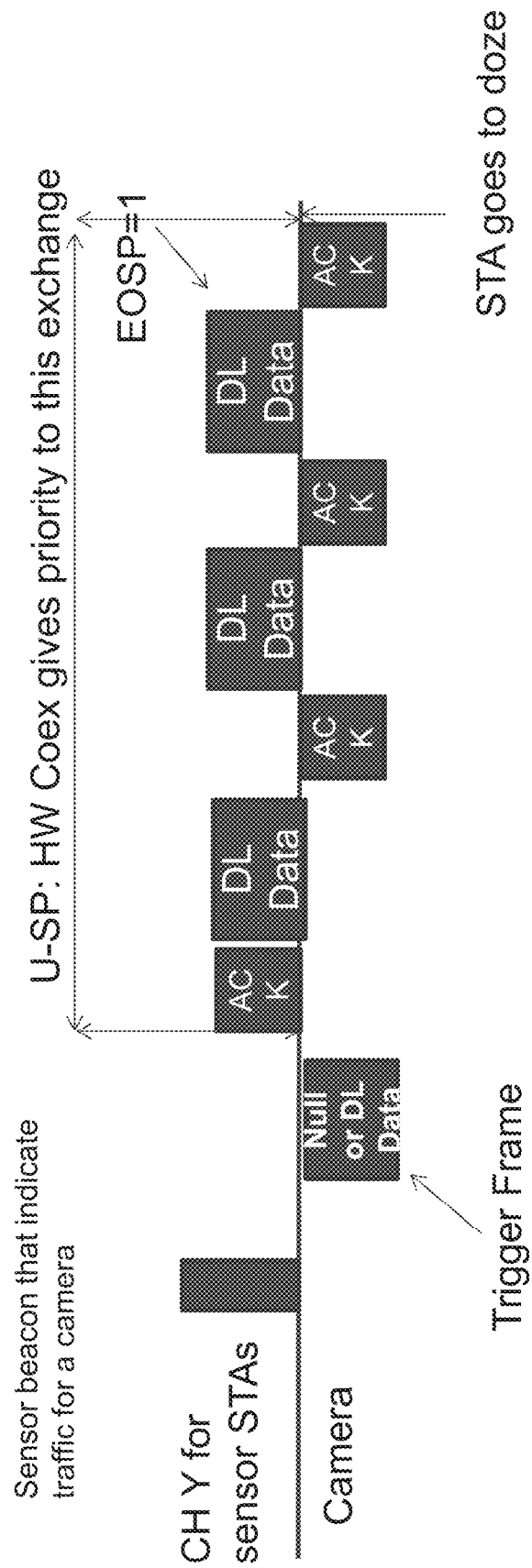
FIG. 20 is an example timing diagrams illustrating downlink traffic operations from the base station to the sensors in the fast channel switching techniques in accordance with some embodiments.

FIG. 20 is an example timing diagrams illustrating downlink traffic operations from the base station to the sensors in the fast channel switching techniques in accordance with some embodiments.

For downlink operations, in some embodiments, sensor downlink traffic (i.e., from the base station 1610 to the sensor) can be transmitted on the low-power channel. In some other embodiments, the downlink traffic may be transmitted on the regular channel. In FIG. 20, an example for U-APSD is illustrated; however, it is noted that PS-POLL, U-APSD, or both may be used.

Figure 21A:
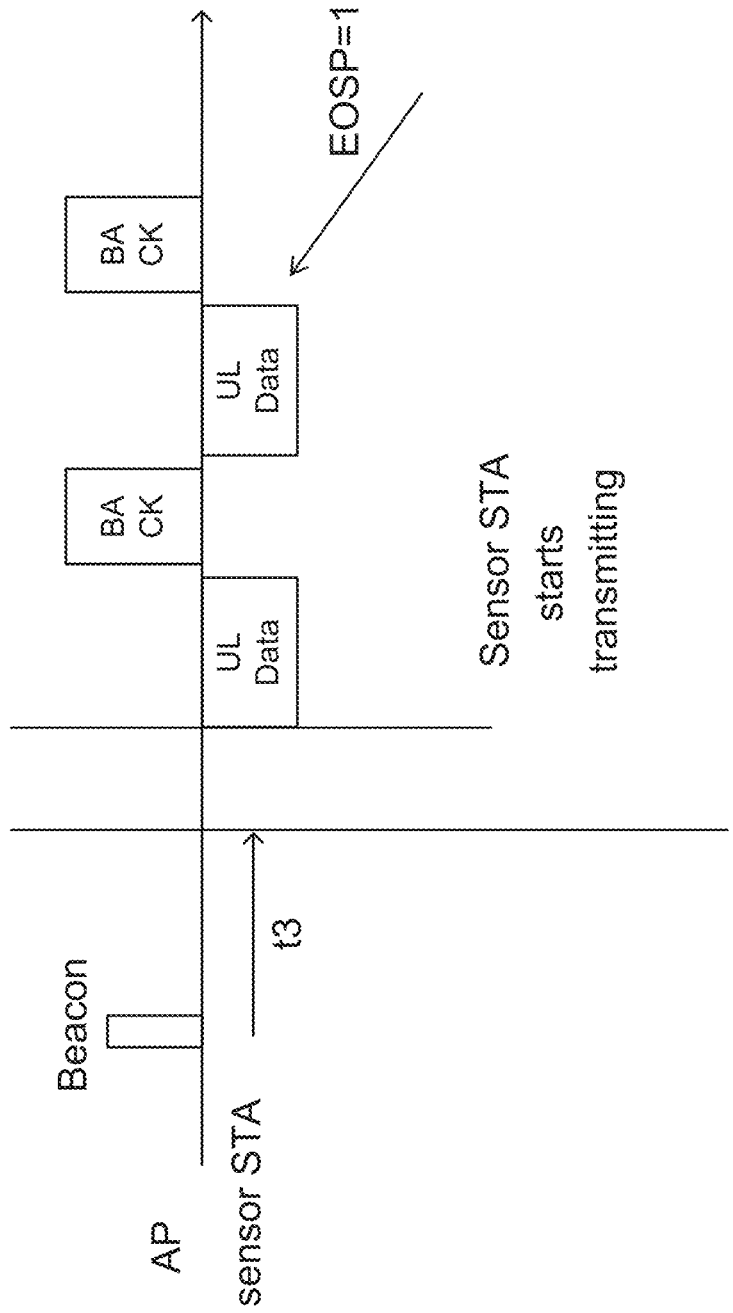

FIGS. 21A-21B are example timing diagrams respectively illustrating uplink traffic operations from the sensors to the base station in the fast channel switching techniques in accordance with some embodiments.

In some embodiments, sensor uplink traffic (i.e., from the sensor to the base station 1610) can be transmitted on the low-power channel, such as illustrated in FIGS. 21A-21B. When a wireless sensor finishes transmitting the last packet in a burst, the sensor can signal the base station 1610 that the transmission is complete, at which time the base station 1610 can make a determination as whether and when the base station 1610 should switch channel (e.g., back to the regular channel). As illustrated in the example of FIG. 20A, an EOSP bit may be used to signal the end of the burst. Additionally or alternatively, a RTS/CTS handshake can be performed between the base station 1610 and the wireless sensor before the sensor starts to transmit uplink data, such as illustrated in FIG. 21B.

In some embodiments, the base station 1610 may poll the sensors and ask them if they have any uplink traffic to send. Additionally, if the base station 1610 is expecting a sensor to transmit an uplink packet, the base station 1610 may poll the sensor to transmit the uplink packet. Further, one embodiment provides that, if the sensor does not transmit the packets in response to the poll, the base station 1610 can choose to move on to communicate with the other sensors, or the base station 1610 may switch to the other channel.

Figure 22A:
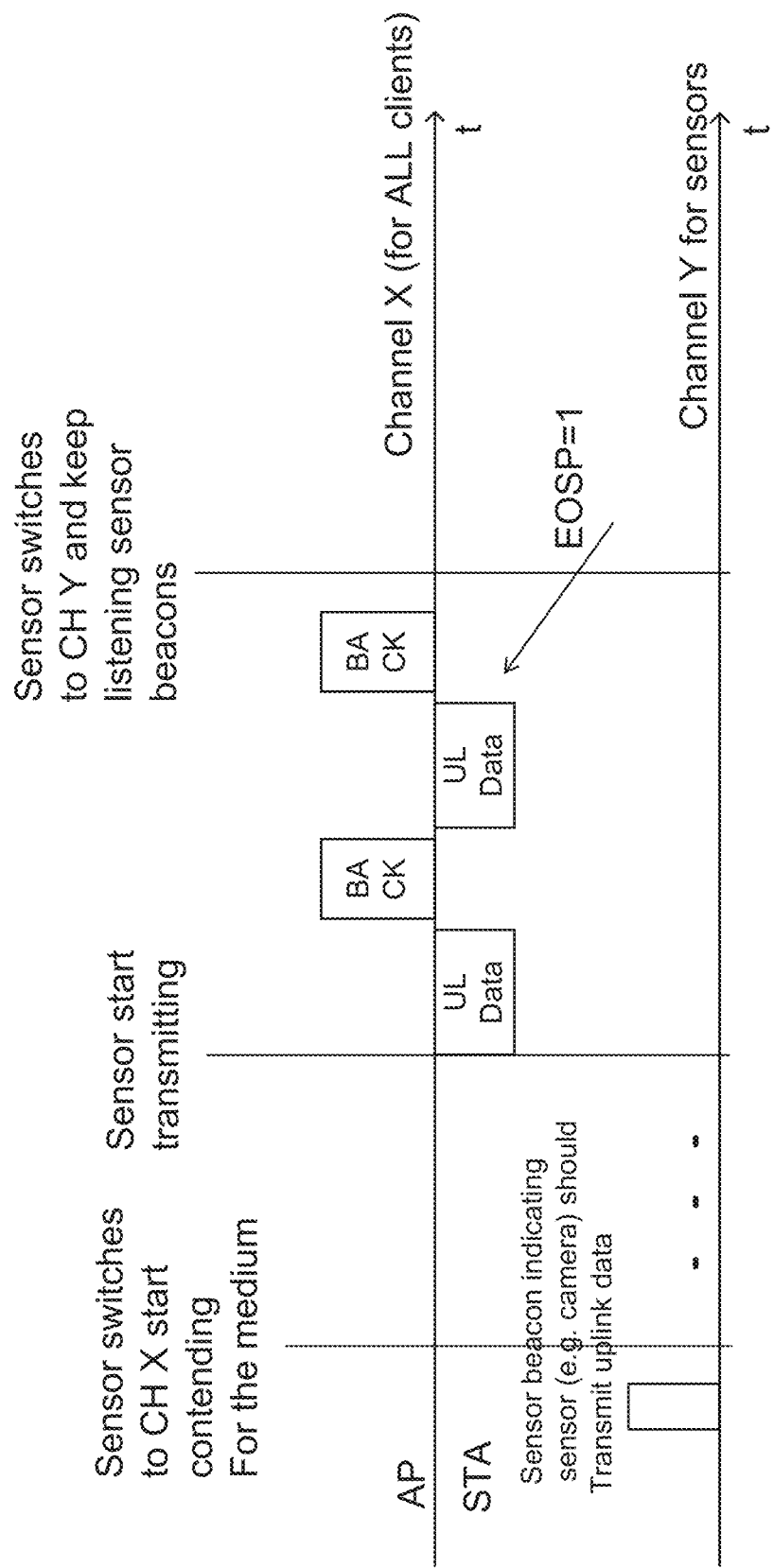
FIGS. 22A-22B are additional or alternative example timing diagrams respectively illustrating uplink operations in the fast channel switching techniques in accordance with some embodiments.
Figure 22B:
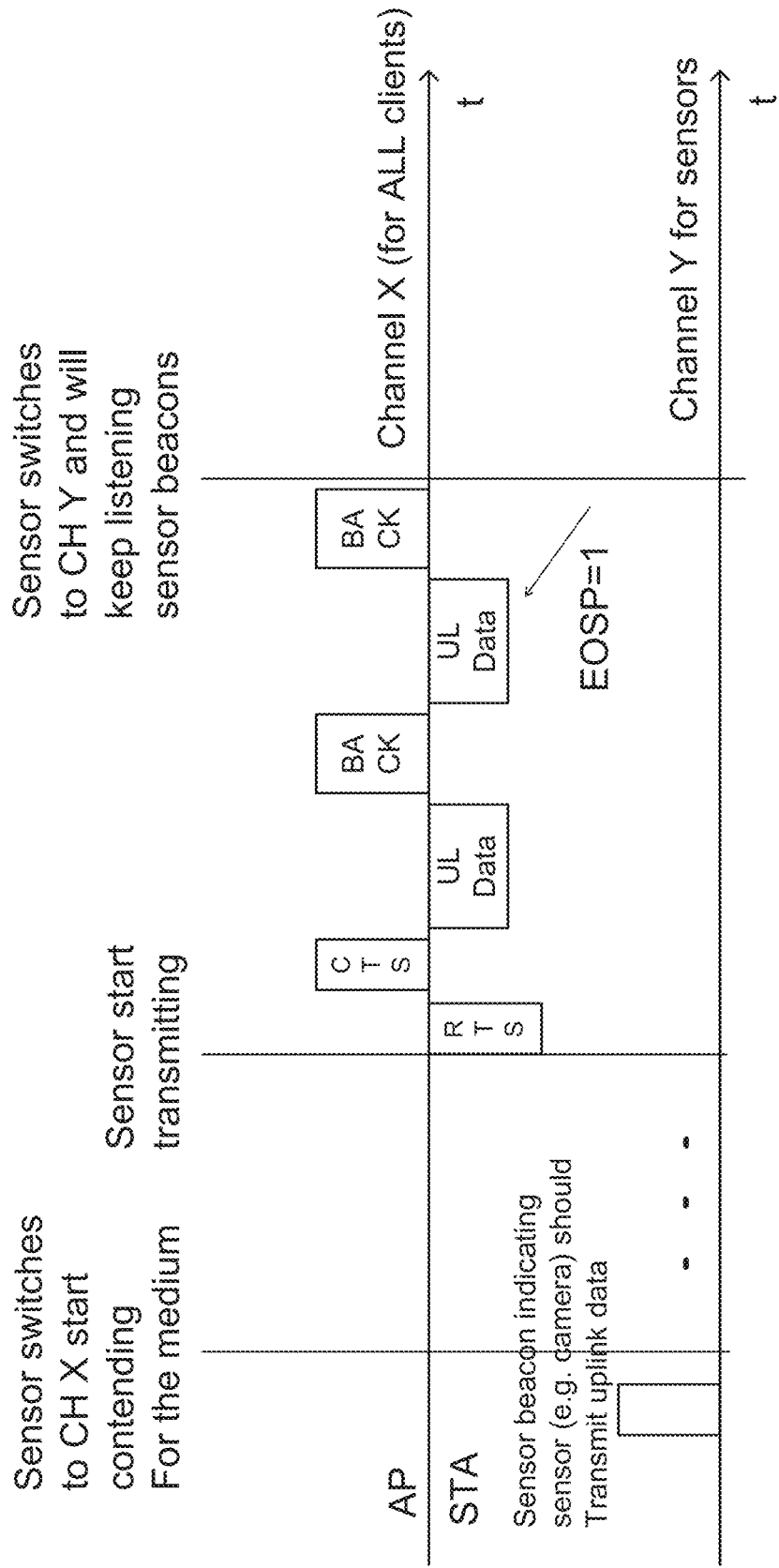

FIGS. 22A-22B are additional or alternative example timing diagrams respectively illustrating uplink operations in the fast channel switching techniques in accordance with some embodiments. In the examples of FIGS. 22A-22B, the regular channel is used to transmit the sensor uplink traffic.

First, as illustrated in FIG. 22A, the sensor beacon indicates that a sensor (e.g. camera has uplink data to transmit. Then, the sensor switches to the regular channel (e.g., Channel X) and start contending for the medium. After the sensor acquires the medium, the sensor start transmitting. At the end of the transmission, the base station 1610 switches back to the low-power channel (e.g., Channel Y) and keep listening sensor beacons. Additionally or alternatively, a RTS/CTS handshake can be performed between the base station 1610 and the wireless sensor before the sensor starts to transmit uplink data, such as illustrated in FIG. 22B. It is noted that, in FIGS. 22A-22B, the sensor can decide whether to transmit uplink packet based on timer, events, or other parameters.

Methodology

Figure 14:
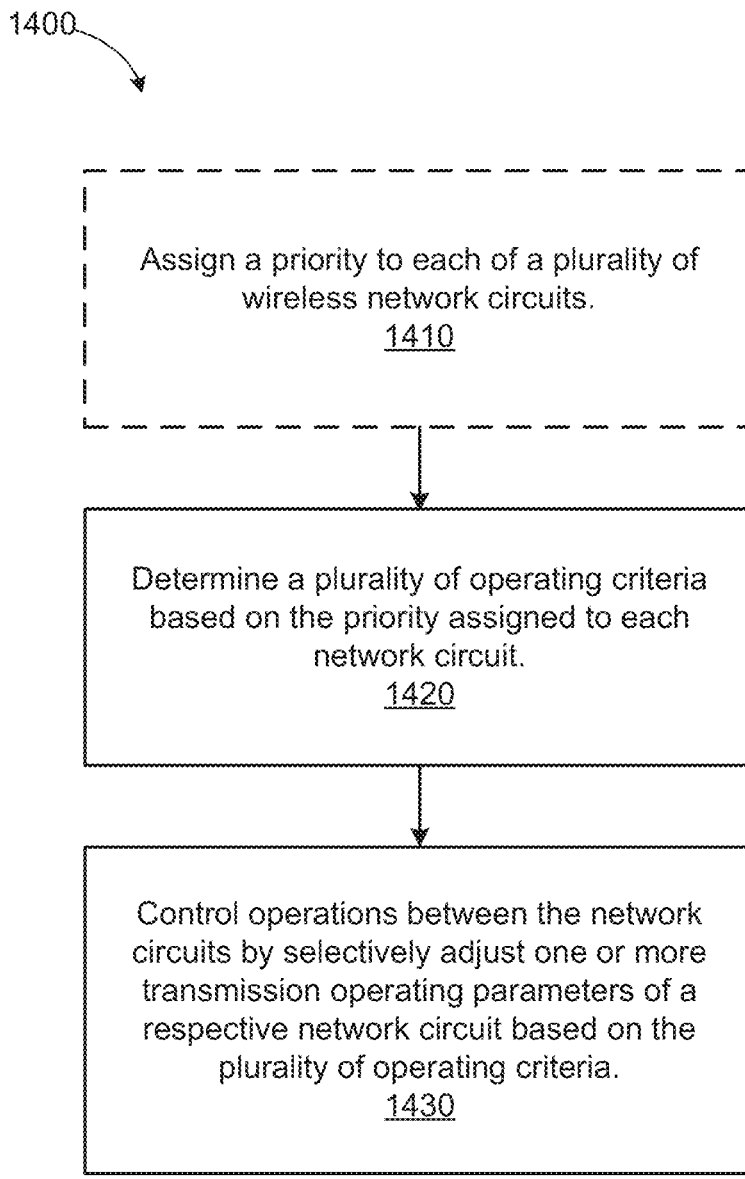
FIG. 14 is a flowchart illustrating a method for controlling and coordinating multiple radio circuits which can be implemented by the coexistence controller in accordance with some embodiments.

FIG. 14 is a flowchart illustrating a method 1400 for controlling and coordinating multiple radio circuits which can be implemented by a coexistence controller (e.g., controller 230, FIG. 2) in accordance with some embodiments. The method 1400 is performed, for example, in a base station (e.g., station 210, FIG. 2).

In one or more embodiments, each of a plurality of network circuits (e.g., circuits 220*a*-220*c*) located on the station 210 can be assigned (1410) a priority. In some embodiments, the coexistence controller 230 is coupled to the network circuits 220*a*-220*c* through a coexistence bus (e.g., bus 240, FIG. 2) to control operations between (or among) the network circuits 220*a*-220*c*. More specifically, the priority each network circuit can be predetermined by the manufacturer of the base station 210, or the priority can be optionally and/or dynamically assigned (1410) by the coexistence controller 230 based on certain priority assigning criteria. The priority assigning criteria may include the amount of traffic, the type of traffic (e.g., data, voice, video, sensor applications, etc.), wireless channel conditions each circuit experiences, and/or other suitable factors. As explained above, the priority assigning criteria may be similar to operating criteria.

Then, the coexistence controller 230 can determine (1420) a plurality of operating criteria based on the priority assigned to each network circuit as well as other factors. The operating criteria can reflect a variety of considerations such as the number of client devices (e.g., devices 130, FIG. 1) each network circuit handles, the amount of data traffic each network circuit sees, the data rate each network circuit supports, the type of traffic each network circuit is assigned, the wireless channel condition or noise (e.g., as measured by RSSI or a known matrix rank) each network circuit experiences, and so forth. According to the present embodiments, the operating criteria are selected to cause the coexistence controller to control the operations in a way that reduces a probability that network circuits 220*a*-220*c* desensitize one another. In some embodiments, the operating criteria are selected in a way such that the coexistence controller 230 can perform, for example, load balancing and/or frequency planning using multiple wireless network circuits (e.g., circuits 220*a*-220*c*) on base station 210.

Next, the coexistence controller 230 can control (1430) operations between the network circuits by selectively adjust one or more transmission operating parameters of a respective network circuit (e.g., circuit 220*a*) based on a plurality of operating criteria including network circuit 220*a*'s priority as compared to other circuits' priorities.

The transmission operating parameters for a wireless network circuit is the configurations in which the network circuit uses to transmit data. For example, in some embodiments, the coexistence controller 230 can reduce the transmit power on one wireless network circuit (e.g., circuit 220*a*) when another wireless network circuit (e.g., circuit 220*b*) is receiving. In additional or alternative embodiments, other transmission operating parameters that can be adjusted by the coexistence controller 230 can include a data rate (e.g., 11 Mbit/s, or 54 Mbit/s) and/or a network protocol (e.g., IEEE 802.11a, IEEE 802.11n, etc.) at which the respective network circuit operates. In some examples, the transmission operating parameters can also include a channel (e.g., channel 1, channel 6, or channel 11 in WLAN 2.4 GHz frequency band; or channel 36, channel 100, or channel 161 in WLAN 5 GHz frequency band) on which the respective network circuit operates. In some embodiments, the transmission operating parameters can also include a frequency band (e.g., 2.4 GHz, 5 GHz, etc.) in which the respective network circuit operates. Other known configuration adjustments such as modulation or phase adjustments can also be included in the list of transmission operating parameters which the coexistence controller 230 can adjust.

Figure 15:
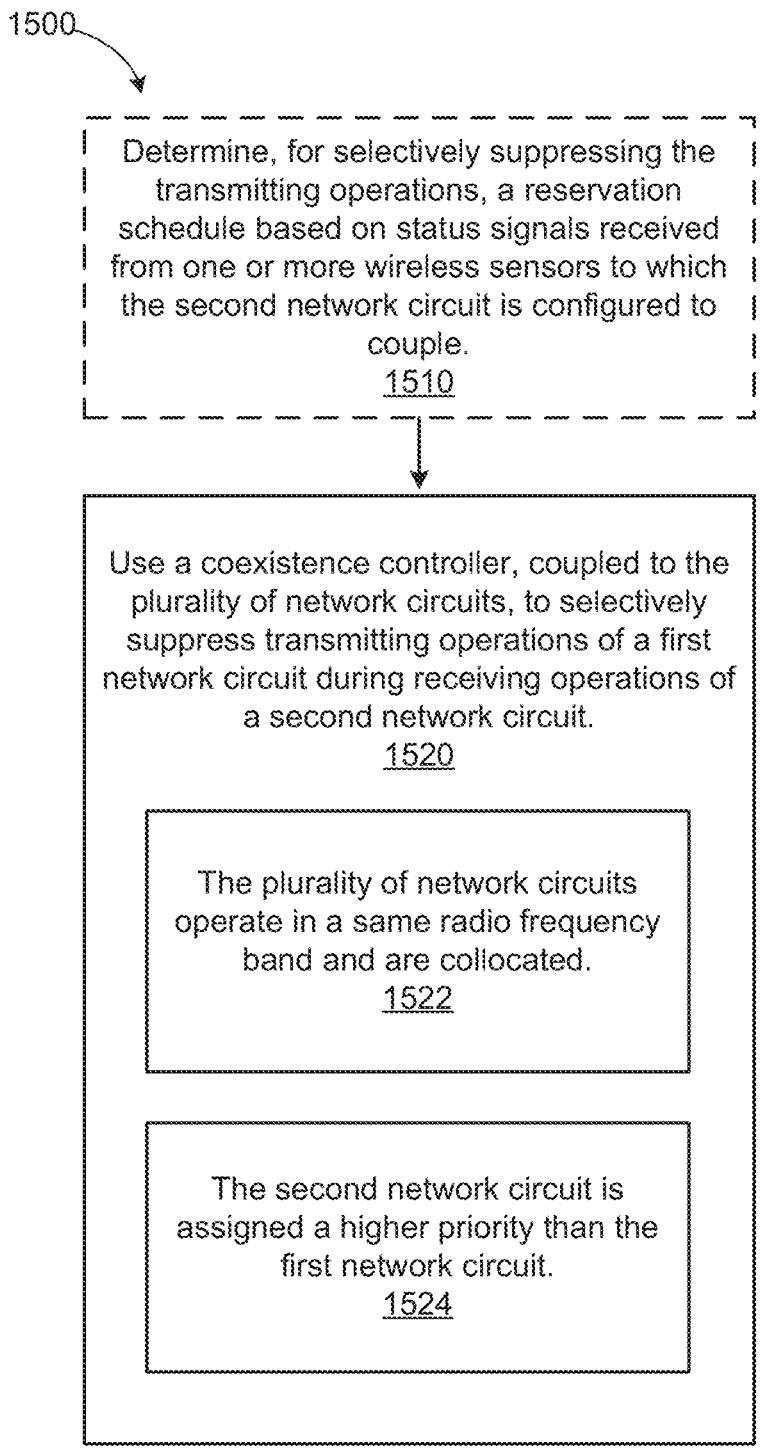
FIG. 15 is a flowchart illustrating a method for reducing interference among multiple radio circuits which can be implemented by the coexistence controller in accordance with some embodiments.

FIG. 15 is a flowchart illustrating a method 1500 for reducing interference among multiple radio circuits which can be implemented by a coexistence controller (e.g., controller 1030, FIG. 10) in accordance with some embodiments. The method 1500 is performed, for example, in a base station (e.g., station 1010, FIG. 10).

First, in some optional embodiments, the controller 1030 can support client devices or sensors that can transmit traffic indication maps (TIM), and the coexistence controller 1030 can arrange or determine (1510) traffic scheduling and give priority to a respective wireless circuit based on the received TIM information. For the client devices or wireless sensors that do not have TIM capacity, when the base station 1010 schedules or reserves a target wake time (TWT) for non-TIM-capable clients, the coexistence controller 1030 can also protect the scheduled TWT of the non-TIM-capable clients from being preempted by TIM-capable clients. In particular, for implementing this technique, the coexistence controller 1030 can indicate to TIM-capable clients a restricted access window (RAW) information, during which no TIM-capable clients can occupy the wireless network circuit.

In accordance with some embodiments, the coexistence controller 1030 can cause the wireless circuits (e.g., 1020*a* and 1020*b*) coupled to the station 1030 to operate in ways that do not cause interference or desensitization to one another. More specifically, the coexistence controller 1030 can utilize the coexistence mechanisms (e.g., as mentioned above) to give priority to those data communications from the various wireless sensors 1070a-1070n by selectively suppressing (1520) the transmitting operations of the wireless network circuit 1020a during the receiving operations of the wireless network circuit 1020b, when the network circuit 1020b is assigned (1524) a higher priority than the network circuit 1020a. The plurality of network circuits operate (1522) in a same radio frequency band and are collocated (1522).

For example, the coexistence controller 1030 can suppress the transmission communication by disabling, postponing, attenuating the power level used in, reducing transmission rate of, or applying any other operating parameter adjustment techniques discussed herein onto, the transmission operations. In this way, the coexistence controller 1010 is able to suppress (1520) the transmitting operations of the network circuit 1020a in a way that maintains integrity of receiving operations of the network circuits 1020b (e.g., so that the receiving is not disrupted or corrupted). It is noted that some embodiments of the wireless network circuits 1020a-1020b operate on different channels (e.g., channels 1 and 6).

Figure 23:
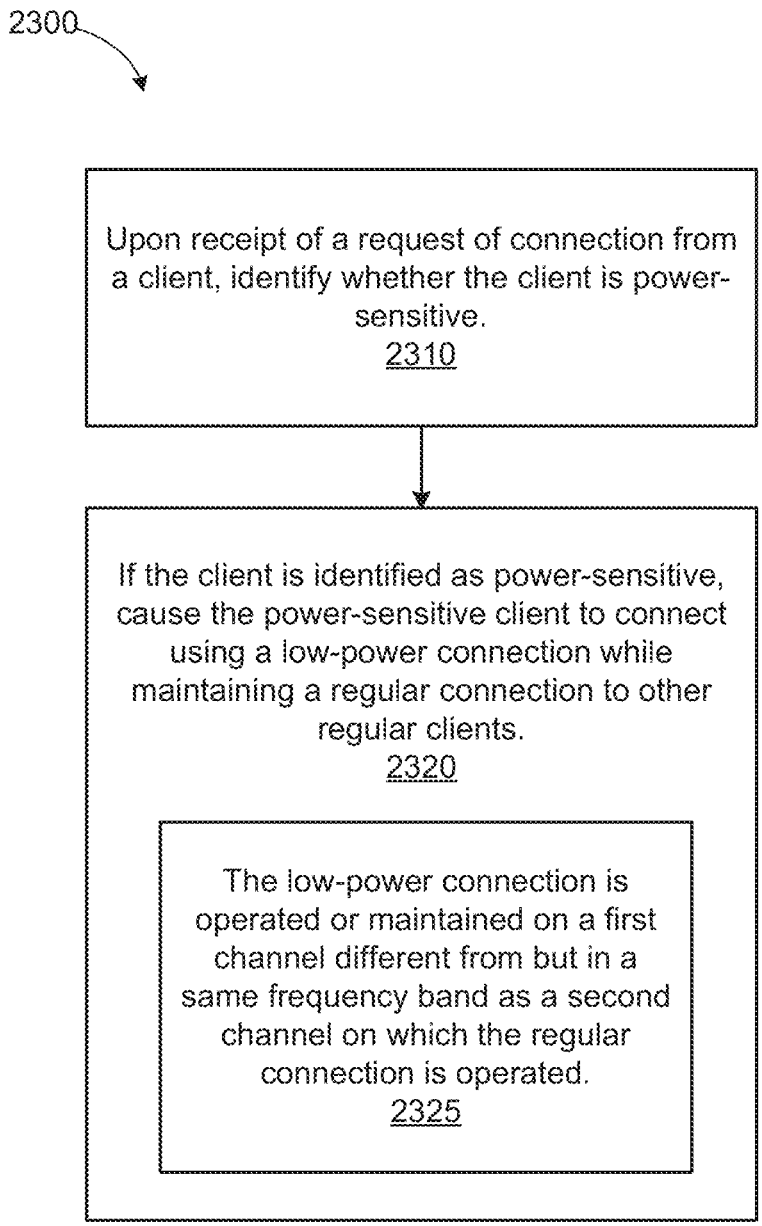
FIG. 23 is a flowchart illustrating a method for enabling a base station to distinguish power-sensitive devices and provide separate treatment thereto in accordance with some embodiments.

FIG. 23 is a flowchart illustrating a method 2300 for enabling a base station to distinguish power-sensitive devices and provide separate treatment thereto in accordance with some embodiments. The method 2300 is performed, for example, in a base station (e.g., station 1610, FIG. 16).

According to one or more embodiments, the base station 1610 can utilize the wireless network circuit 1620 to nearly simultaneously connect to regular (e.g., not power-sensitive) wireless devices 1630a-1630n on one channel (e.g., channel X) using regular connections (e.g., standard IEEE 802.11 protocols) while connecting or maintaining connection to power-sensitive wireless devices (e.g., wireless sensors) 1670a-1670n on another channel (e.g., channel Y) using low-power connections (e.g., modified versions of WLAN protocols). The low-power connection has a relaxed connection maintenance standard than the regular connection. For example, the relaxed connection maintenance standard expects to receive keep alive messages at a frequency less than default. The low-power connection may also have a longer keep alive expiration period than the regular connection so that the network device does not disassociate the power-sensitive client after a regular keep alive expiration period expires.

The base station 1610 can include control circuitry or software (not shown in FIG. 16 for simplicity) that is coupled to the network circuit 1620. In one or more embodiments, the control circuitry can be configured so that the base station 1610 is to, upon receipt of a request of connection from a client, identify (2310) whether the client is power-sensitive. If the client is identified as power-sensitive, the base station 1610 can cause (2320) the power-sensitive client to connect using a low-power connection while maintaining a regular connection to other regular clients. More specifically, depending on the embodiment, the base station 1610 can cause the power-sensitive client to connect in at least one of two ways. In some examples, the power-sensitive client is connected to the base station 1610 directly using the low-power connection (e.g., on channel Y). In some other examples, the power-sensitive client is first connected to the base station 1610 using a regular connection similar to the other regular clients, and then the base station 1610 can switch the power-sensitive client to the low-power connection (e.g., by switching from channel X to channel Y). In other words, in some examples, the base station 1610 can configured to connect the power-sensitive client on the low-power channel. In some other examples, the base station 1610 first connects the power-sensitive client on the regular channel, discover whether a connected client is power-sensitive, and shift the connected client from the regular channel to the low-power channel if the connected client is power-sensitive.

The low-power connection can be operated (2325) on a first channel different from but in a same frequency band as a second channel on which the regular connection is operated. For example, the first channel can be channel 1 of the 2.4 GHz frequency band, and the second channel can be channel 11 of the 2.4 GHz frequency band.

Figure 24:
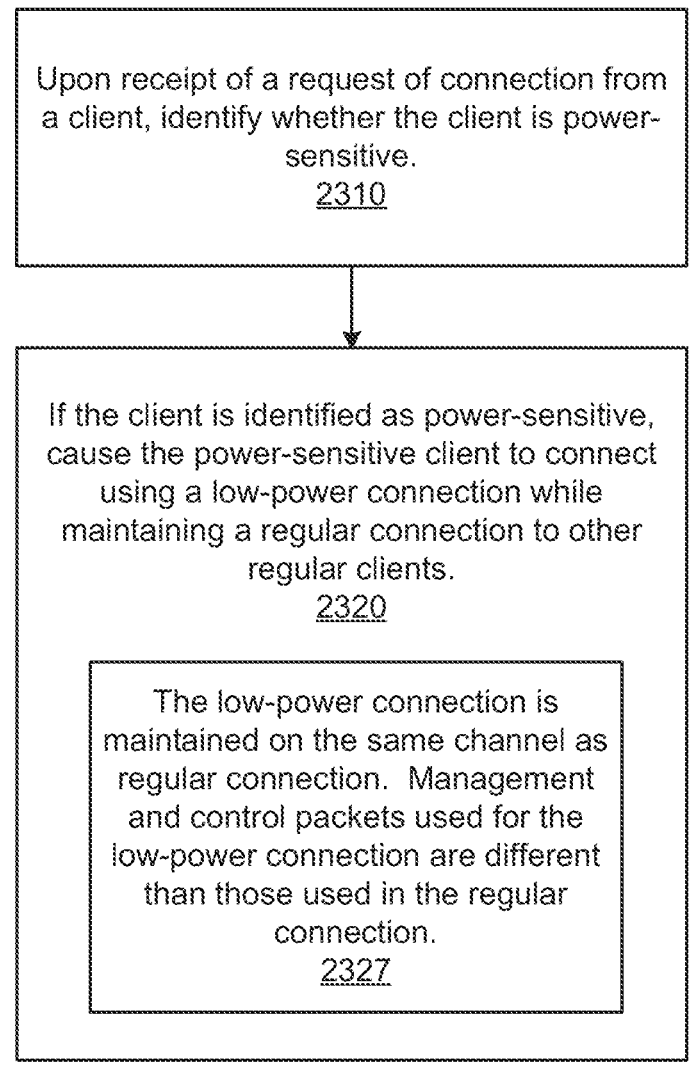
FIG. 24 is a flowchart illustrating additional or alternative details of the method of FIG. 23.

FIG. 24 is a flowchart illustrating additional or alternative details of the method 2300 of FIG. 23. In particular, some of the control and management used (2327) for the power-sensitive devices can be different than the regular, non-power-sensitive devices. The packets that are different can include, by way of example but not limitation, special beacons for the power-sensitive devices (e.g., as described above). The special beacons designated for the power-sensitive devices may be more accurate in timing and/or may be shorter.

CONCLUSION

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

It should also be understood that all block diagrams in the figures are for illustration purpose only, and should not preclude the scope of this invention to include any logic equivalents or combinations thereof, including removing, substituting, or adding other logic gates that achieves the same or similar functions consistent with the features of the present invention.

Further, it should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media).

What is claimed is:
1. A network device, comprising:
control circuitry coupled to one or more wireless network circuits and configured to:
upon receipt of a request of connection from a client, identify whether the client is power-sensitive;
if the client is identified as power-sensitive, cause the power-sensitive client to connect using a low-power connection while maintaining a regular connection to other regular clients, wherein the low-power connection is operated on a first channel different from but in a same frequency band as a second channel on which the regular connection is operated,
  operate a first virtual access point (AP) for the low-power connection; and
  operate a second virtual AP for the regular connection, wherein the first and second APs use different service set identifiers (SSIDs).

2. The network device of claim 1, wherein the control circuitry is further configured to:
  switch, for data traffic from the power-sensitive client, the power-sensitive client from the first channel to the second channel for a duration of the traffic.

3. The network device of claim 1, wherein the control circuitry is further configured to:
  discover whether a connected client is power-sensitive; and
  shift the connected client from the second channel to the first channel if the connected client is power-sensitive.

4. The network device of claim 1, wherein the client is initially connected to the network device on the second channel.

5. The network device of claim 1, wherein the control circuitry is further configured to:
  receive information from the power-sensitive client so as to anticipate when there is data traffic from the power-sensitive client; and
  adjust the network circuits based on the anticipation.

6. The network device of claim 1, wherein the control circuitry is further configured to:
  receive information from the power-sensitive client regarding what resource the power-sensitive client needs for transmitting data traffic to the network device;
  arrange a time slot based on the information; and
  convey information to the power-sensitive client regarding the time slot.

7. The network device of claim 1, wherein the control circuitry is further configured to:
  give priority to the power-sensitive client when there is data traffic from the power-sensitive client.

8. The network device of claim 1, wherein the first channel is employed by a network circuit different from a second network circuit by which the second channel is employed.

9. The network device of claim 1, further comprising:
  a buffer configured to accommodate a uplink transmission rate slower than that of the regular connection from the power-sensitive client.

10. The network device of claim 1, wherein the control circuitry is further configured to:
  broadcast information about the network device's ability of low-power connection.

11. The network device of claim 1, wherein the control circuitry is further configured to:
  receive information from the power-sensitive client regarding a wake-up schedule of the power-sensitive client.

12. The network device of claim 1, wherein the low-power connection has a relaxed connection maintenance standard than the regular connection,
  wherein the relaxed connection maintenance standard expects to receive keep alive messages at a frequency less than default.

13. The network device of claim 1, wherein the low-power connection has a longer keep alive expiration period than the regular connection so that the network device does not disassociate the power-sensitive client after a regular keep alive expiration period expires.

14. The network device of claim 1, wherein the control circuitry is further configured to:
  select the first and second channels, respectively, from available channels based on one or more connection environment parameters.

15. The network device of claim 14, wherein the connection environment parameters include one or more of: channel noise, channel cross-interference, number of overlapping basic service sets (OBSS), a number of power-sensitive clients currently connected, or a number of regular clients currently connected.

16. A method, comprising:
  upon receipt of a request of connection from a client, identifying, using a network device, whether the client is power-sensitive;
  if the client is identified as power-sensitive, causing the power-sensitive client to connect using a low-power connection while maintaining a regular connection to other regular clients,
  wherein the low-power connection is operated on a first channel different from but in a same frequency band as a second channel on which the regular connection is operated,
  operating a first virtual access point (AP) for the low-power connection; and
  operating a second virtual AP for the regular connection, wherein the first and second APs use different service set identifiers (SSIDs).

17. The method of claim 16, further comprising:
  switching, for data traffic from the power-sensitive client, the power-sensitive client from the first channel to the second channel for a duration of the traffic.

18. The method of claim 16, further comprising:
  discovering whether a connected client is power-sensitive; and
  shifting the connected client from the second channel to the first channel if the connected client is power-sensitive,
  wherein the client is initially connected to the network device on the second channel.

19. The method of claim 16, further comprising:
  receiving information from the power-sensitive client so as to anticipate when there is data traffic from the power-sensitive client; and
  adjusting the network circuits based on the anticipation.

20. The method of claim 16, further comprising:
  receiving information from the power-sensitive client regarding what resource the power-sensitive client needs for transmitting data traffic to the network device;
  arranging a time slot based on the information; and
  conveying information to the power-sensitive client regarding the time slot.

21. The method of claim 16, further comprising:
  giving priority to the power-sensitive client when there is data traffic from the power-sensitive client.

22. A network device, comprising:
  control circuitry coupled to one or more wireless network circuits and configured to:
    operate a first virtual access point (AP) for a low-power connection;
    operate a second virtual AP for a regular connection;
    upon receipt of a request of connection from a client, identify whether the client is power-sensitive; and
    if the client is identified as power-sensitive, cause the power-sensitive client to connect using the low-power connection while maintaining the regular connection to other regular clients.

23. The network device of claim 22, wherein the low-power connection is maintained on the same channel as regular connection, and wherein communication packets different than those used in the regular connection are used for the low-power connection.

24. The network device of claim 23, wherein the communication packets include beacons.

25. The network device of claim 24, wherein the communication packets further include management and control packets.

26. The network device of claim 22, wherein the control circuitry is further configured to transmit management and control packets uniquely designated for the power-sensitive client.

27. The network device of claim 22, wherein the control circuitry is further configured to transmit beacons uniquely designated for the power-sensitive client on a same channel as beacons for regular clients.

28. The network device of claim 22, wherein the first and second APs use different service set identifiers (SSIDs).

* * * * *